(12) United States Patent
Huang et al.

(10) Patent No.: US 11,952,526 B2
(45) Date of Patent: Apr. 9, 2024

(54) LC MEDIUM

(71) Applicant: Merck Patent GmbH, Darmstadt (DE)

(72) Inventors: Nicole (I-Yun) Huang, Taoyuan (TW); Eason (Chi-Shun) Huang, Taoyuan (TW); Ray (Kuang-Ting) Chou, Hsinchu (TW)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 17/637,509

(22) PCT Filed: Aug. 26, 2020

(86) PCT No.: PCT/EP2020/073791
§ 371 (c)(1),
(2) Date: Feb. 23, 2022

(87) PCT Pub. No.: WO2021/037877
PCT Pub. Date: Mar. 4, 2021

(65) Prior Publication Data
US 2022/0298419 A1 Sep. 22, 2022

(30) Foreign Application Priority Data
Aug. 30, 2019 (EP) .................................... 19194534

(51) Int. Cl.
*G02F 1/1333* (2006.01)
*C09K 19/02* (2006.01)
*C09K 19/34* (2006.01)
*C09K 19/54* (2006.01)
*C09K 19/58* (2006.01)
C09K 19/04 (2006.01)

(52) U.S. Cl.
CPC ...... *C09K 19/3402* (2013.01); *C09K 19/0208* (2013.01); *C09K 19/54* (2013.01); *C09K 19/586* (2013.01); *C09K 2019/0448* (2013.01); *C09K 2019/0466* (2013.01); *C09K 2019/3422* (2013.01)

(58) Field of Classification Search
CPC ...... C09K 19/3402; C09K 19/0208; C09K 19/54; C09K 19/586; C09K 2019/0448; C09K 2019/0466; C09K 2019/3422; C09K 2019/124; C09K 2019/301; C09K 2019/122; C09K 2019/123; C09K 2019/3004; C09K 2019/3016; C09K 2019/3025; G02F 1/1333
See application file for complete search history.

(56) References Cited

U.S. PATENT DOCUMENTS

| | | | |
|---|---|---|---|
| 7,732,021 B2 * | 6/2010 | Manabe ............... | C07C 25/18 252/299.66 |
| 10,883,047 B2 * | 1/2021 | Manabe ............. | C09K 19/0403 |
| 2018/0051210 A1 | 2/2018 | Sawada et al. | |
| 2018/0163133 A1 | 6/2018 | Saito | |
| 2022/0298419 A1 * | 9/2022 | Huang ................. | C09K 19/54 |

FOREIGN PATENT DOCUMENTS

| | | | |
|---|---|---|---|
| DE | 102005027762 A1 | 1/2006 | |
| EP | 3246374 A2 | 11/2017 | |
| WO | WO 2010/022891 A1 * | 3/2010 | ............. C09K 19/46 |

OTHER PUBLICATIONS

International Search Report dated Oct. 29, 2020 issued in corresponding PCT/EP2020/073791 application (4 pages).

* cited by examiner

*Primary Examiner* — Geraldina Visconti
(74) *Attorney, Agent, or Firm* — MILLEN, WHITE, ZELANO & BRANIGAN, P.C.; Csaba Henter

(57) ABSTRACT

The present invention relates to liquid-crystalline (LC) media and to LC displays (LCDs) containing these media, in particular to LCDs of the twisted nematic (TN) mode, preferably to displays of the LCOS (LC on silicon) mode.

24 Claims, 1 Drawing Sheet

LC MEDIUM

Figure 1A:
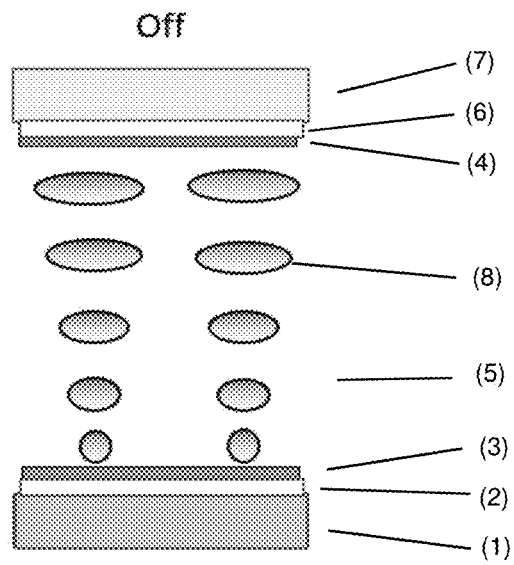

The present invention relates to liquid-crystalline (LC) media and to LC displays (LCDs) containing these media, in particular to LCDs of the twisted nematic (TN) mode, preferably to displays of the LCOS (LC on silicon) mode.

LCDs are used in many areas for the display of information. LCDs are used both for direct-view displays and for projection-type displays. The electrooptical modes used are, for example, the twisted nematic (TN), super twisted nematic (STN), optically compensated bend (OCB) and electrically controlled birefringence (ECB) modes together with their various modifications, as well as others. All these modes utilise an electric field which is substantially perpendicular to the substrates or the LC layer. Besides these modes, there are also electro-optical modes that utilise an electric field which is substantially parallel to the substrates or the LC layer, such as, for example, the in-plane switching (IPS) mode (as disclosed, for example, in DE 40 00 451 and EP 0 588 568) and the fringe field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and displays for TV sets and multimedia applications. The liquid crystals according to the present invention are preferably used in displays of this type. In general, dielectrically positive LC media having rather lower values of the dielectric anisotropy are used in FFS displays, but in some cases LC media having a dielectric anisotropy of only about 3 or even less are also used in IPS displays.

Especially in case of LC media for use in the expanding market of public information displays (PIDs) and automotive displays a high reliability and a wide operating range are highly important factors. For these applications LC media with high clearing temperature (Tni), good LTS (Low Temperature Stability) and high reliability are therefore desired.

LCOS is a reflective micro-display mode using a liquid crystal layer on top of a backplane made from silicon, and wherein light is reflected off this backplane while the liquid crystal layer is switched on and off. It is a combination of digital light processing (DLP) and LCD. The LCOS mode is typically a TN mode, and is often used for projection devices like e.g. projectors and projection TVs, and is also becoming widely used for different technologies like wavelength selective switching, near-eye displays and wearable devices. The LCOS mode has the advantages of light of weight, high resolution and mini-size.

However, in the LCOS mode, the reflective TN mode often shows some optical defects such as the appearance of disclination lines.

The invention has the object of providing LC media, in particular for TN and LCOS mode displays, especially for active matrix displays like those of the TFT (thin film transistor) type, which do not exhibit the disadvantages indicated above or only do so to a lesser extent and preferably exhibit one or more of a wide operating range, a high clearing temperature, a high reliability, a low threshold voltage, a high dielectric anisotropy, a good low temperature stability (LTS), a low rotational viscosity and fast response times.

This object was achieved by providing an LC medium as described and claimed hereinafter.

Thus, the inventors have found that it is possible to improve the image quality of an LCOS, TN mode display, by adding a chiral dopant to the LC medium to form a spontaneous twist in order to manage the light direction. This helps to increase the homogeneity of domain directions and to suppress the appearance of disclination lines. In addition, by varying the concentration of the chiral dopant and thus varying the chiral pitch the Voltage-Transmission (VT) curve can also be adjusted.

The displays according to the present invention are preferably addressed by an active matrix (active matrix LCDs, AMDs for short), preferably by a matrix of thin film transistors (TFTs). However, the liquid crystals according to the invention can also advantageously be used in displays having other known addressing means.

The invention relates to an LC medium with positive dielectric anisotropy, characterised in that it contains one or more compounds of formula I, one or more compounds selected from formulae II and III, and one or more chiral dopants

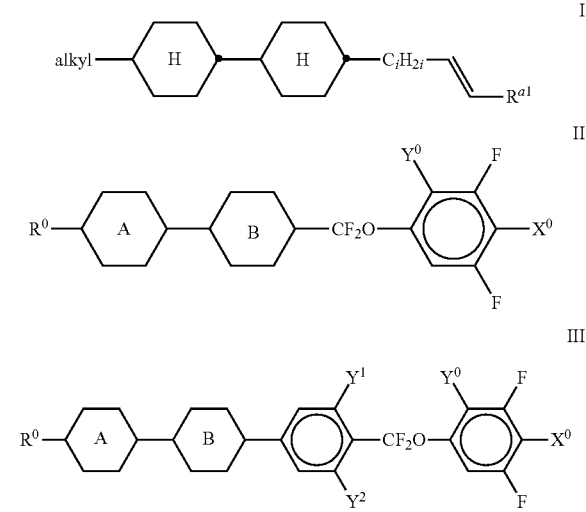

wherein the individual radicals, independently of each other and on each occurrence identically or differently, have the following meanings "alkyl" $C_{1-6}$-alkyl, $R^{a1}$ H, $CH_3$ or $C_2H_5$, i, k 0, 1, 2 or 3,

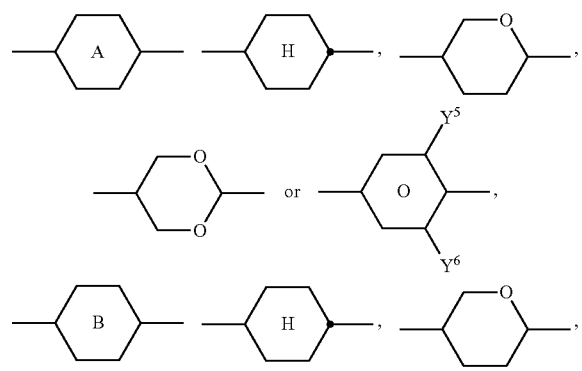

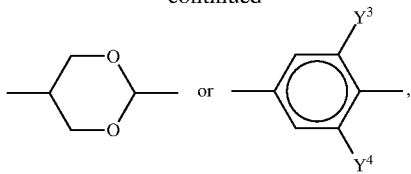

R⁰ an unsubstituted or halogenated alkyl or alkoxy radical having 1 to 15 C atoms, where, in addition, one or more CH₂ groups in these radicals may each be replaced, independently of one another, by —C≡C—, —CF₂O—, —CH=CH—,

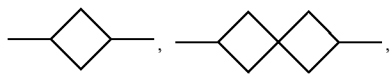

—CO—O— or —O—CO— in such a way that 0 atoms are not linked directly to one another, or denotes

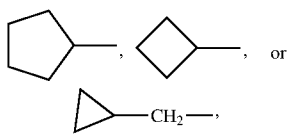

X⁰ F, Cl, CN, SF₅, SCN, NCS, a halogenated alkyl radical, a halogenated alkenyl radical, a halogenated alkoxy radical or a halogenated alkenyloxy radical having up to 6 C atoms, and
Y⁰ H or CH₃,
Y¹⁻⁶ H or F.

The invention further relates to the use of an LC medium as described above and below for electro-optical purposes, in particular for the use in LC displays, preferably in LCOS, TN or TN-TFT displays.

The invention further relates to an electro-optical LC display containing an LC medium as described above and below, in particular an LCOS, TN or TN-TFT display.

The invention furthermore relates to a process for preparing an LC medium as described above and below, comprising the steps of mixing one or more compounds of formula I with one or more further LC compounds and optionally one or more additives.

In the present application, all atoms also include their isotopes. In particular, one or more hydrogen atoms (H) may be replaced by deuterium (D), which is particularly preferred in some embodiments; a high degree of deuteration enables or simplifies analytical determination of compounds, in particular in the case of low concentrations.

If R⁰ denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy. R⁰ preferably denotes straight-chain alkyl having 2-6 C atoms.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If R⁰ denotes an alkyl radical in which one CH₂ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, 2-, -3-, -4- or -5-enyl, hept-1-, -2-, -3-, -4-, -5- or -6-enyl, oct-1-, -2-, -3-, -4-, 5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If R⁰ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, X⁰ is preferably F, Cl or a mono- or polyfluorinated alkyl or alkoxy radical having 1, 2 or 3 C atoms or a mono- or polyfluorinated alkenyl radical having 2 or 3 C atoms. X⁰ is particularly preferably F, Cl, CF₃, CHF₂, OCF₃, OCHF₂, OCFHCF₃, OCFHCHF₂, OCFHCHF₂, OCF₂CH₃, OCF₂CHF₂, OCF₂CHF₂, OCF₂CF₂CHF₂, OCF₂CF₂CHF₂, OCFHCF₂CF₃, OCFHCF₂CHF₂, OCF₂CF₂CF₃, OCF₂CF₂CClF₂, OCClFCF₂CF₃, OCH=CF₂ or CH=CF₂, very particularly preferably F or OCF₃, furthermore CF₃, OCF=CF₂, OCHF₂ or OCH=CF₂.

Particular preference is given to compounds in which X⁰ denotes F or OCF₃, preferably F.

Figure 1B:
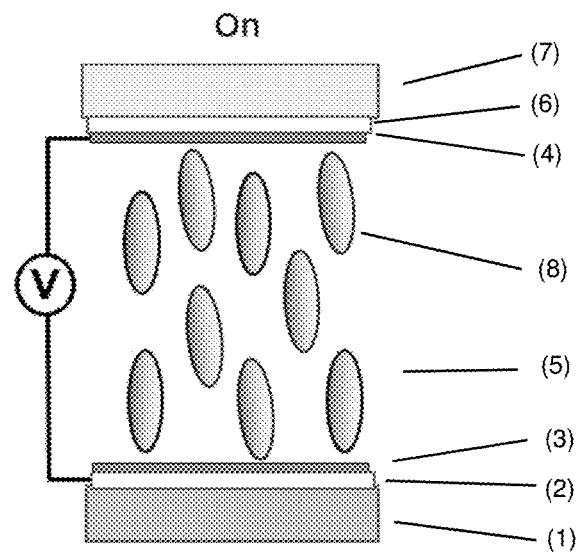

FIG. 1a and FIG. 1b schematically and exemplarily illustrate an LCOS display according to the present invention, comprising a silicon-containing, e.g. CMOS, backplane (1), a reflective coating (2), preferably in the shape of a pixel array, first (3) and second (4) alignment layers, providing e.g. planar alignment, a layer (5) of an LC medium with positive dielectric anisotropy as defined above and below, a transparent, e.g. ITO, electrode layer (6), and a transparent substrate (7) e.g. of glass or transparent plastic.

In the non-addressed or off-state (a), i.e. with no voltage applied, the LC molecules (8) of the LC layer (5) exhibit a planar, twisted nematic alignment (induced by the chiral dopant). In the addressed or on-state (b), i.e. upon application of a voltage, the LC molecules (8) reorient into vertical alignment.

In the LC media and displays according to the present invention, a chiral dopant is added to the LC medium to form a spontaneous twist in order to manage the light direction. The control of the twist angle and thus the pitch length is important to prevent under/over twist and to reach the best optical performance.

The threshold voltage (Vth) of the 900 TN-LCD is given by the equation (1) wherein pitch>λ (wavelength of light propagating inside a LC material):

$$V_{th} = \pi \sqrt{\frac{K_{11} + 0.25(K_{33} - 2K_{21}) + 2K_{22}/(p/d)}{\varepsilon_0 \Delta\varepsilon}} \quad (1)$$

Here the (p/d) ratio represent the chiral pitch-to-cell gap, Δε and γ1 represent the dielectric anisotropy and rotational viscosity; K11, K22, K33 represent elastic constants of the splay, twist, and bend deformations respectively.

From equation (1) above it follows that a shorter pitch will lead to a right shift of the VT curve, whereas a longer pitch will lead to a left shift of the VT curve with better contrast ratio. However, a longer pitch will also increase the risk of disclination lines appearing, caused by weak domain direction.

The chiral dopants are preferably selected from the group consisting of compounds from Table C below, very preferably from the group consisting of R- or S-1011, R- or S-2011, R- or S-3011, R- or S-4011, and R- or S-5011:

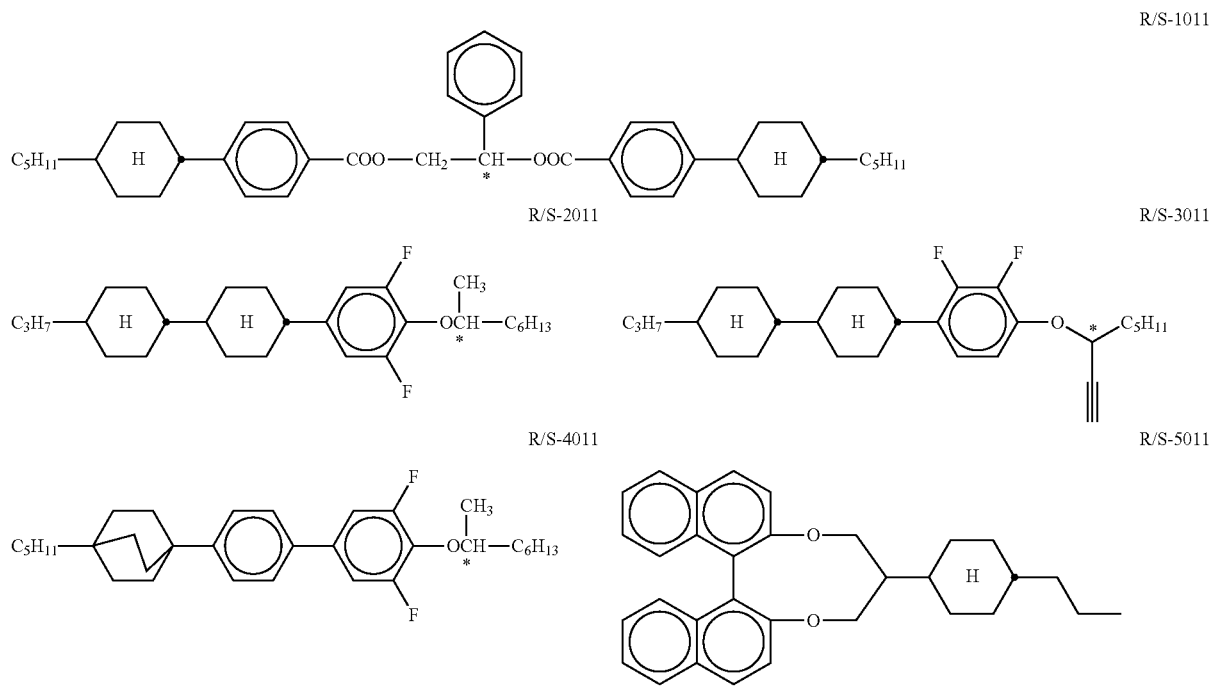

Very preferred are chiral dopants of formula S-4011.

Preferably the LC medium contains one or two, more preferably one, chiral dopants, in a concentration from 0.01 to 1% by weight, preferably in a concentration from 0.1 to 0.72%, more preferably from 0.2 to 0.72% by weight and very preferably from 0.35 to 0.72% by weight.

The helical twisting power and amount of the chiral dopant in the LC medium are preferably selected such that the ratio d/p in the display according to the present invention preferably from 0.015 to 0.2, more preferably from 0.03 to 0.2, and very preferably from 0.05 to 0.2.

Preferably the twist angle of the helical twist induced in the LC medium by the chiral dopants (before applying a voltage) is from 60 to 120°, more preferably from 80 to 100°, very preferably 90°.

Preferably the pitch of the helical twist induced in the LC medium by the chiral dopants is from 15 to 100 μm, more preferably from 15 to 50 μm, and very preferably from 15 to 30 μm.

Preferably the ratio d/p in a display according to the present invention is from 0.015 to 0.2, more preferably from 0.03 to 0.2, most preferably from 0.05 to 0.2.

In the compounds of formula I $R^1$ and $R^2$ are preferably selected from ethyl, propyl, butyl and pentyl, all of which are straight-chain.

Preferably the LC medium comprises one or more compounds of formula I selected from the group consisting of the following subformulae

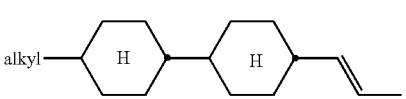

Ia

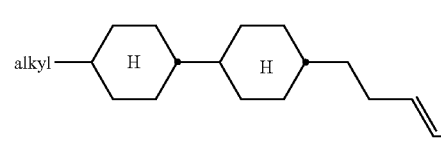

Ib wherein "alkyl" has the meaning given in formula I and preferably denotes $C_2H_5$, n-$C_3H_7$, n-$C_4H_9$ or n-$C_5H_{11}$, in particular n-$C_3H_7$.

Very preferably the LC medium comprises one or more compounds of formula I selected from the group consisting of the following subformulae:

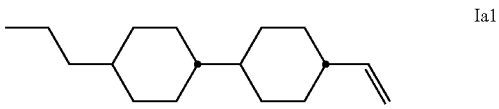

Ia1

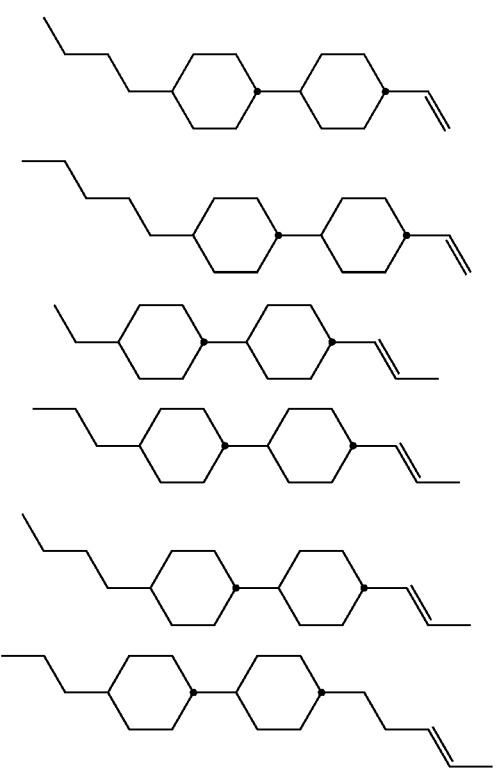

Very preferred are compounds of formula Ia1, Ib1 and Ic1.

The concentration of the compounds of formula I and its subformulae in the LC medium is preferably from 15 to 70%, very preferably from 20 to 60%.

Preferably the LC medium contains 1, 2 or 3 compounds of formula I or its subformulae.

In the compounds of formulae II and III and their subformulae $R^0$ preferably denotes straight-chain alkyl having 1 to 6 C atoms, in particular methyl, ethyl or propyl, furthermore alkenyl having 2 to 6 C atoms, in particular vinyl, 1E-propenyl, 1E-butenyl, 3-butenyl, 1E-pentenyl, 3E-pentenyl or 4-pentenyl.

Preferably the LC medium comprises one or more compounds of formula II wherein $Y^0$ is H, preferably selected from the group consisting of the following subformulae

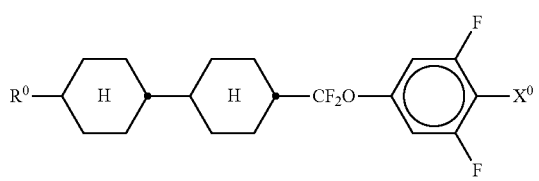

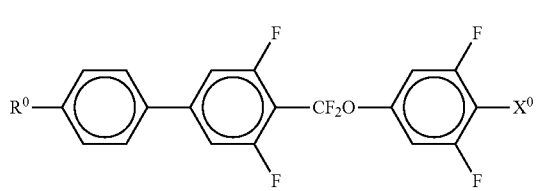

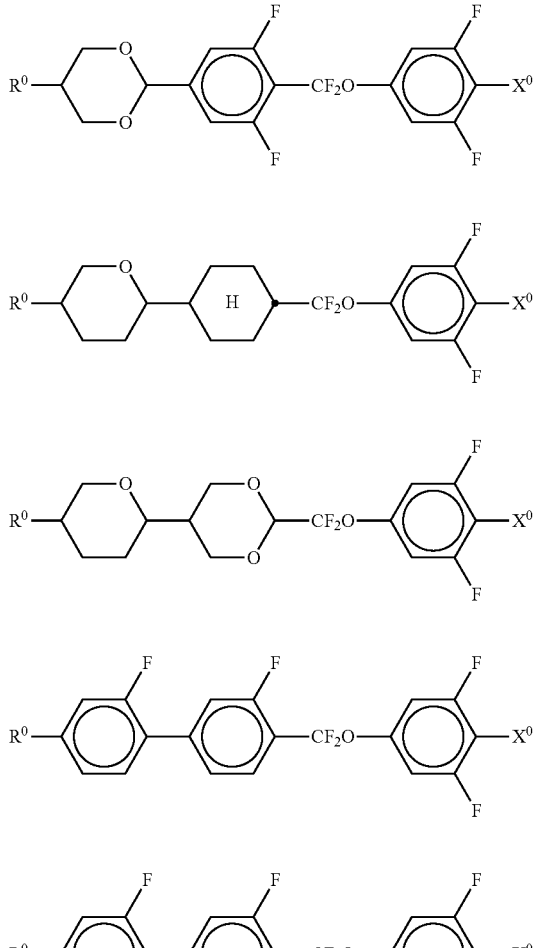

in which $R^0$ and $X^0$ have the meanings given above.

Preferred compounds are those of formula II1, II2 and II3, very preferred those of formula II1 and II2.

In the compounds of formulae II1 to II7 $R^0$ preferably denotes alkyl having 1 to 6 C atoms, very preferably ethyl or propyl, and $X^0$ preferably denotes F or $OCF_3$, very preferably F.

In another preferred embodiment the LC medium comprises one or more compounds of formula II wherein $Y^0$ is $CH_3$, preferably selected from the group consisting of the following subformulae

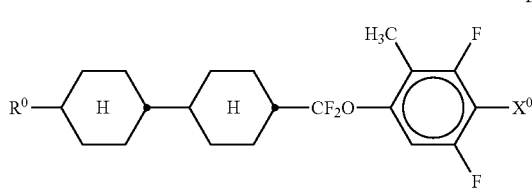

IIA2
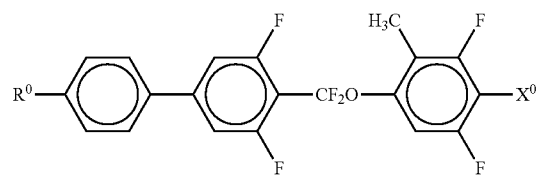

III1
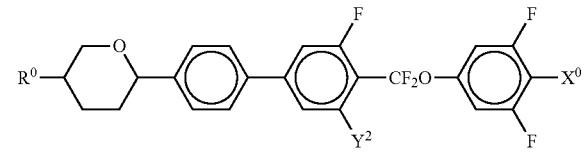

IIA3
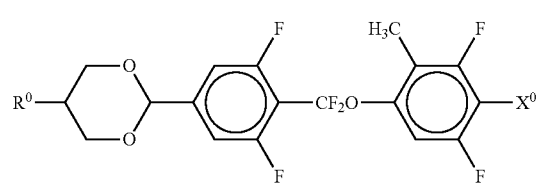

III2
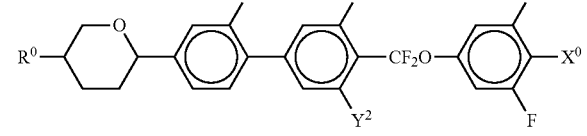

IIA4
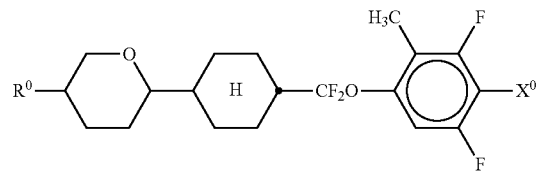

III3
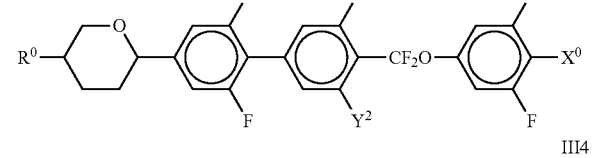

IIA5
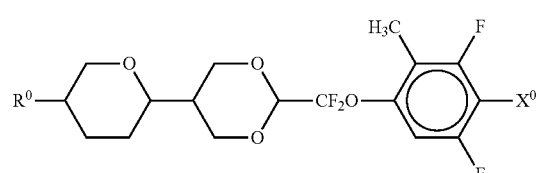

III4
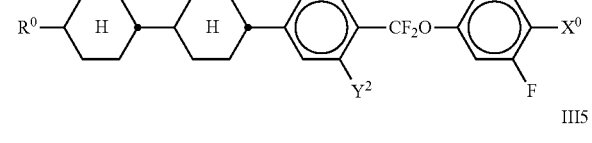

III5
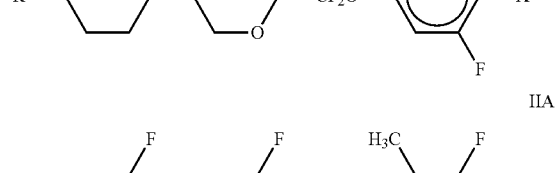

IIA6
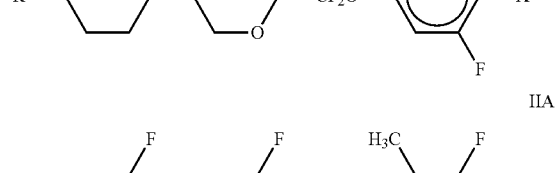

III6
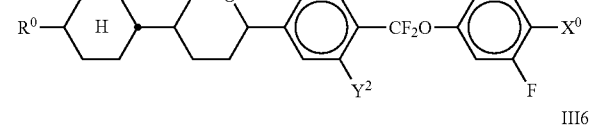

IIA7
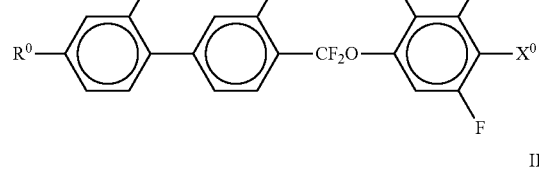

III7
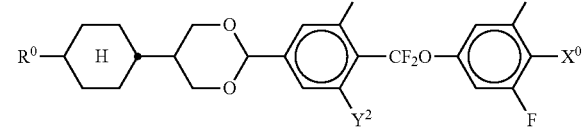

III8
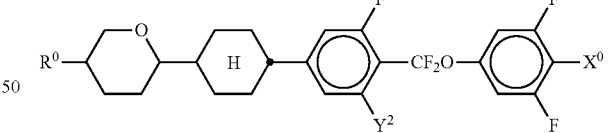

in which $R^0$ and $X^0$ have the meanings given above.

Preferred compounds are those of formula IIA1, IIA2 and IIA3, very preferred those of formula IIA1 and IIA2.

In the compounds of formulae IIA1 to IIA7 $R^0$ preferably denotes alkyl having 1 to 6 C atoms, very preferably ethyl or propyl, and $X^0$ preferably denotes F or $OCF_3$, very preferably F.

Further preferably the LC medium comprises one or more compounds of formula III wherein $Y^0$ is H, preferably selected from the group consisting of the following subformulae III9
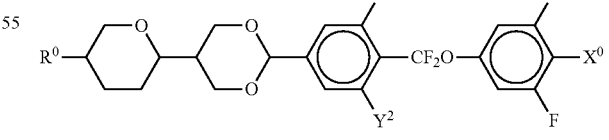

III10
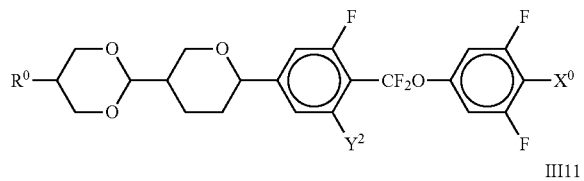

III11
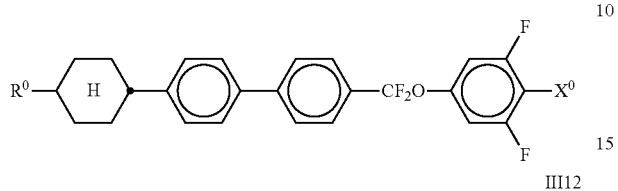

III12
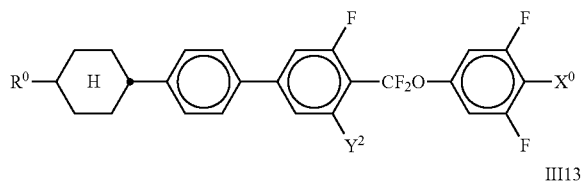

III13
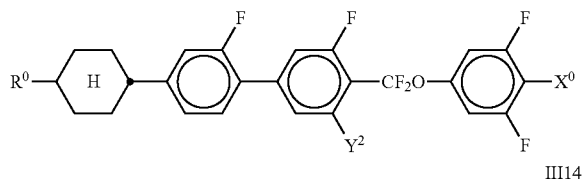

III14
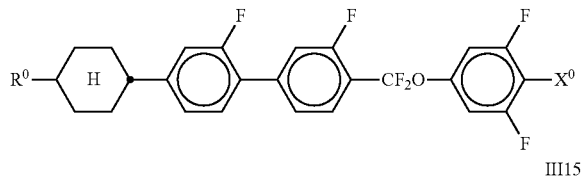

III15
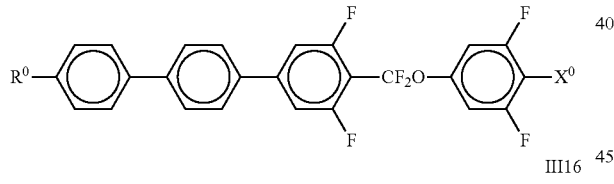

III16
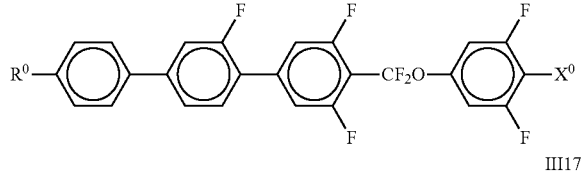

III17
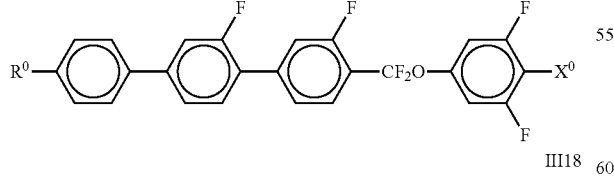

III18
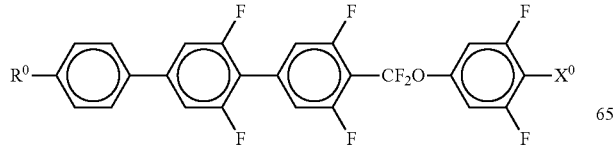

III19
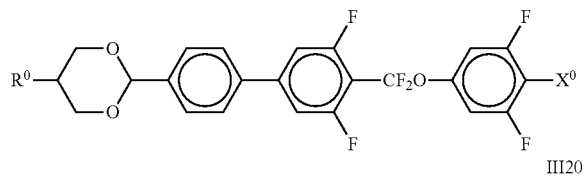

III20
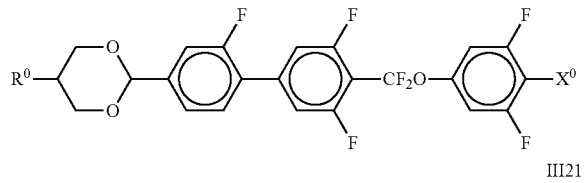

III21
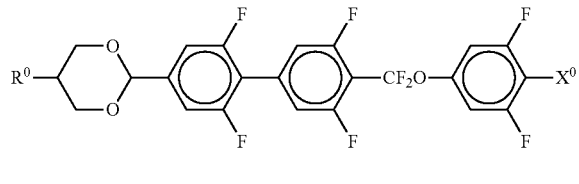

in which $R^0$ and $X^0$ have the meanings given above.

Preferred compounds are those of formula III1, III4, III6, III16, III19 and III20.

In the compounds of formulae III1 to III21 $R^0$ preferably denotes alkyl having 1 to 6 C atoms, very preferably ethyl or propyl, $X^0$ preferably denotes F or $OCF_3$, very preferably F, and $Y^2$ preferably denotes F.

In another preferred embodiment the LC medium comprises one or more compounds of formula III wherein $Y^0$ is $CH_3$, preferably selected from the group consisting of the following subformulae IIIA1
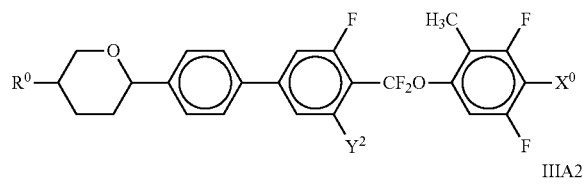

IIIA2
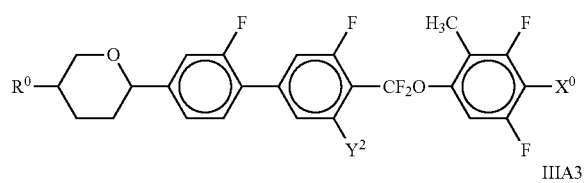

IIIA3
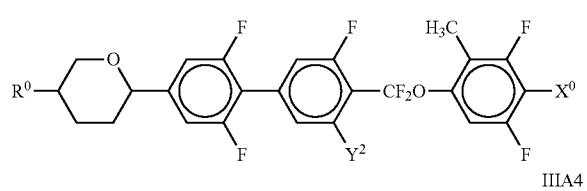

IIIA4
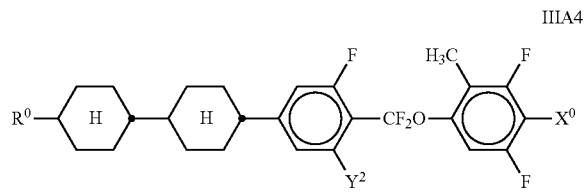

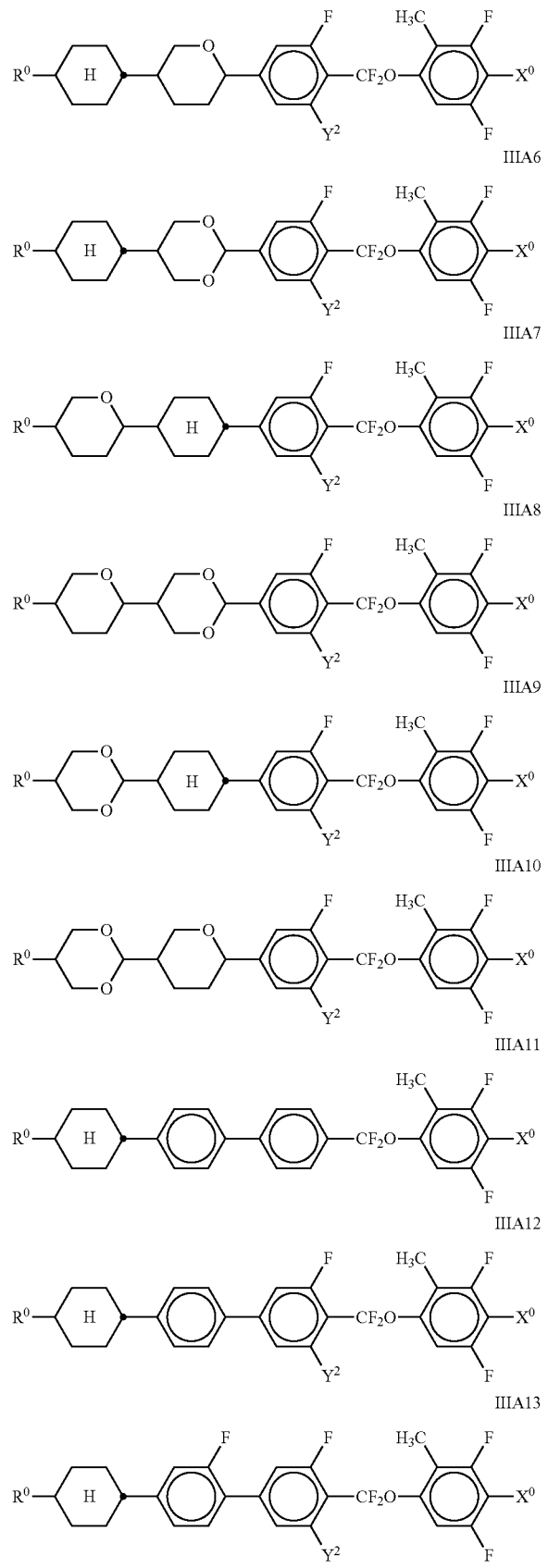
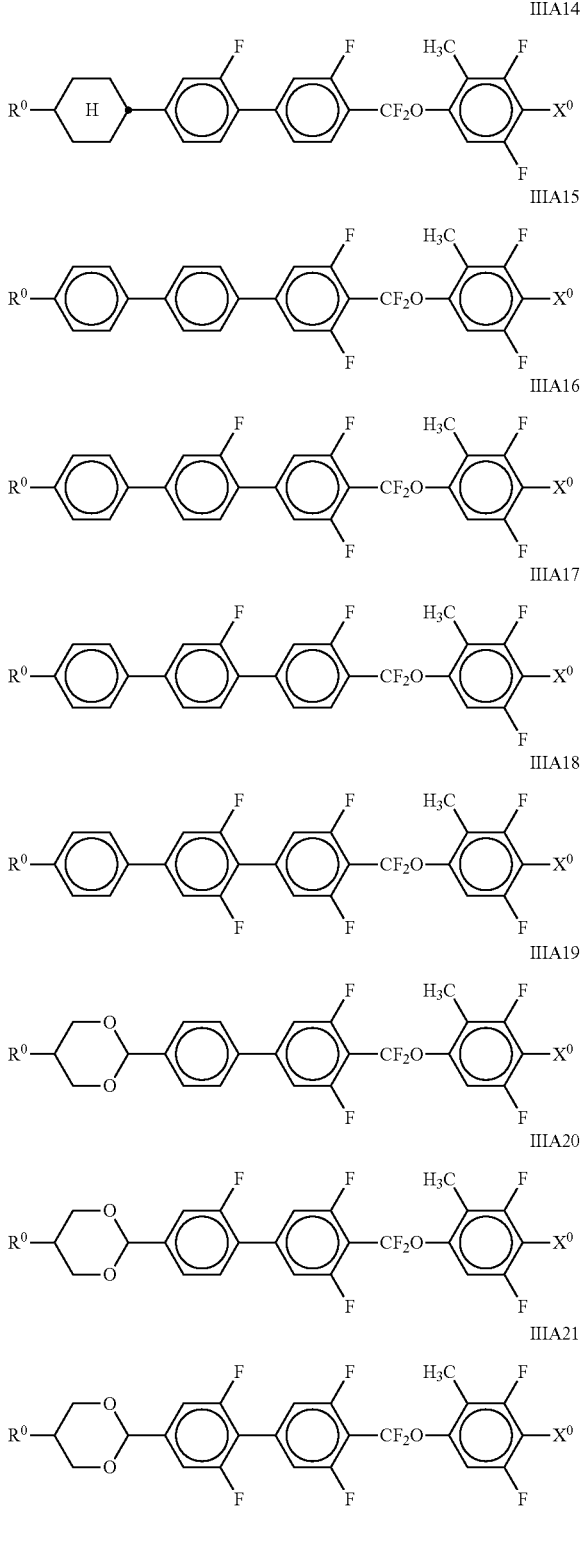
in which R⁰ and X⁰ have the meanings given above
Preferred compounds are those of formula IIIA1, IIIA4, IIIA6, IIIA16, IIIA19 and IIIA20.
In the compounds of formulae IIIA1 to IIIA21 $R^0$ preferably denotes alkyl having 1 to 6 C atoms, very preferably ethyl or propyl, $X^0$ preferably denotes F or $OCF_3$, very preferably F, and $Y^2$ preferably denotes F.

The concentration of an individual compound of formula II and its subformulae in the LC medium is preferably from 1 to 15% by weight. The total concentration of the compounds of formula II in the LC medium is preferably from 5 to 25% by weight.

The concentration of an individual compound of formula III in the LC medium s is preferably from 1 to 15% by weight. The total concentration of the compounds of formula III is preferably from 2 to 25% by weight.

Preferably the LC medium contains 1 to 8 compounds of formula II and/or formula III or their subformulae.

Preferably the LC medium contains at least one compound of formula II or its subformulae and at least one compound of formula II or its subformulae.

Further preferred embodiments are indicated below, including any combination thereof:

The medium additionally comprises one or more compounds selected from the following formulae:

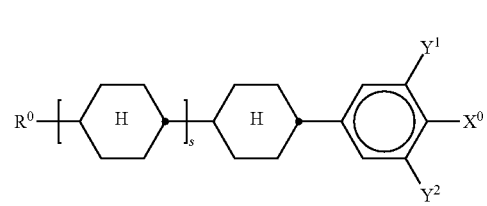

IV

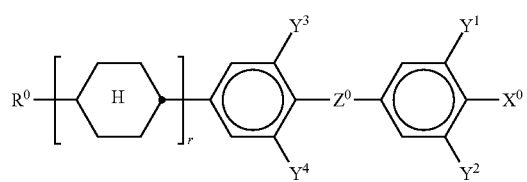

V

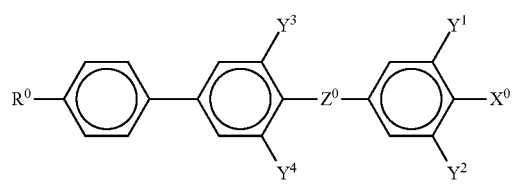

VI

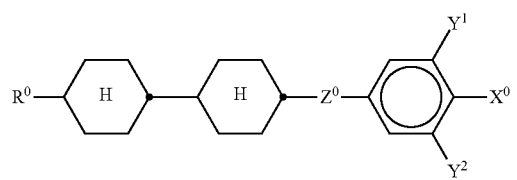

VII

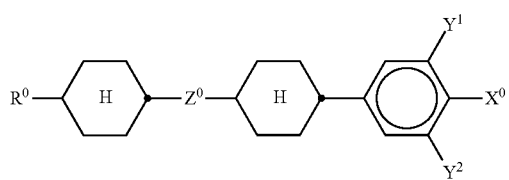

VIII in which
R⁰, X⁰ and Y¹⁻⁴ have the meanings indicated above, and Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—,
r denotes 0 or 1, and
s denotes 0 or 1;

The medium comprises one or more compounds of the formula IV selected from the following subformulae:

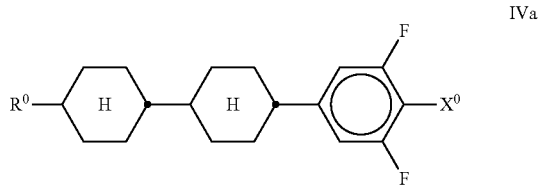

IVa

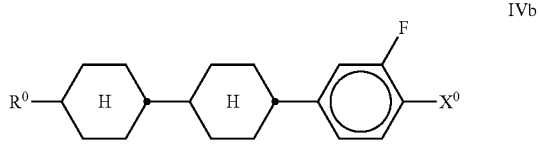

IVb

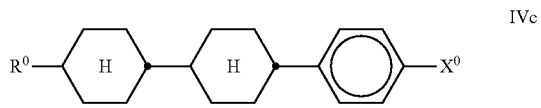

IVc

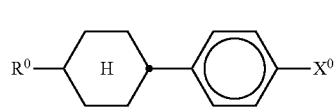

IVd in which R⁰ and X⁰ have the meanings indicated above.

R⁰ preferably denotes alkyl having 1 to 6 C atoms. X⁰ preferably denotes F or OCF₃, furthermore OCF=CF₂ or Cl;

The medium comprises one or more compounds of the formula IVa selected from the following subformula:

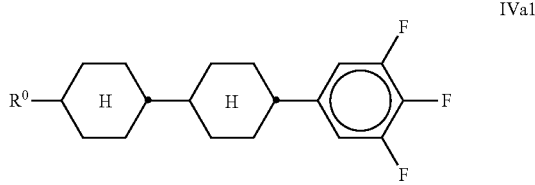

IVa1 in which R⁰ has the meanings indicated above and is preferably propyl or pentyl.

The medium comprises one or more compounds of the formula IVc selected from the following subformula:

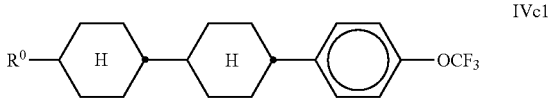

IVc1 in which R⁰ has the meanings indicated above and is preferably propyl or pentyl.

The medium comprises one or more compounds of the formula V selected from the following subformulae:

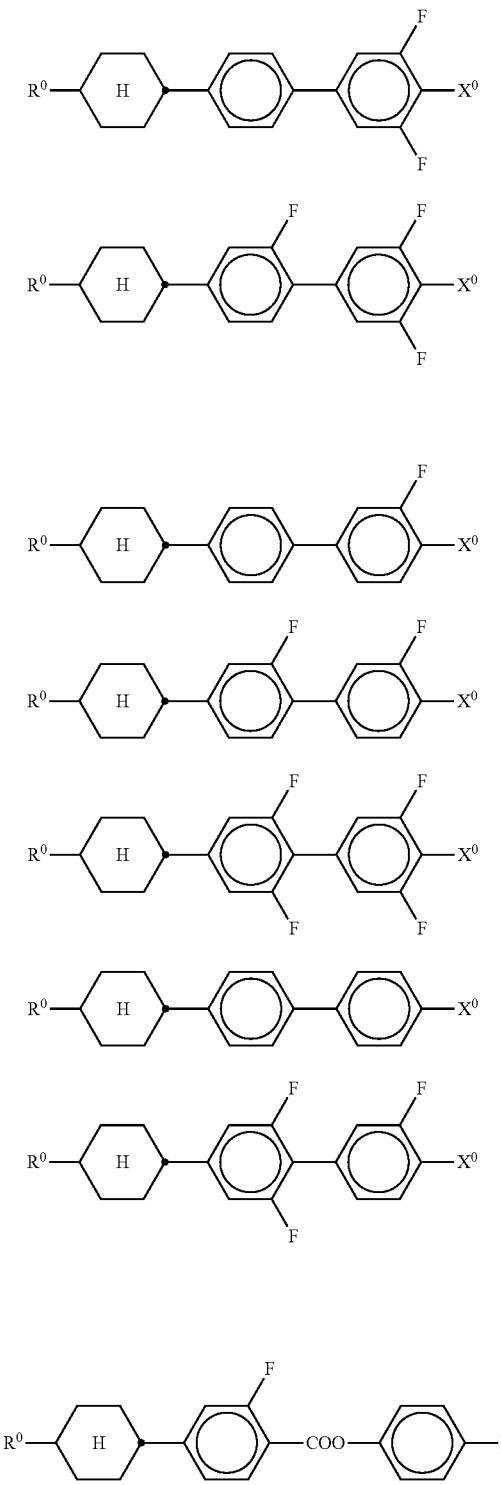

in which $R^0$ and $X^0$ have the meanings indicated above. $R^0$ preferably denotes alkyl having 1 to 6 C atoms. $X^0$ preferably denotes F and $OCF_3$, furthermore $OCHF_2$, $CF_3$, $OCF=CF_2$ and $OCH=CF_2$;

The medium comprises one or more compounds of the formula VI selected from the following subformulae:

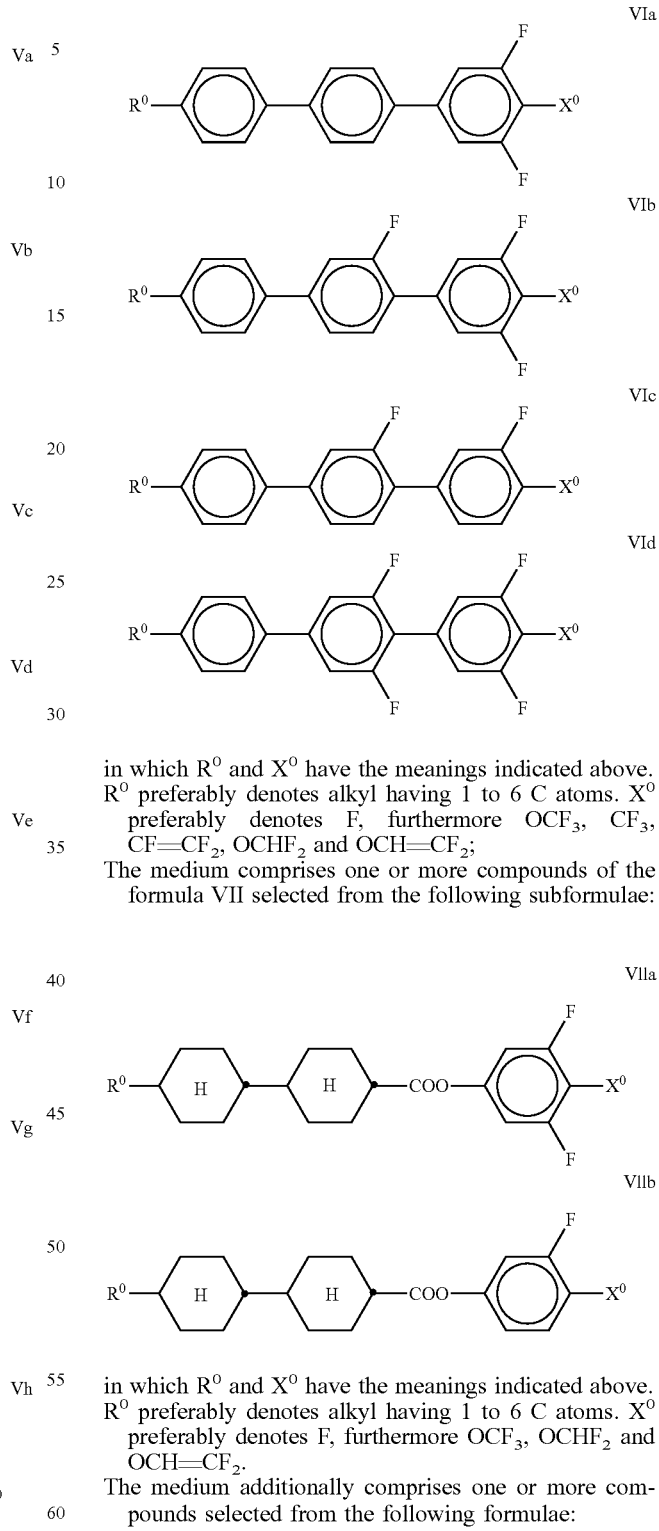

in which $R^0$ and $X^0$ have the meanings indicated above. $R^0$ preferably denotes alkyl having 1 to 6 C atoms. $X^0$ preferably denotes F, furthermore $OCF_3$, $CF_3$, $CF=CF_2$, $OCHF_2$ and $OCH=CF_2$;

The medium comprises one or more compounds of the formula VII selected from the following subformulae:

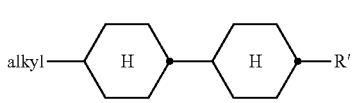

in which $R^0$ and $X^0$ have the meanings indicated above. $R^0$ preferably denotes alkyl having 1 to 6 C atoms. $X^0$ preferably denotes F, furthermore $OCF_3$, $OCHF_2$ and $OCH=CF_2$.

The medium additionally comprises one or more compounds selected from the following formulae:

IX alkyl—⟨H⟩—⟨H⟩—R'

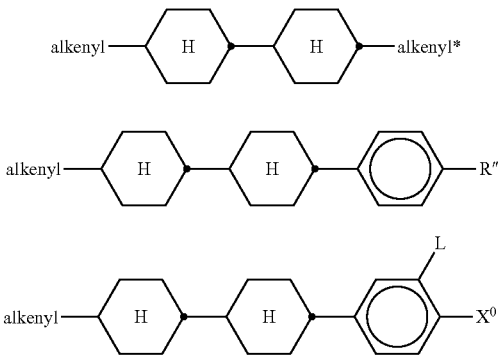

in which X⁰ has the meanings indicated above, and
L denotes H or F,
"alkyl" denotes $C_{1-6}$-alkyl,
R' denotes $C_{1-6}$-alkyl or $C_{1-6}$-alkoxy
R" denotes $C_{1-6}$-alkyl, $C_{1-6}$-alkoxy or $C_{2-6}$-alkenyl, and
"alkenyl" and "alkenyl*" each, independently of one another, denote $C_{2-6}$-alkenyl.

The medium comprises one or more compounds of formulae IX-XII selected from the following subformulae:

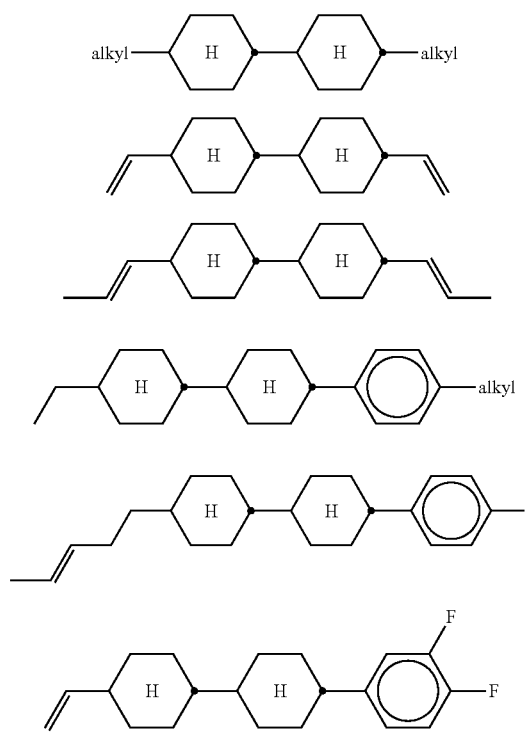

wherein "alkyl" has the meanings given above.

Particular preference is given to the compounds of the formulae IXa, IXb, IXc, Xa, Xb, XIa and XIIa. In the formula IXa the groups "alkyl" preferably, independently of one another, denote $C_2H_5$, $n-C_3H_7$, $n-C_4H_9$ or $n-C_5H_{11}$, very preferably $C_2H_5$ or $n-C_3H_7$. In the formulae XIa and XIb "alkyl" preferably denotes $CH_3$, $C_2H_5$ or $n-C_3H_7$, very preferably $CH_3$.

The medium comprises one or more compounds of formulae IX-XII selected from the following subformulae;

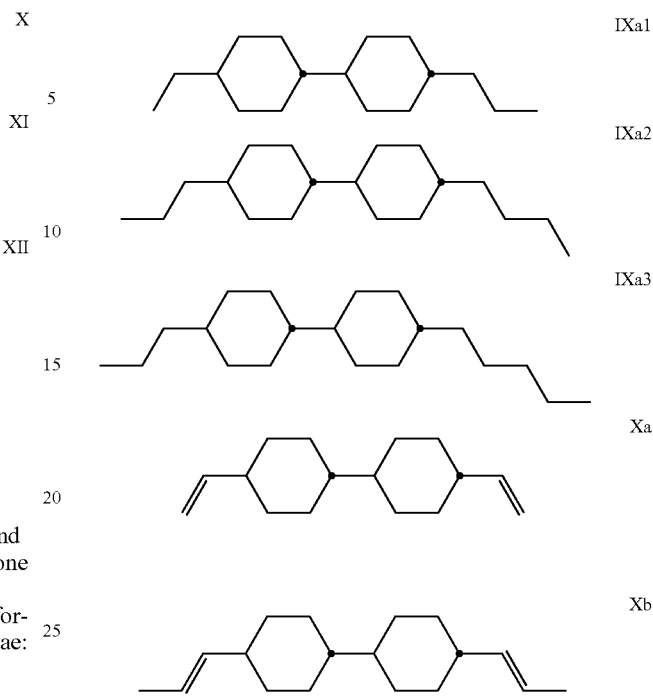

The medium comprises one or more compounds of the following formula:

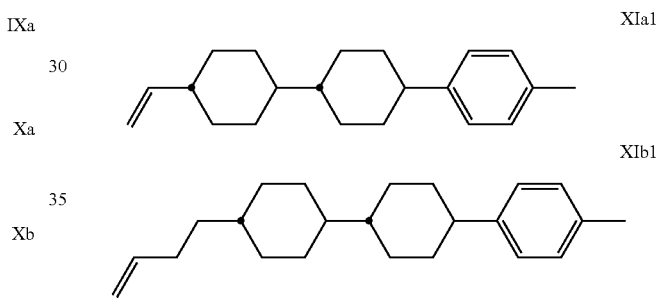

in which $L^1$ and $L^2$ denote independently of one another H or F, in which $R^1$ and $R^2$ independently of each other denote alkyl or alkoxy having 1 to 6 C atoms or alkenyl having 2 to 6 C atoms.

Preferred compounds of formula XIII are those wherein $L^1$ and $L^2$ are H.

Further preferred compounds of formula XIII are those wherein $L^1$ and $L^2$ are F.

Further preferred compounds of formula XIII are those wherein $R^1$ is alkyl with 1 to 6 C atoms, preferably methyl, ethyl or propyl, and $R^2$ is alkoxy with 1 to 6 C atoms, preferably methoxy, ethoxy or propoxy.

The medium comprises one or more compounds of the following formula:

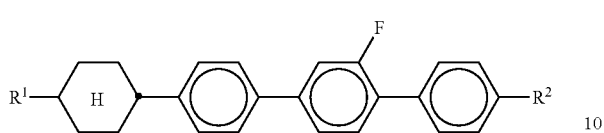
XIV in which $R^1$ and $R^2$ independently of each other denote alkyl having 1 to 6 C atoms.

Preferred compounds of the formula XIV are selected from the following subformulae.

XIV1

XIV2

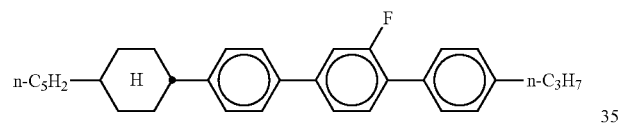
XIV3

Very preferred are compounds of formula XIV2.

The medium additionally comprises one or more compounds selected from the following formula:

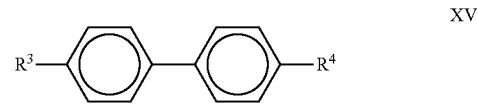
XV in which $R^3$ and $R^4$ each, independently of one another, denote n-alkyl, alkoxy, oxaalkyl, fluoroalkyl or alkenyl, each having up to 6 C atoms, and preferably each, independently of one another, denote alkyl having 1 to 6 C atoms or alkenyl having 2 to 6 C atoms.

The medium comprises one or more compounds of the formula XV selected from the following subformulae:

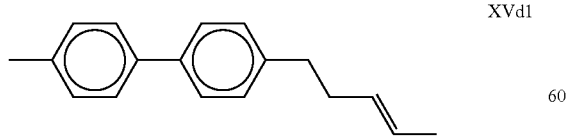
XVd1 in which "alkyl" has the meaning indicated above, and preferably denotes methyl, ethyl or propyl.

The medium comprises one or more compounds of the formula XV selected from the following subformulae:

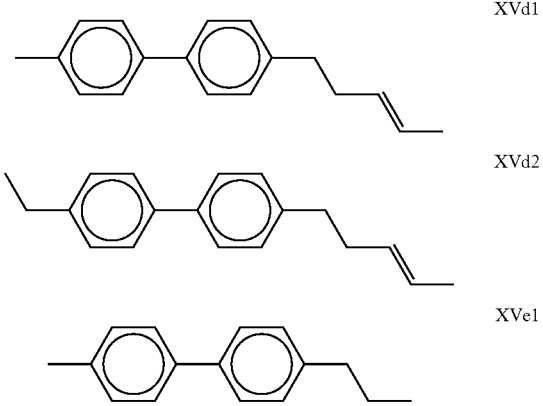
XVd1

XVd2

XVe1

Very preferred are compounds of formula XVd1 and XVe1.

The medium comprises one or more compounds of the formula XVI,

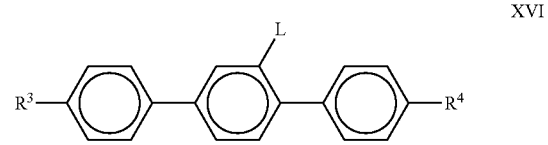
XVI in which L, $R^3$ and $R^4$ have the meanings indicated above and preferably each, independently of one another, denote alkyl having 1 to 6 C atoms.

Particularly preferred compounds of the formula XVI are those of the sub-formulae

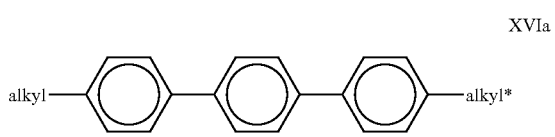
XVIa

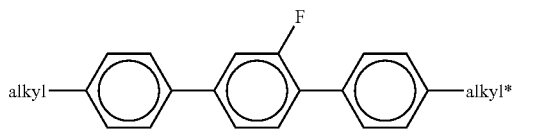
XVIb

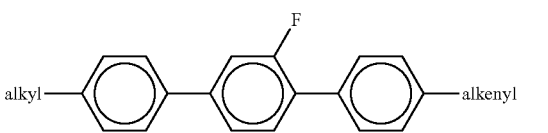
XVIc

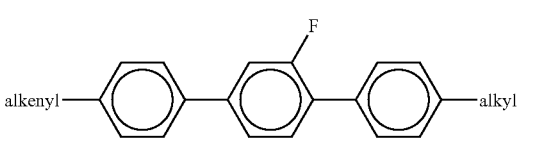
XVId

XVIe
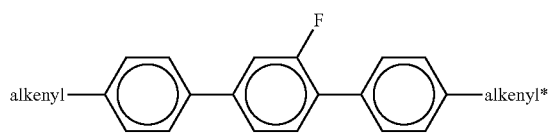

XVIf

XVIg
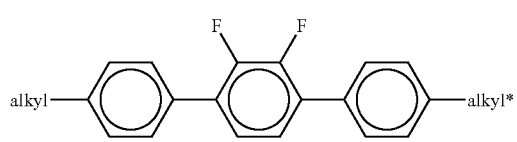

in which alkyl and alkyl* each, independently of one another, denote a straight-chain alkyl radical having 1-6 C atoms, in particular ethyl, propyl or pentyl, alkenyl and alkenyl* each, independently of one another, denote a straight-chain alkenyl radical having 2-6 C atoms, in particular $CH_2=CHC_2H_4$, $CH_3CH=CHC_2H_4$, $CH_2=CH$ and $CH_3CH=CH$.

Particular preference is given to the compounds of the formulae XVIb, XVIc and XVIg. Very particular preference is given to the compounds of the formulae XVIb1
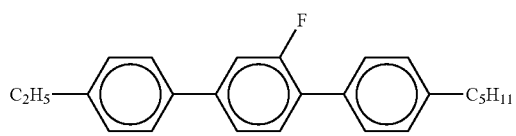

XVIb2
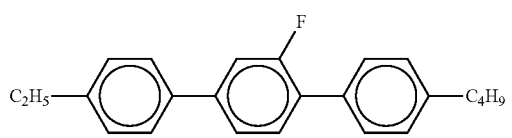

XVIb3
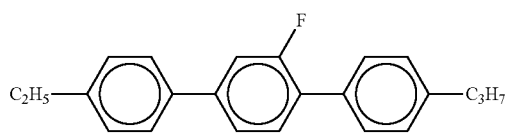

XVIc1
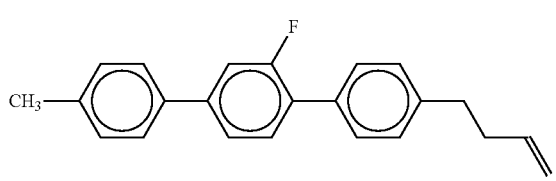

XVIc2
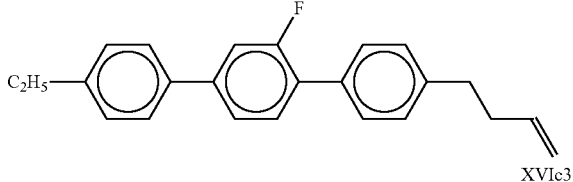

XVIc3
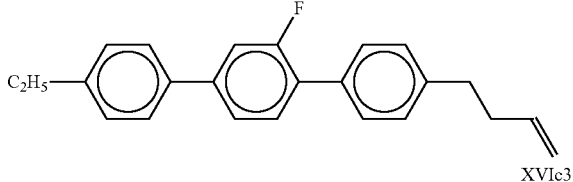

XVIg1
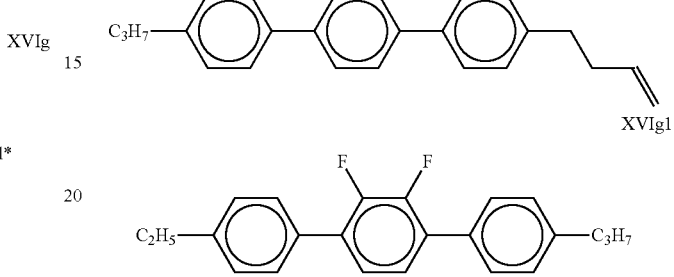

XVIg2
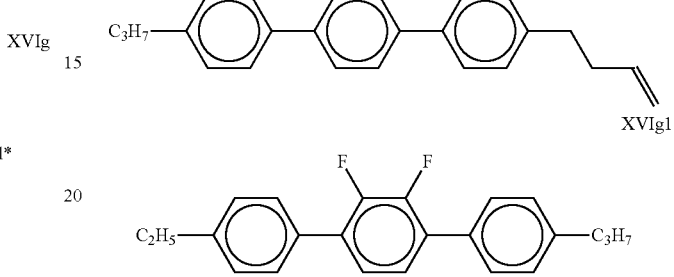

Very preferred are compounds of formula XVIc2, XVIg1 and XVIg2;

The medium comprises one or more compounds of the following formula:

XVII
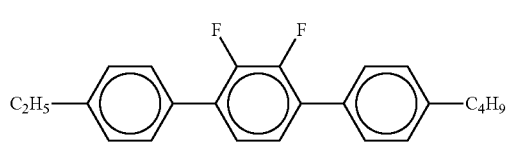

in which $R^3$ and $R^4$ have the meanings indicated above and preferably each, independently of one another, denote alkyl having 1 to 6 C atoms. L denotes H or F;

The medium additionally comprises one or more compounds selected from the following formulae:

XVIII
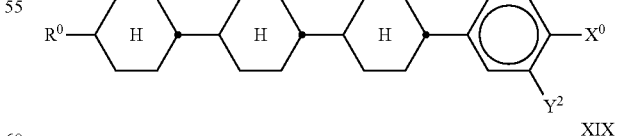

XIX
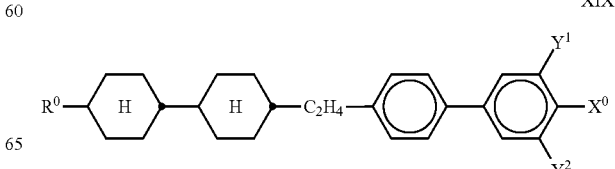

-continued

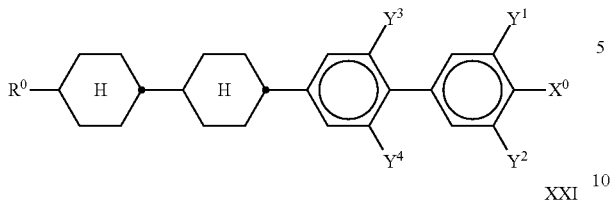

XX

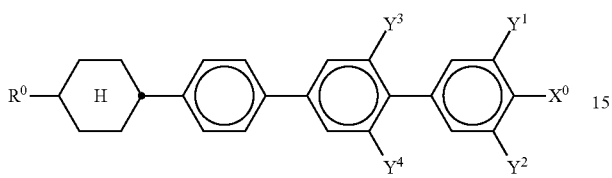

XXI

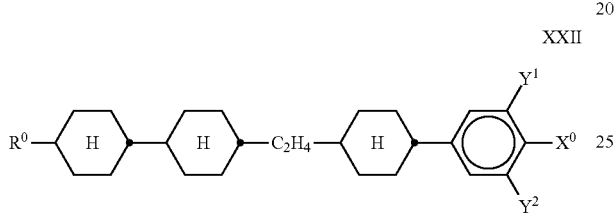

XXII

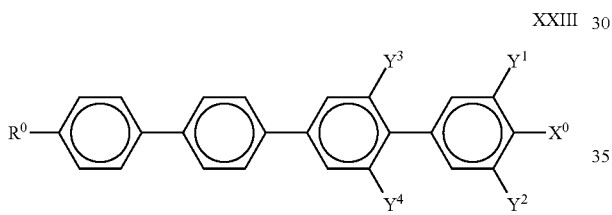

XXIII in which $R^0$ and $X^0$ each, independently of one another, have one of the meanings indicated above, and $Y^{1-4}$ each, independently of one another, denote H or F. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 6 C atoms.

Very preferably the mixture according to the invention comprises one or more compounds of the formula XXIa,

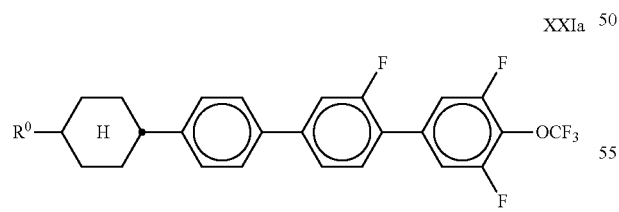

XXIa in which $R^0$ has the meanings indicated above. $R^0$ preferably denotes straight-chain alkyl, in particular ethyl, n-propyl, n-butyl and n-pentyl and very particularly preferably n-propyl. The compound(s) of the formula XXI, in particular of the formula XXIa, is (are) preferably employed in the mixtures according to the invention in amounts of 1-15% by weight, particularly preferably 2-10% by weight.

Further preferably the mixture according to the invention comprises one or more compounds of the formula XXIIIa,

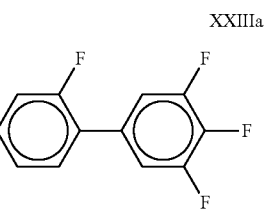

XXIIIa in which $R^0$ has the meanings indicated above. $R^0$ preferably denotes straight-chain alkyl, in particular ethyl, n-propyl, n-butyl and n-pentyl and very particularly preferably n-propyl. The compound(s) of the formula XXIII, in particular of the formula XXIIIa, is (are) preferably employed in the mixtures according to the invention in amounts of 0.5-10% by weight, particularly preferably 0.5-5% by weight.

The medium additionally comprises one or more compounds of the formula XXIV,

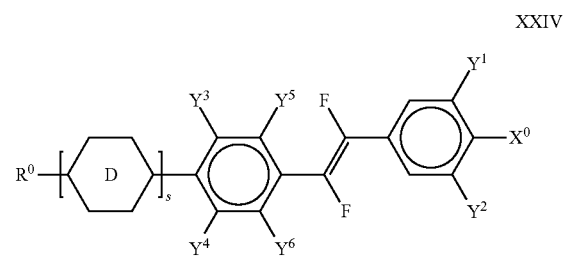

XXIV in which $R^0$, $X^0$ and $Y^{1-6}$ have the meanings indicated in formula I, s denotes 0 or 1, and

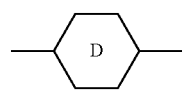

denotes

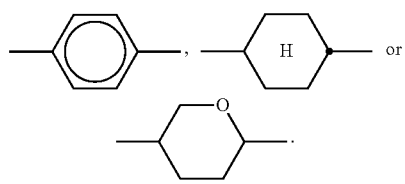

In the formula XXIV, $X^0$ may also denote an alkyl radical having 1-6 C atoms or an alkoxy radical having 1-6 C atoms. The alkyl or alkoxy radical is preferably straight-chain.

$R^0$ preferably denotes alkyl having 1 to 6 C atoms. $X^0$ preferably denotes F;

The compounds of the formula XXIV are preferably selected from the following formulae:

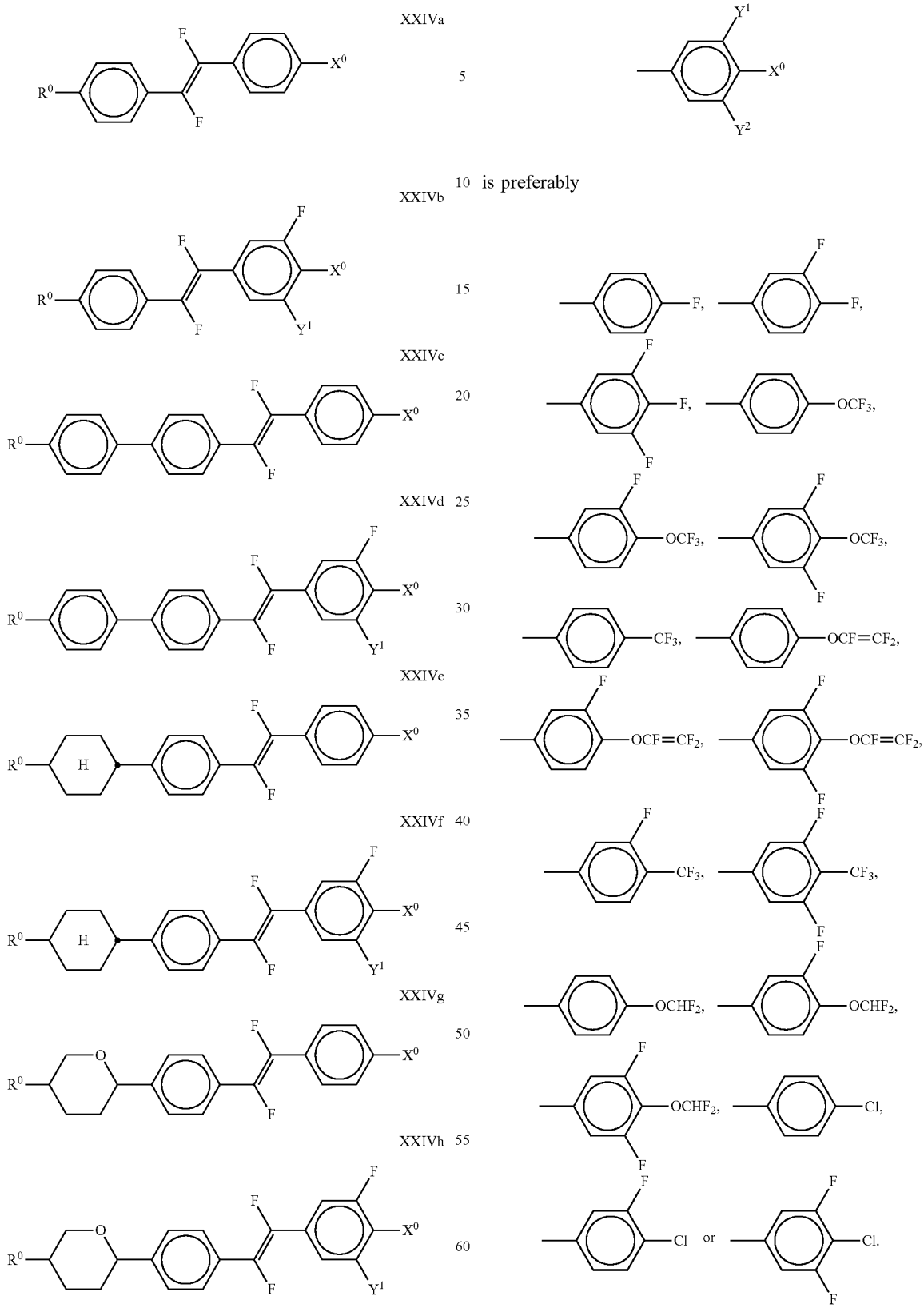
in which $R^0$, $X^0$ and $Y^1$ have the meanings indicated above. $R^0$ preferably denotes alkyl having 1 to 6 C atoms. $X^0$ preferably denotes F, and $Y^1$ is preferably F;
$R^0$ is straight-chain alkyl or alkenyl having 2 to 6 C atoms;
The medium comprises one or more compounds of the following formulae:

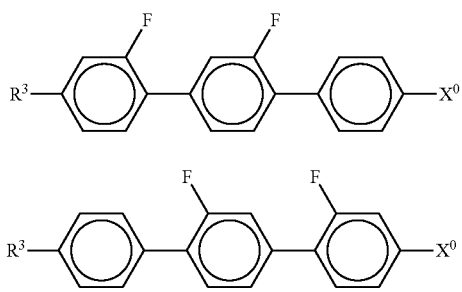

XXV

XXVI in which R³ and X⁰ have the meanings indicated above. R³ preferably denotes alkyl having 1 to 6 C atoms. X⁰ preferably denotes F or Cl. In the formula XXIV, X⁰ very particularly preferably denotes Cl.

The medium comprises one or more compounds of the following formulae:

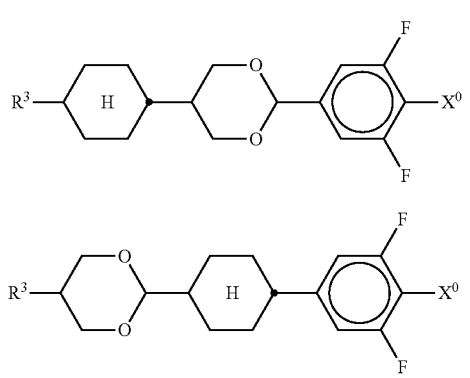

XXVII

XXVIII

XXIX in which R³ and X⁰ have the meanings indicated above. R³ preferably denotes alkyl having 1 to 6 C atoms. X⁰ preferably denotes F. The medium according to the invention particularly preferably comprises one or more compounds of the formula XXIX in which X⁰ preferably denotes F. The compound(s) of the formulae XXVI-XXIX is (are) preferably employed in the mixtures according to the invention in amounts of 1-20% by weight, particularly preferably 1-15% by weight. Particularly preferred mixtures comprise at least one compound of the formula XXIX.

Very preferably the mixture according to the invention comprises one or more compounds of the formula XXIXa,

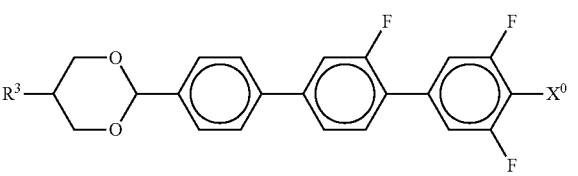

XXIXa in which R³ has the meanings indicated above, and preferably denotes straight-chain alkyl, in particular ethyl, n-propyl, n-butyl and n-pentyl and very particularly preferably n-propyl. The compound(s) of the formula XXIXa is (are) preferably employed in the mixtures according to the invention in amounts of 1-15% by weight, particularly preferably 2-10% by weight.

The medium comprises one or more compounds of the following formula

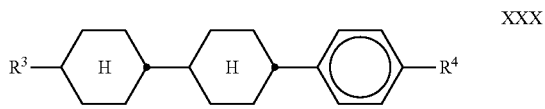

XXX in which R³ and R⁴ have the meanings indicated above, and preferably denote, independently of one another, alkyl having 1 to 6 C atoms, very preferably methyl, ethyl or n-propyl.

Preferred compounds of formula XXX are those of formula XXXa

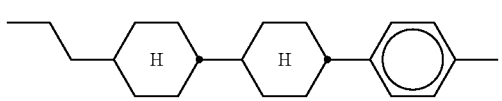

XXXa

The medium comprises one or more compounds of the following formula

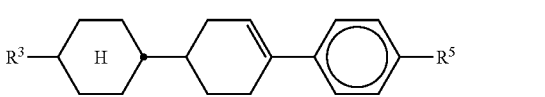

XXXI in which R³ has the meanings indicated above, and R⁵ has one of the meanings of R⁴ or X⁰ as given above.

R³ preferably denotes alkyl having 1 to 6 C atoms, very preferably methyl, ethyl or n-propyl, or alkenyl having 2 to 6 C atoms, very preferably vinyl. R⁵ preferably denotes alkyl having 1 to 6 C atoms, very preferably methyl, ethyl or n-propyl, or trifluoromethyl or trifluoromethoxy.

Preferred compounds of formula XXXI are selected from the group consisting of the following subformulae

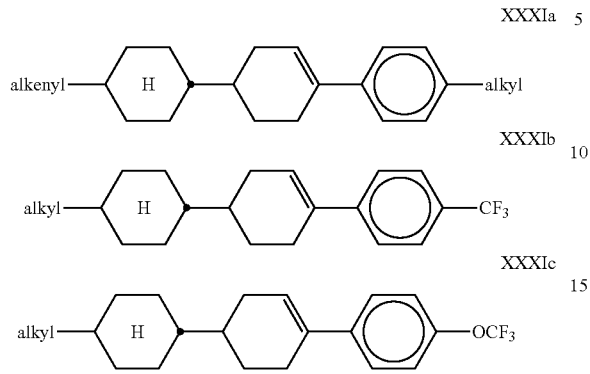

wherein alkyl and alkenyl have the meanings given above.

Very preferred compounds of formula XXXI are selected from the group consisting of the following subformulae

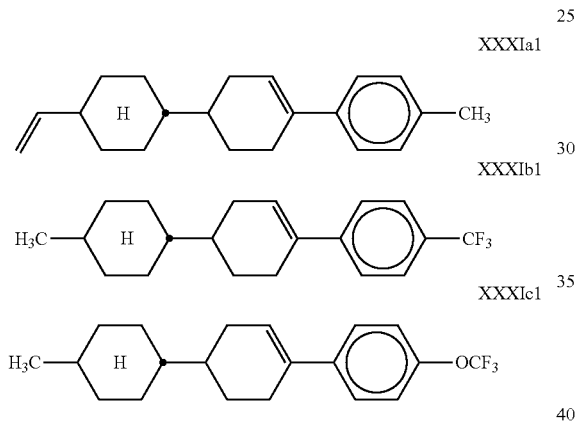

Further preferred LC media are selected from the following preferred embodiments, including any combination thereof:

The medium comprises one or more compounds of the formula IV, preferably selected from formulae IVa or IVc, very preferably from formula IVa1 or IVc1. The individual concentration of each of these compounds is preferably from 1 to 15% by weight. The total concentration of these compounds is preferably from 5 to 25% by weight.

The medium comprises one or more compounds of the formula IX, preferably selected from formulae IXa, very preferably from formulae IXa1 and IXa2. The individual concentration of each of these compounds is preferably from 1 to 15% by weight. The total concentration of these compounds is preferably from 5 to 25% by weight.

The medium comprises one or more compounds of the formula XI, preferably selected from formulae XIa and XIb. The individual concentration of each of these compounds is preferably from 1 to 20% by weight. The total concentration of these compounds is preferably from 5 to 25% by weight.

The medium comprises one or more compounds of the formula XII, preferably of formula XIIa. The total concentration of these compounds is preferably from 3 to 20% by weight.

The medium comprises one or more compounds of the formula XV, preferably selected from formulae formulae XVd and XVe, very preferably from formulae XVd1 and XVe1. The individual concentration of each of these compounds is preferably from 1 to 10% by weight. The total concentration of these compounds is preferably from 2 to 15% by weight.

The medium comprises one or more compounds of the formula XVIc, preferably of formula XVIc2. The concentration of these compounds is preferably from 1 to 15% by weight.

The medium comprises one or more compounds of the formula XVIg, preferably of the formula XVIg1 and/or XVIg2. The concentration of these compounds is preferably from 5 to 25% by weight.

The medium comprises one or more compounds of the formula XVIIa or XVIIb. The concentration of these compounds is preferably from 0.5 to 5% by weight.

The medium comprises one or more compounds of the formula XXI, preferably of the formula XXIa. The concentration of these compounds is preferably from 0.5 to 8% by weight.

The medium comprises one or more compounds of the formula XXIII, preferably of the formula XXIIIa. The concentration of these compounds is preferably from 0.5 to 5% by weight.

The medium comprises one or more compounds of the formula XXIX, preferably of the formula XXIXa. The concentration of these compounds is preferably from 2 to 10% by weight.

The medium comprises one or more compounds of the formula XXX, preferably of the formula XXXa. The concentration of these compounds is preferably from 2 to 10% by weight.

The medium comprises one or more compounds of the formula XXXI, preferably of the formula XXXIa and/or XXXIb. The concentration of these compounds is preferably from 2 to 10% by weight.

The medium comprises one or more compounds of formula I and one or more compounds selected from the group consisting of the formulae II, III, IV, IX, XI, XII, XV, XVI, XXI, XXIX and XXXI.

The medium comprises one or more compounds of formula I and one or more compounds selected from the group consisting of the formulae II1, II2, II3, III1, III4, III6, III16, III19, III20, IVa, IVc, IXa, IXb, XIa, XIb, XIIa, XVd, XVe, XVIc, XXIa, XXIXa and XXXIa.

The proportion of compounds of the formulae II, III, IV, IX, XI, XII, XV, XVI, XXI, XXIX and XXX in the mixture as a whole is 90 to 99% by weight.

The proportion of compounds of the formulae II1, II2, II3, III1, III4, III6, III16, III19, III20, IVa, IVc, IXa, IXb, XIa, XIb, XIIa, XVd, XVe, XVIc, XXIa, XXIXa and XXXIa in the mixture as a whole is 90 to 99% by weight.

The term "alkyl" or "alkyl*" in this application encompasses straight-chain and branched alkyl groups having 1-6 carbon atoms, in particular the straight-chain groups methyl, ethyl, propyl, butyl, pentyl and hexyl. Groups having 2-5 carbon atoms are generally preferred.

The term "alkenyl" or "alkenyl*" encompasses straight-chain and branched alkenyl groups having 2-6 carbon atoms, in particular the straight-chain groups. Preferred alkenyl groups are $C_2$-$C_7$-1E-alkenyl, $C_4$-$C_6$-3E-alkenyl, in particular $C_2$-$C_6$-1E-alkenyl. Examples of particularly preferred alkenyl groups are vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2=CH$, $CH_3CH=CH$.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $\Delta\epsilon$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the LC media according to the invention is not crucial. The mixtures can therefore comprise one or more further components for the purposes of optimisation of various properties. However, the observed effect on the desired improvement in the properties of the medium is generally greater, the higher the total concentration of compounds of the above-mentioned formulae.

In a particularly preferred embodiment, the LC media according to the invention comprise compounds of the formulae IV to VIII (preferably IV and V) in which $X^0$ denotes F, $OCF_3$, $OCHF_2$, $OCH=CF_2$, $OCF=CF_2$ or $OCF_2$—$CF_2H$. A favourable synergistic action with the compounds of the formulae IA, IIA, IB and IIB results in particularly advantageous properties. In particular, mixtures comprising compounds of the formulae IA or IIA and IB or IIB are distinguished by their low threshold voltage.

The individual compounds of the above-mentioned formulae and the subformulae thereof which can be used in the LC media according to the invention are either known or can be prepared analogously to the known compounds.

The invention also relates to electro-optical displays, such as, for example, TN or MLC displays, having two plane-parallel outer plates, which, together with a frame, form a cell, integrated non-linear elements for switching individual pixels on the outer plates, and a nematic LC mixture having positive dielectric anisotropy and high specific resistance located in the cell, wherein the a nematic LC mixture is an LC medium according to the present invention as described above and below.

The LC media according to the invention enable a significant broadening of the available parameter latitude. The achievable combinations of clearing point, viscosity at low temperature, thermal and UV stability and high optical anisotropy are far superior to previous materials from the prior art.

The LC media according to the invention are suitable for mobile applications and TFT applications, such as, for example, mobile telephones and PDAs.

Furthermore, the LC media according to the invention are particularly suitably for use in FFS and IPS displays.

The LC media according to the invention preferably retain the nematic phase down to −20° C. very preferably down to −30° C., most preferably down to −40° C. The LC media according to the invention preferably have a clearing point≥85° C., very preferably 95° C., most preferably 105° C.

The LC media according to the invention preferably have a rotational viscosity $\gamma_1$ of 130 mPa·s, very preferably 115 mPa·s, enabling excellent MLC displays having fast response times to be achieved. The rotational viscosities are determined at 20° C.

In a preferred embodiment, the dielectric anisotropy $\Delta\epsilon$ of the LC media according to the invention at 20° C. is preferably ≥+4, very preferably ≥+6, most preferably ≥+8.

The birefringence $\Delta n$ of the LC media according to the invention at 20° C. is preferably in the range of from 0.080 to 0.150, more preferably from 0.090 to 0.140, particularly preferably 0.100 to 0.130.

The nematic phase range of the LC media according to the invention preferably has a width of at least 100°, more preferably of at least 110° C., in particular at least 130°. This range preferably extends at least from −25° to +105° C.

It goes without saying that, through a suitable choice of the components of the LC media according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain LC media having a higher $\Delta\epsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of LC media comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that LC media according to the invention comprising compounds of the formulae ST-1, ST-2, RV, IA and IB exhibit a significantly smaller decrease in the HR on UV exposure than analogous mixtures comprising cyano-phenylcyclohexanes of the formula

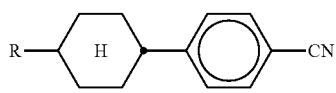

or esters of the formula

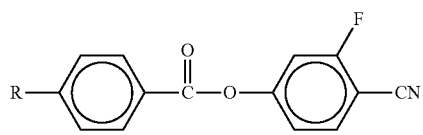

instead of the compounds of the formulae I ST-1, ST-2, RV, IA and IB.

The light stability and UV stability of the LC media according to the invention are considerably better, i.e. they exhibit a significantly smaller decrease in the HR on exposure to light, heat or UV.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the LC parameters of the LC layer.

The LC media which can be used in accordance with the invention are prepared in a manner conventional per se, for example by mixing one or more compounds of Claim 1 with one or more compounds of the formulae IV-XXXI or with further LC compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The LC media may also comprise further additives known to the person skilled in the art and described in the literature, such as, for example, polymerisation initiators, inhibitors, surface-active substances, light stabilisers, antioxidants, e.g. BHT, TEMPOL, microparticles, free-radical scavengers, nanoparticles, etc. For example, 0-15% of pleochroic dyes or chiral dopants or initiators like Irgacure651® or Irgacure907® can be added. Suitable stabilisers and dopants are mentioned below in Tables C and D.

In a preferred embodiment of the present invention the LC media contain one or more further stabilisers, preferably selected from the group consisting of the following formulae

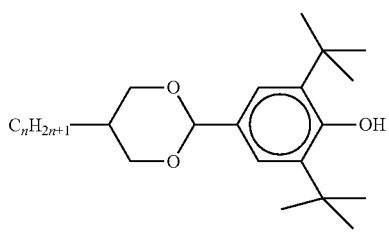

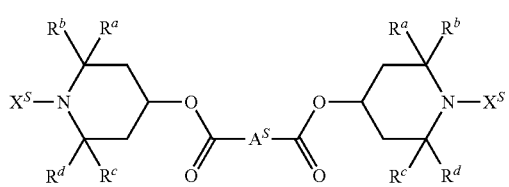

wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, CH$_3$, OH or O·, $A^S$ straight-chain, branched or cyclic alkylene with 1 to 20 C atoms which is optionally substituted, n an integer from 1 to 6, preferably 3.

Preferred stabilisers of formula S3 are selected from formula S3A

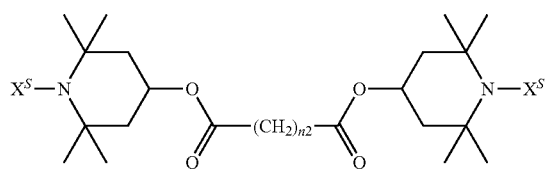

wherein n2 is an integer from 1 to 12, and wherein one or more H atoms in the group $(CH_2)_{n2}$ are optionally replaced by methyl, ethyl, propyl, butyl, pentyl or hexyl.

Very preferred stabilisers are selected from the group consisting of the following formulae

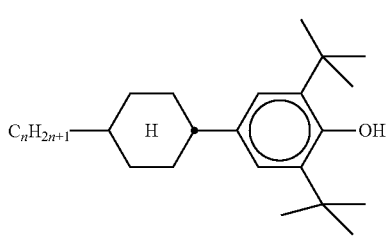

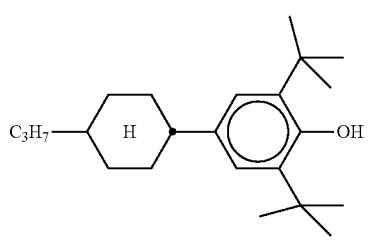

S2-1
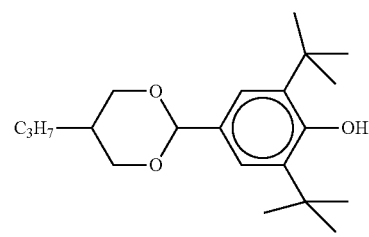
S3-1
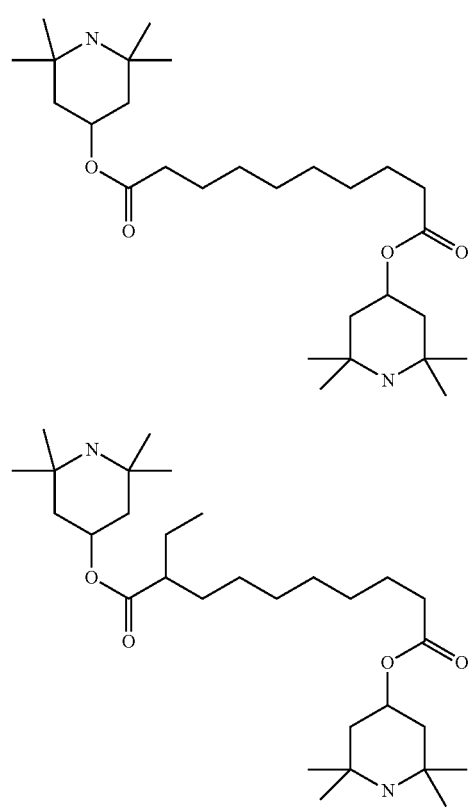
S3-2
S3-3
S3-4
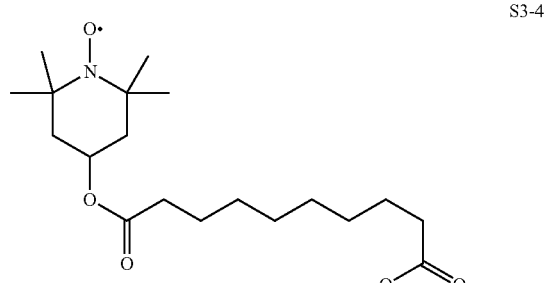
S3-5
S3-6
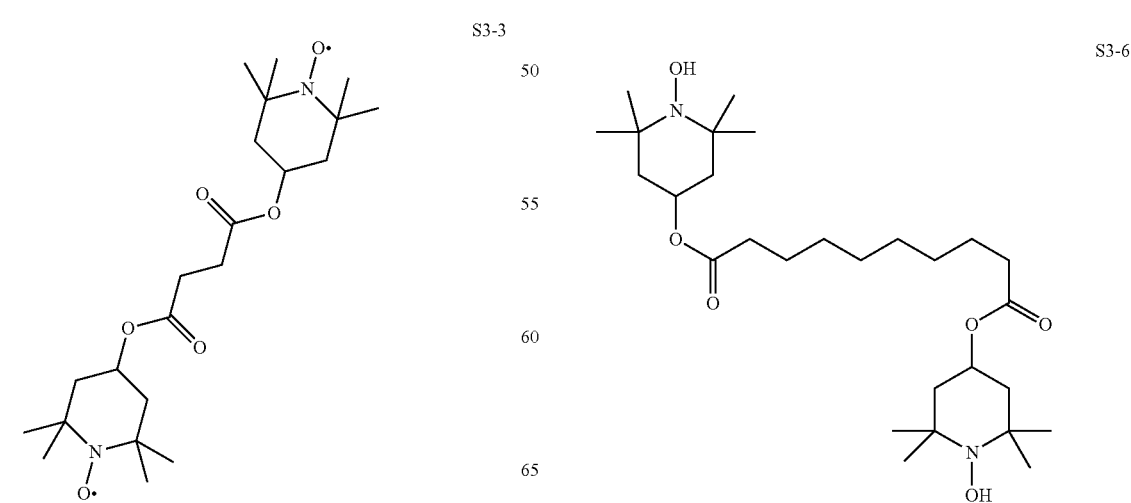

-continued

S3-7

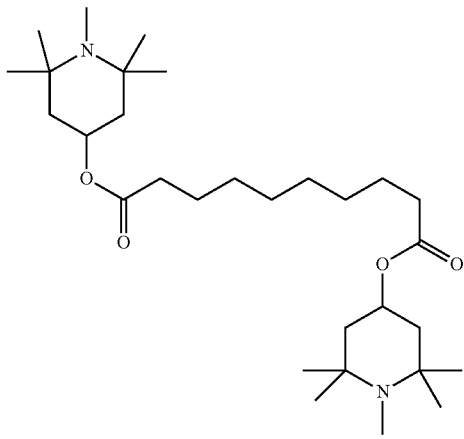

In a preferred embodiment the LC medium comprises one or more stabilisers selected from the group consisting of formulae S1-1, S2-1, S3-1, S3-1 and S3-3.

In a preferred embodiment the LC medium comprises one or more stabilisers selected from Table D.

Preferably the proportion of stabilisers, like those of formula S1-S3, in the LC medium is from 10 to 500 ppm, very preferably from 20 to 100 ppm.

In another preferred embodiment an LC medium contains one or more polymerisable compounds, preferably selected from polymerizable mesogenic compounds. These LC media are suitable for use in displays of the polymer stabilized (PS) mode, like the PS-TN mode.

Another preferred embodiment of the present invention thus relates to a PS-TN display comprising an LC medium as described above and below.

Preferably the LC medium according to this preferred embodiment contains one or more polymerisable compounds of formula M

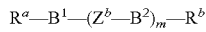

$R^a\text{—}B^1\text{—}(Z^b\text{—}B^2)_m\text{—}R^b$  M in which the individual radicals, on each occurrence identically or differently, and each, independently of one another, have the following meaning:

$R^a$ and $R^b$ P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —COO—, —O—CO—, —O—CO—O— in such a way that O and/or S atoms are not linked directly to one another, and in which, in addition, one or more H atoms may be replaced by F, C, Br, I, CN, P or P-Sp-, where, if B$^1$ and/or B$^2$ contain a saturated C atom, R$^a$ and/or R$^b$ may also denote a radical which is spiro-linked to this saturated C atom, wherein at least one of the radicals R$^a$ and R$^b$ denotes or contains a group P or P-Sp-, P a polymerizable group, Sp a spacer group or a single bond, B$^1$ and B$^2$ an aromatic, heteroaromatic, alicyclic or heterocyclic group, preferably having 4 to 25 ring atoms, which may also contain fused rings, and which is unsubstituted, or mono- or polysubstituted by L, Z$^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, R$^0$ and R$^{00}$ each, independently of one another, denote H or alkyl having 1 to 12 C atoms, m denotes 0, 1, 2, 3 or 4, n1 denotes 1, 2, 3 or 4, L P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, C, P or P-Sp-, Y$^1$ denotes halogen, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that 0 and/or S atoms are not linked directly to one another, and in which, in addition, one or more H atoms may be replaced by F, C, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula M are those in which B$^1$ and B$^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by 0 and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which B$^1$ and B$^2$ each, independently of one another, denote 1,4-phenylene, 1,3-phenylene, naphthalene-1,4-diyl or naphthalene-2,6-diyl.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups P are selected from the group consisting of CH$_2$=CW$^1$—CO—O—,

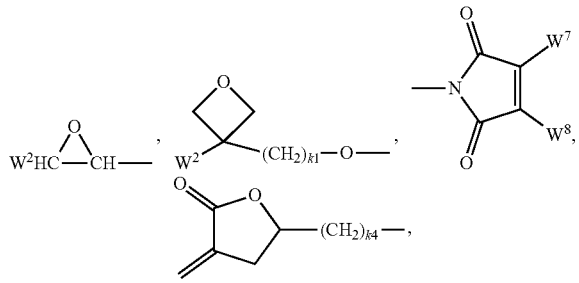

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, k$_1$, k$_2$ and k$_3$ each, independently of one another, denote 0 or 1, k$_3$ preferably denotes 1, and k$_4$ denotes an integer from 1 to 10.

Very preferred groups P are selected from the group consisting of CH$_2$=CW$^1$—CO—O—,

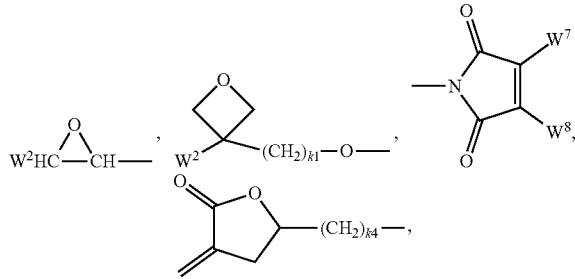

CH$_2$=CW$^2$—O—, CH$_2$=CW$^2$—, CW$^1$=CH—CO—(O)$_{k3}$—, CW$^1$=CH—CO—NH—, CH$_2$=CW$^1$—CO—NH—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe(O)$_{k2}$—, Phe-CH=CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, k$_1$, k$_2$ and k$_3$ each, independently of one another, denote 0 or 1, k$_3$ preferably denotes 1, and k$_4$ denotes an integer from 1 to 10.

Very particularly preferred groups P are selected from the group consisting of CH$_2$=CW$^1$—CO—O—, in particular CH$_2$=CH—CO—O—, CH$_2$=C(CH$_3$)—CO—O— and CH$_2$=CF—CO—O—, furthermore CH$_2$=CH—O—, (CH$_2$=CH)$_2$CH—O—CO—, (CH$_2$=CH)$_2$CH—O—,

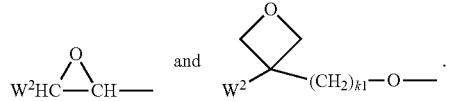

Further preferred polymerizable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent CH$_2$ groups may each be replaced, independently of one another, by —O—, —S—, —NH—, —N(RO)—, —Si(R$^0$R$^{00}$)—, —CO—, —CO—O—, —O—CO—, —O—CO—O—, —S—CO—, —CO—S—, —N(R$^{00}$)—CO—O—, —O—CO—N(R$^0$)—, —N(R$^0$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^0$)—, —N(R$^0$)—CO—, —N(R$^0$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —O—CO—CH=CH— or a single bond, R$^0$ and R$^{00}$ each, independently of one another, denote H or alkyl having 1 to 20 C atoms, and Y$^2$ and Y$^3$ each, independently of one another, denote H, F, Cl or CN.

X" is preferably —O—, —S—, —CO—, —COO—, —OCO—, —O—COO—, —CO—NR$^0$—, —NR$^0$—CO—, —NR$^0$—CO—NR$^{00}$— or a single bond.

Typical spacer groups Sp and -Sp"-X"— are, for example, —(CH$_2$)$_{p1}$—, —(CH$_2$CH$_2$O)$_{p1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the meanings indicated above.

Particularly preferred groups Sp and -Sp"-X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.
Very preferred compounds of formula M are selected from the following formulae:
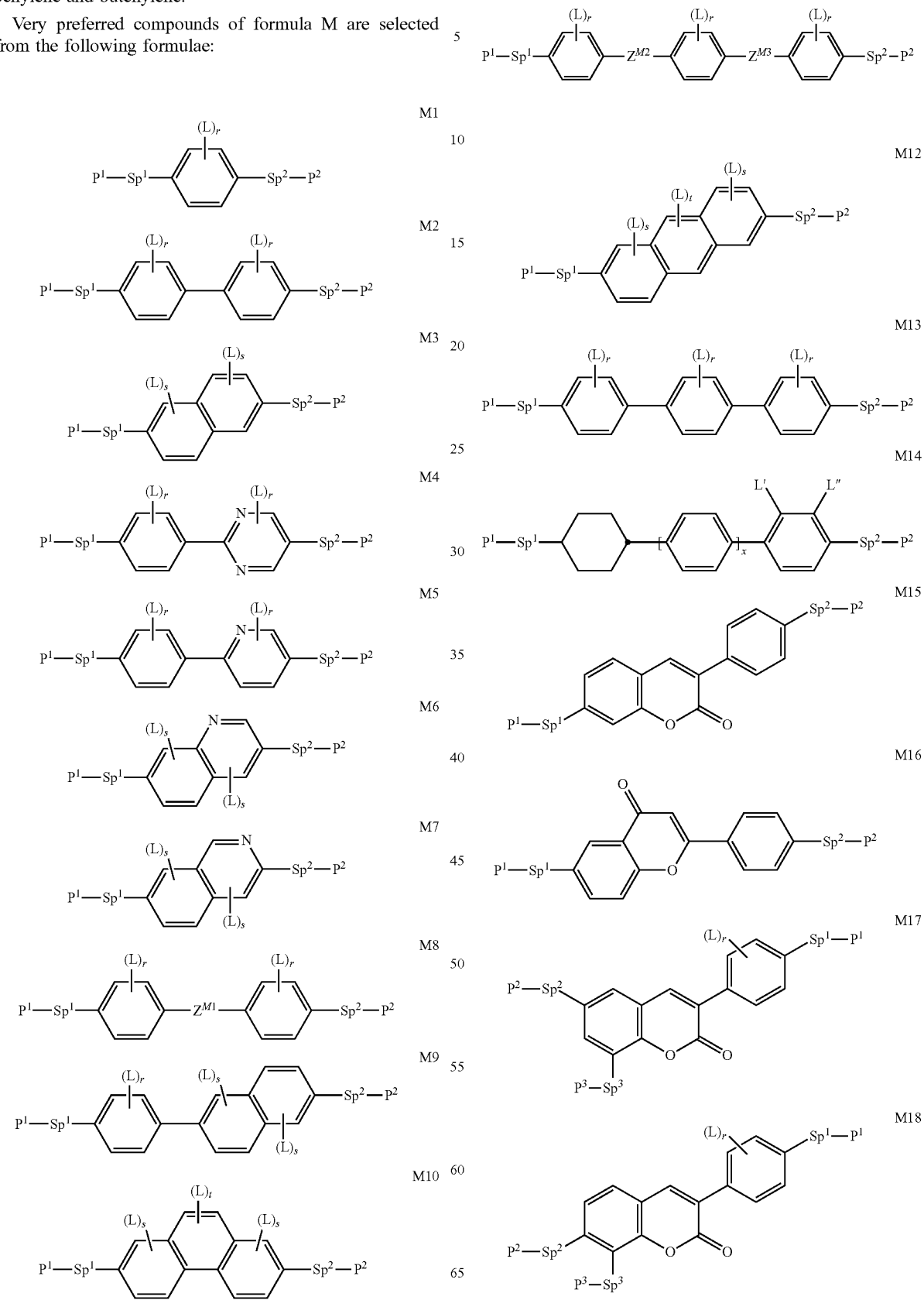

-continued

M19
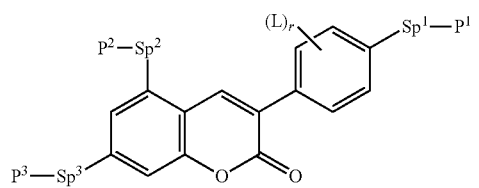

M20
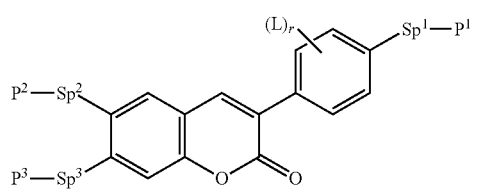

M21
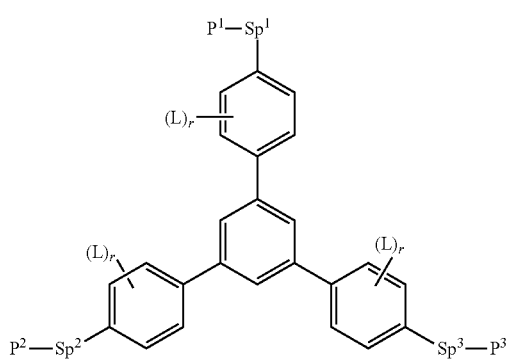

M22
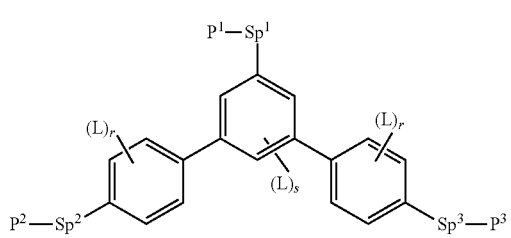

M23
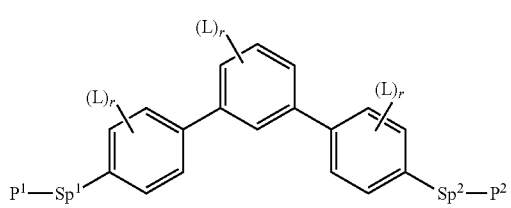

M24
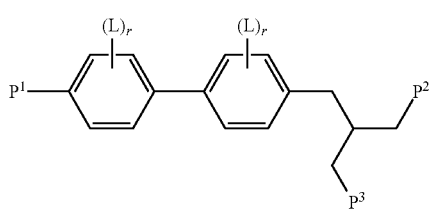

M25
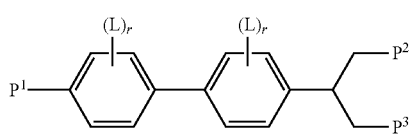

-continued

M26
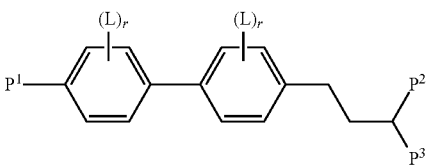

M27
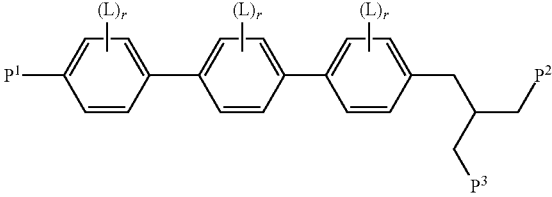

M28
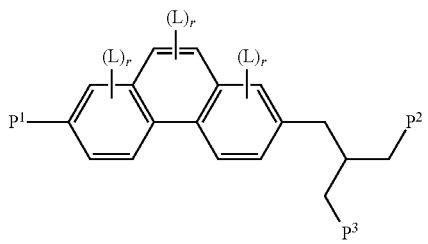

M29
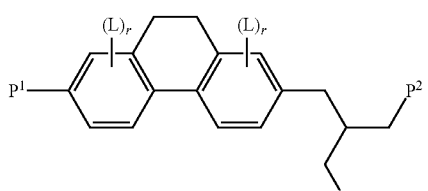

M30

M31

M32
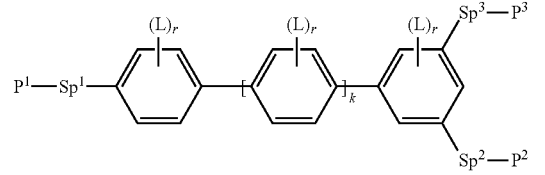
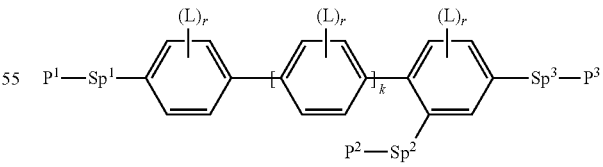

in which the individual radicals, on each occurrence identically or differently, and each, independently of one another, have the following meaning:

$P^1$, $P^2$, $P^3$ a polymerisable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^1$-$Sp^2$- and P³-Sp³- may denote $R^{aa}$, with the proviso that at least one of the radicals P¹-Sp¹-, P²-Sp² and P³-Sp³- present is different from $R^{aa}$, preferably —(CH$_2$)$_{p1}$—, —(CH$_2$)$_{p1}$—O—, —(CH$_2$)$_{p1}$—CO—O— or —(CH$_2$)$_{p1}$—O—CO—O— bedeuten, wherein p1 is an integer from 1 to 12, $R^{aa}$ H, F, Cl, CN or straight-chain or branched alkyl having 1 to 25 C atoms, in which, in addition, one or more non-adjacent CH$_2$ groups may each be replaced, independently of one another, by —C(R⁰)=C(R⁰⁰)—, —C≡C—, —N(R⁰)—, —O—, —S—, —CO—, —CO—O—, —O—CO—, —O—CO—O— in such a way that 0 and/or S atoms are not linked directly to one another, and in which, in addition, one or more H atoms may be replaced by F, Cl, CN or P¹-Sp¹-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), and wherein $R^{aa}$ does not denote or contain a group P¹, P² or P³, R⁰, R⁰⁰ H or alkyl having 1 to 12 C atoms, $R^y$ and $R^z$ H, F, CH$_3$ or CF$_3$, X¹, X², X³ —CO—O—, —O—CO— or a single bond, $Z^{M1}$ —O—, —CO—, —C(R$^y$R$^z$)— or —CF$_2$CF$_2$—, $Z^{M2}$, $Z^{M3}$ —CO—O—, —O—CO—, —CH$_2$O—, —OCH$_2$—, —CF$_2$O—, —OCF$_2$— or —(CH$_2$)$_n$—, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, s 0, 1, 2 or 3, t 0, 1 or 2, x 0 or 1.

Very preferred are compounds of formulae M2 and M13, especially direactive compounds containing exactly two polymerizable groups P¹ and P².

Further preferred are compounds selected from formulae M17 to M32, in particular from formulae M20, M22, M24, M27, M30 and M32, especially trireactive compounds containing exactly three polymerizable groups P¹, P² and P³.

In the compounds G of formulae M1 to M31 the group

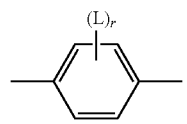

is preferably

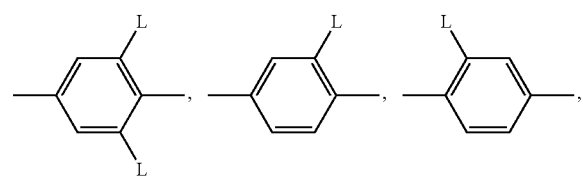

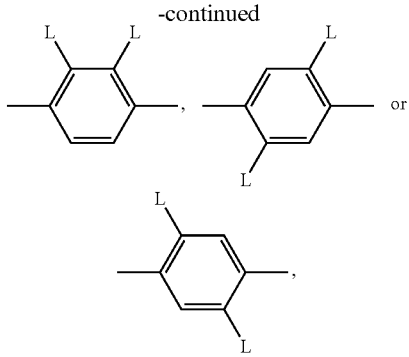

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, more preferably F, Cl, CH$_3$, OCH$_3$, COCH$_3$ or OCF$_3$, most preferably F or OCH$_3$.

Preferred compounds of formulae M1 to M32 are those wherein P¹, P² and P³ denote an acrylate, methacrylate, oxetane or epoxy group, very preferably an acrylate or methacrylate group, most preferably a methacrylate group.

Further preferred compounds of formulae M1 to M32 are those wherein Sp¹, Sp² and Sp³ are a single bond.

Further preferred compounds of formulae M1 to M32 are those wherein one of Sp¹, Sp² and Sp$^a$ is a single bond and another one of Sp¹, Sp² and Sp$^a$ is different from a single bond.

Further preferred compounds of formulae M1 to M32 are those wherein those groups Sp¹, Sp² and Sp$^a$ that are different from a single bond denote —(CH$_2$)$_{s1}$—X"—, wherein s1 is an integer from 1 to 6, preferably 2, 3, 4 or 5, and X" is X" is the linkage to the benzene ring and is —O—, —O—CO—, —CO—O, —O—CO—O— or a single bond.

Further preferred compounds of formula M are those selected from Table E below, especially those selected from the group consisting of formulae RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-92, RM-102, RM-103, RM-109, RM-116, RM-117, RM-120, RM-121, RM-122, RM-139, RM-142, RM-153, RM-155, RM-158 and RM-159.

Particularly preferred are LC media comprising one, two or three polymerizable compounds of formula M.

Further preferred are LC media comprising two or more direactive polymerizable compounds of formula M, preferably selected from formulae M1 to M16, very preferably selected from formulae M2 and M13.

Further preferred are LC media comprising one or more direactive polymerizable compounds of formula M, preferably selected from formulae M1 to M16, very preferably from formulae M2 and M13, and one or more trireactive polymerizable compounds of formula M, preferably selected from formulae M17 to M32, very preferably from formulae M20, M22, M24, M27, M30 and M32.

Further preferred are LC media comprising one or more polymerizable compounds of formula M wherein at least one r is not 0, or at least one of s and t is not 0, very preferably selected from formulae M2, M13, M22, M24, M27, M30 and M32, and wherein L is selected from the preferred groups shown above, most preferably from F and OCH$_3$.

Further preferred are polymerizable compounds, preferably selected from formula M, very preferably from formulae M1 to M32, most preferably from the group consisting of the above-mentioned formulae from Table E, which show absorption in the wavelength range from 320 to 380 nm.

Preferably the proportion of the polymerizable compounds in the LC medium is from 1 to <3%, more preferably from 2 to <3%, very preferably from 2 to 2.5%, most preferably from 2 to 2.2%.

In another preferred embodiment the LC medium contains one or more polymerization initiators.

Suitable conditions for polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG).

If a polymerization initiator is added to the LC medium, its proportion is preferably from 0.001 to 1% by weight, particularly preferably from 0.001 to 0.5% by weight.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

In the present application and in the examples below, the structures of the LC compounds are indicated by means of acronyms, the transformation into chemical formulae taking place in accordance with Table A. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
| nV-Vm | $C_nH_{2n+1}$—CH=CH— | —CH=CH—$C_mH_{2m+1}$ | H | H |

Preferred mixture components are shown in Tables A and B.

TABLE A

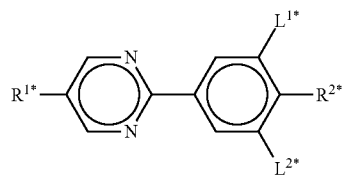

PYP

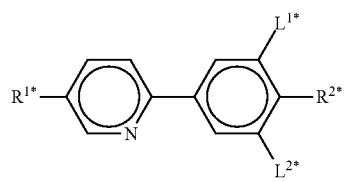

PYRP

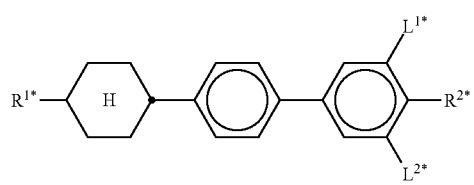

BCH, CPP

TABLE A-continued
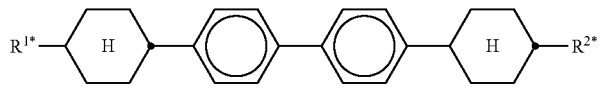
CBC
CCH, CC
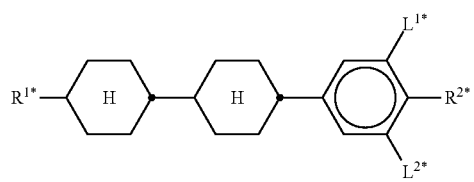
CCP
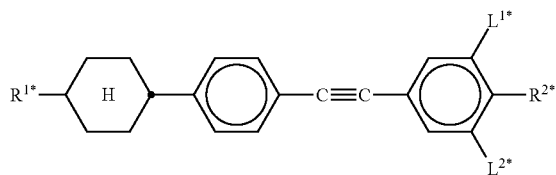
CPTP
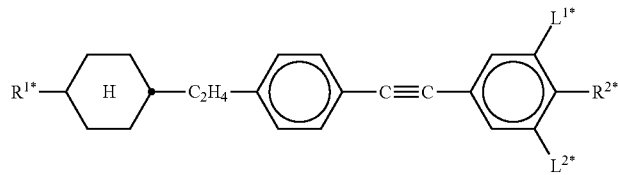
CEPTP
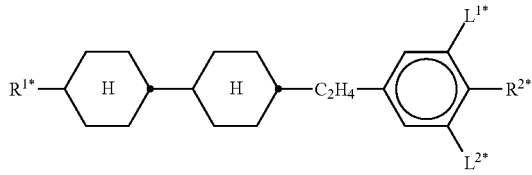
ECCP
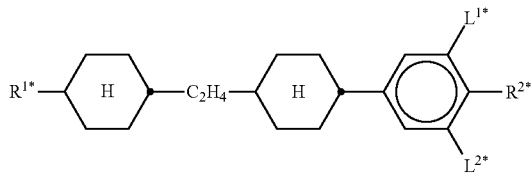
CECP TABLE A-continued
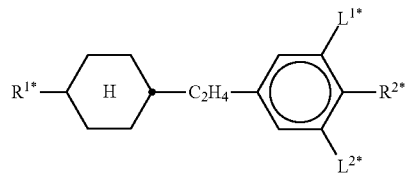
EPCH
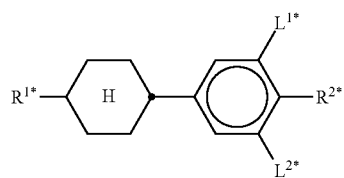
PCH, CP
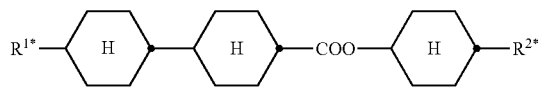
CH
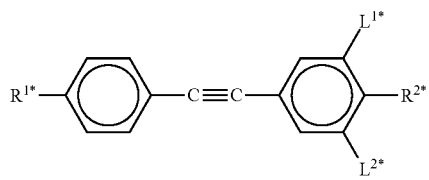
PTP
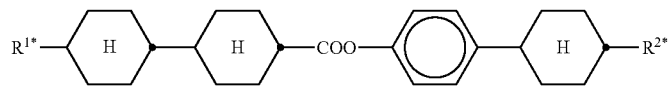
CCPC
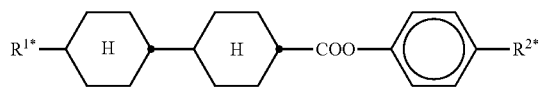
CP
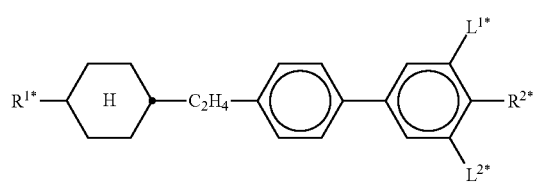
BECH TABLE A-continued
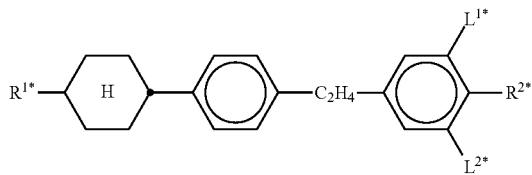
EBCH
CPC
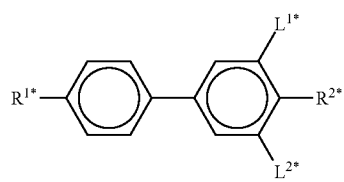
B
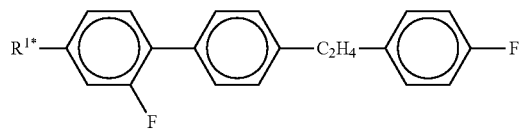
FET-nF
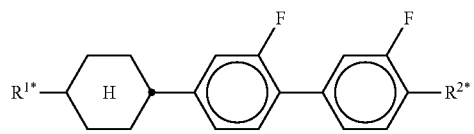
CGG
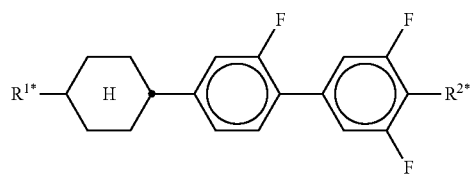
CGU
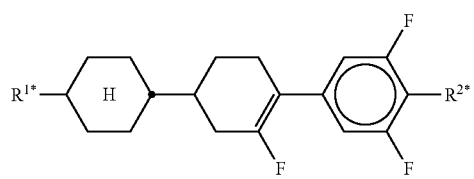
CFU

TABLE B
In the following formulae, n and m each, independently of one another, denote 0, 1, 2, 3, 4, 5, 6, 7, 8, 9, 10, 11 or 12, in particular 2, 3, 5, furthermore 0, 4, 6.
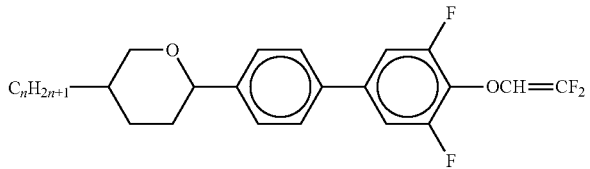
APU-n-OXF
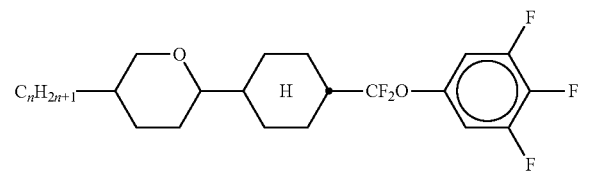
ACQU-n-F
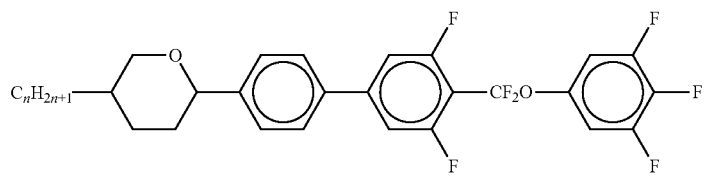
APUQU-n-F
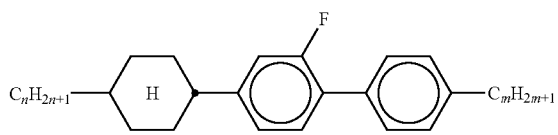
BCH-n.Fm
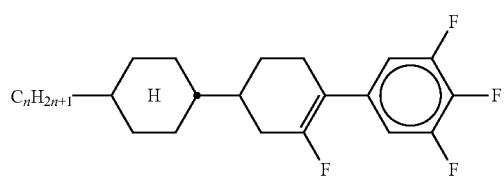
CFU-n-F
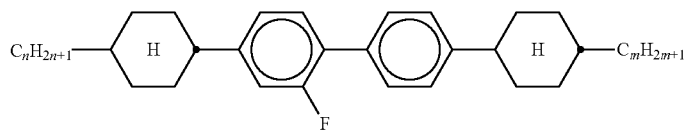
CBC-nmF
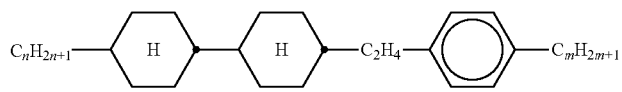
ECCP-nm TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
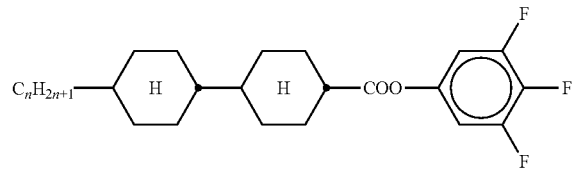
CCZU-n-F
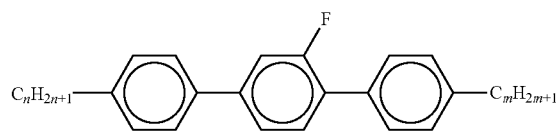
PGP-n-m
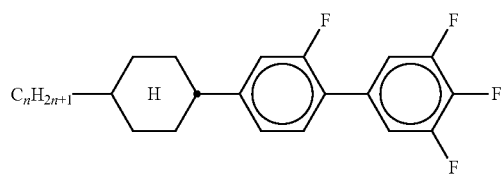
CGU-n-F
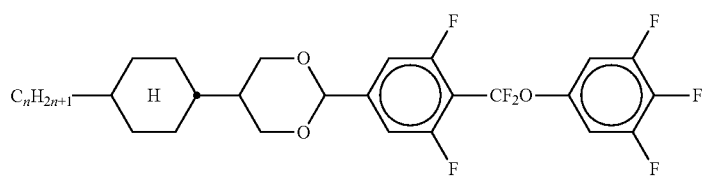
CDUQU-n-F
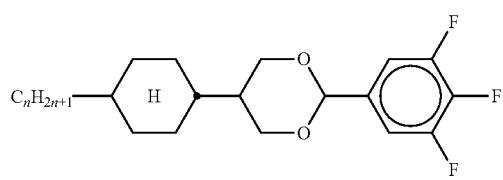
CDU-n-F
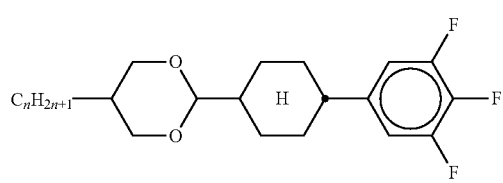
DCU-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
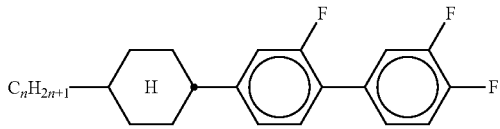
CGG-n-F
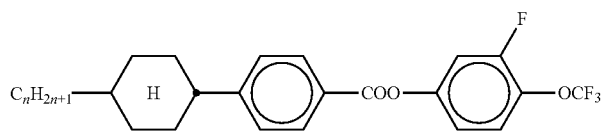
CPZG-n-OT
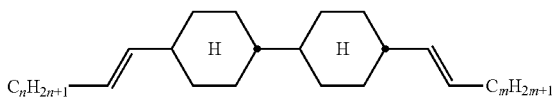
CC-nV-Vm
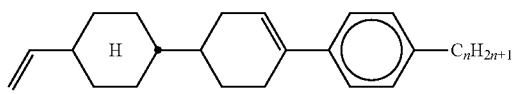
CLP-V-n
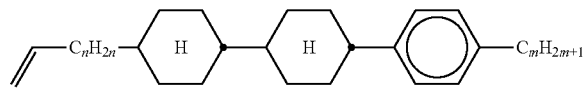
CCP-Vn-m
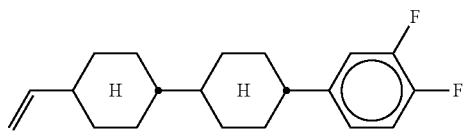
CCG-V-F
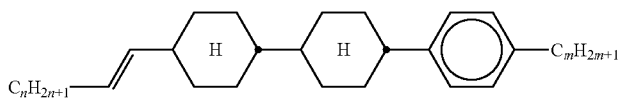
CCP-nV-m
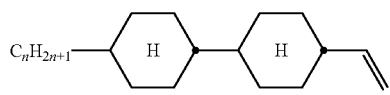
CC-n-V TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
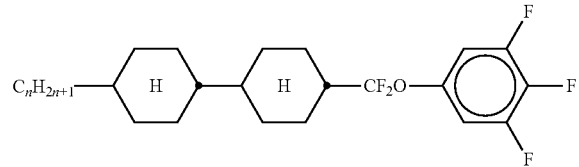
CCQU-n-F
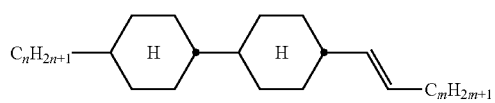
CC-n-Vm
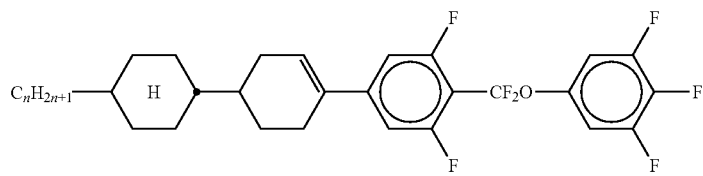
CLUQU-n-F
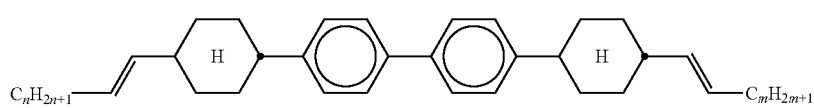
CPPC-nV-Vm
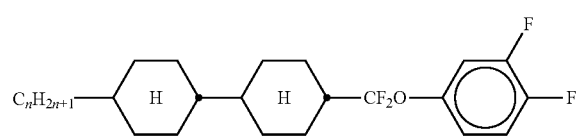
CCQG-n-F
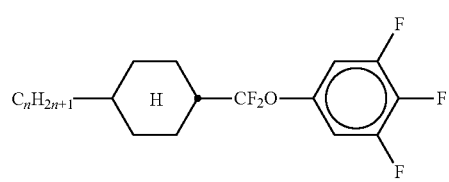
CQU-n-F
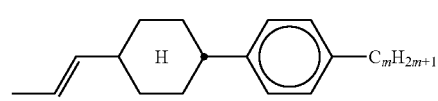
CP-1V-m TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
CLP-n-(O)T
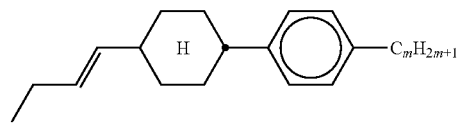
CP-2V-m
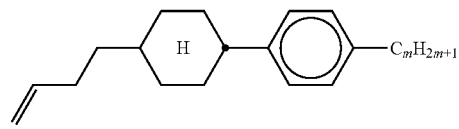
CP-V2-m
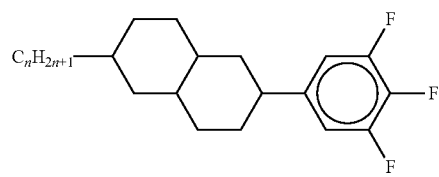
Dec-U-n-F
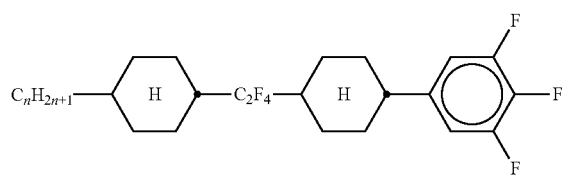
CWCU-n-F
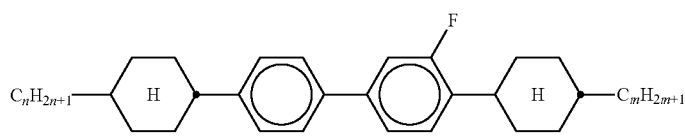
CPGP-n-m
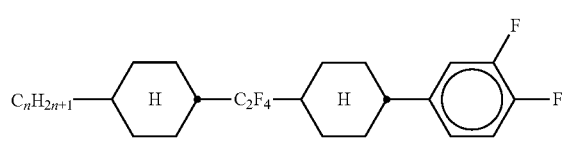
CWCG-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
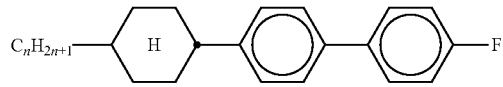
CPP-n-F
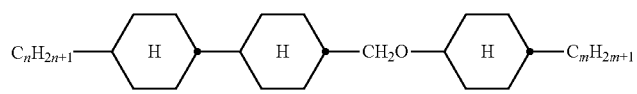
CCOC-n-m
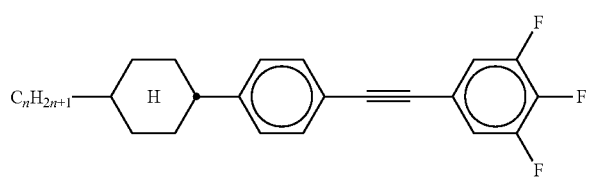
CPTU-n-F
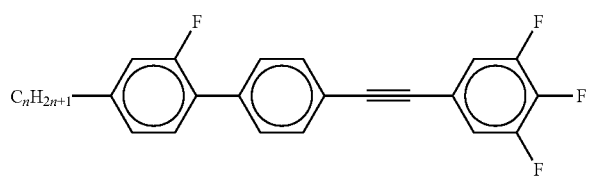
GPTU-n-F
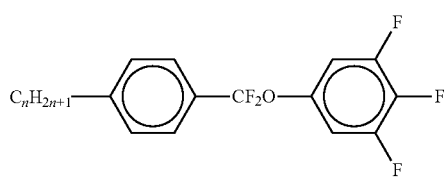
PQU-n-F
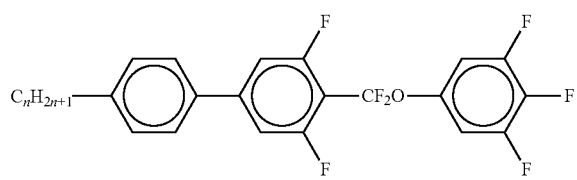
PUQU-n-F
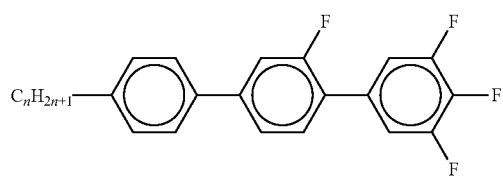
PGU-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
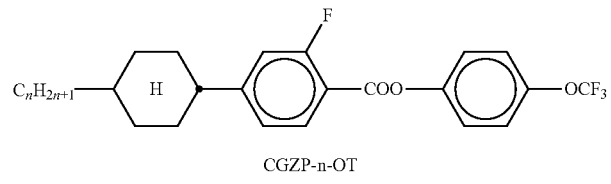
CGZP-n-OT
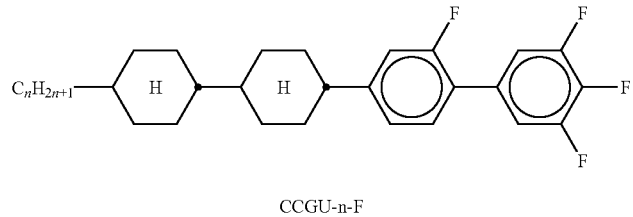
CCGU-n-F
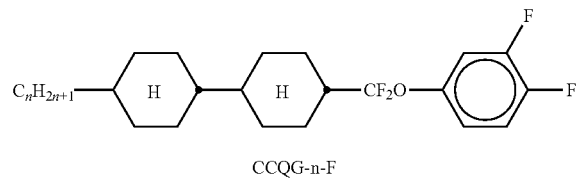
CCQG-n-F
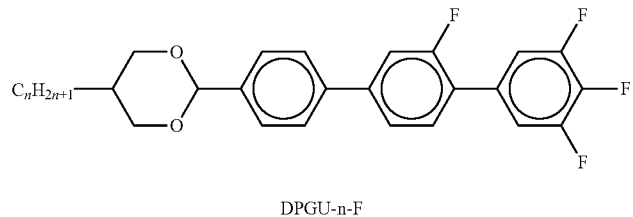
DPGU-n-F
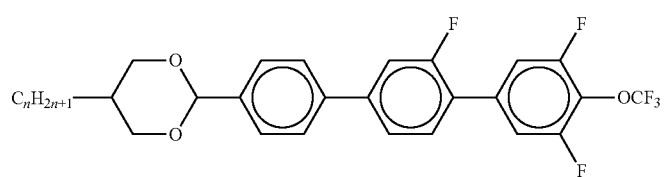
DPGU-n-OT
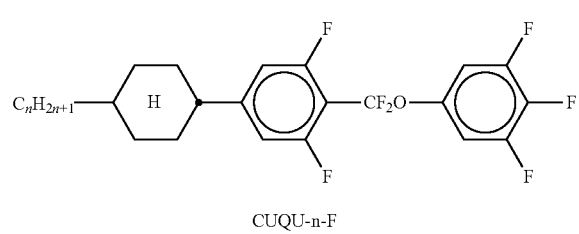
CUQU-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
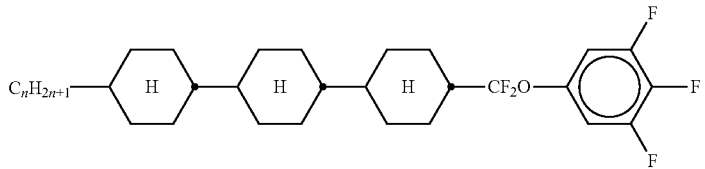
CCCQU-n-F
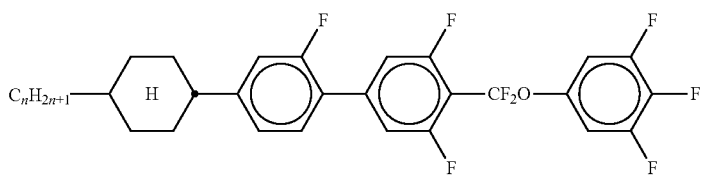
CGUQU-n-F
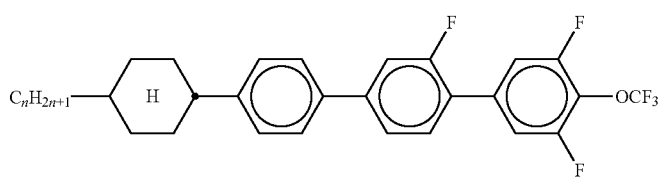
CPGU-n-OT
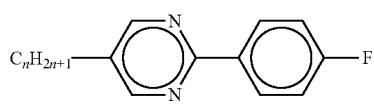
PYP-nF
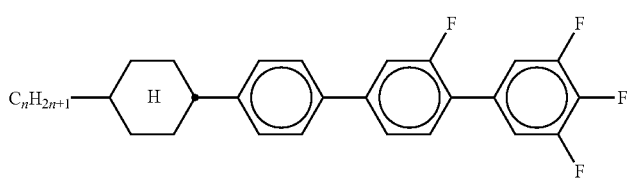
CPGU-n-F
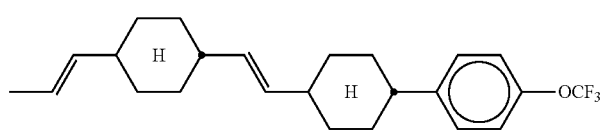
CVCP-1V-OT
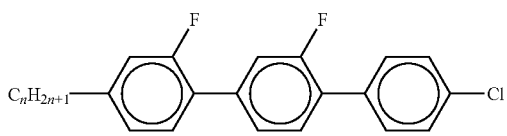
GGP-n-Cl TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
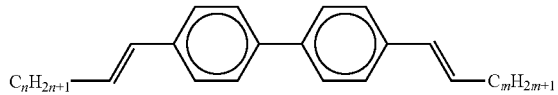
PP-nV-Vm
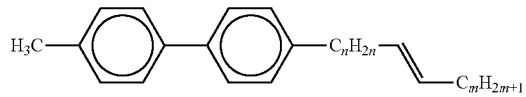
PP-1-nVm
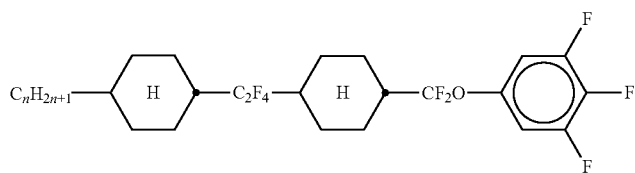
CWCQU-n-F
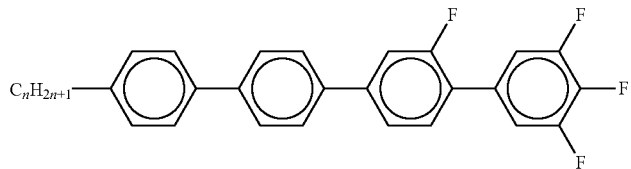
PPGU-n-F
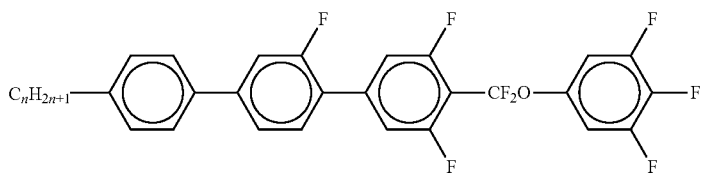
PGUQU-n-F
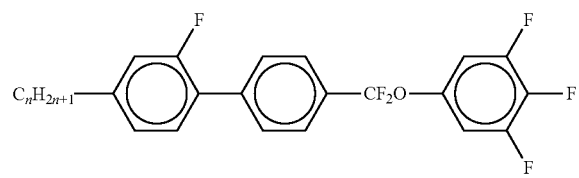
GPQU-n-F
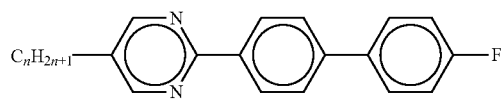
MPP-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
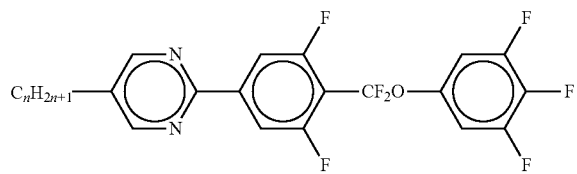
MUQU-n-F
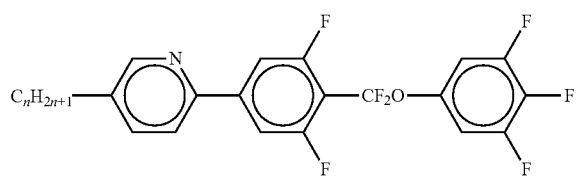
NUQU-n-F
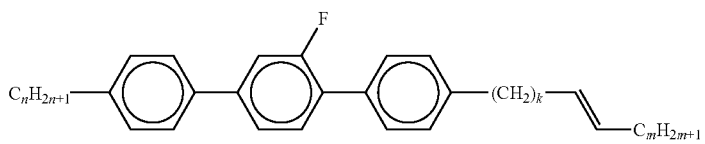
PGP-n-kVm
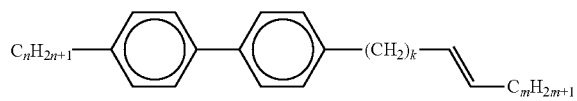
PP-n-kVm
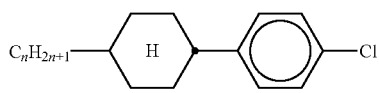
PCH-nCl
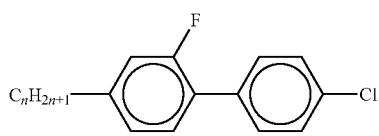
GP-n-Cl
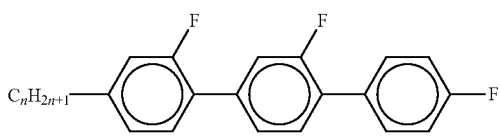
GGP-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
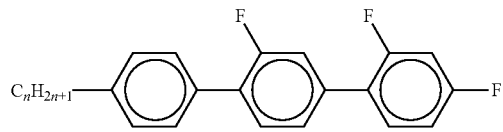
PGIGI-n-F
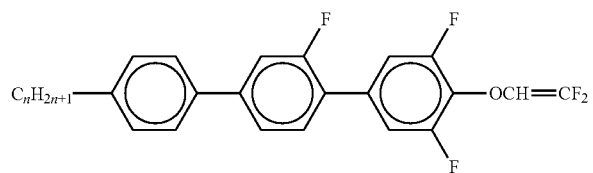
PGU-n-OXF
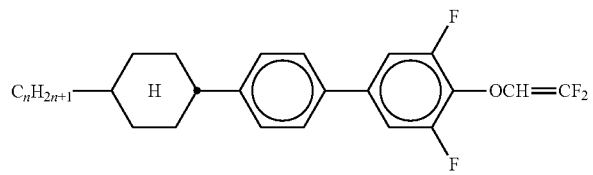
CPU-n-OXF
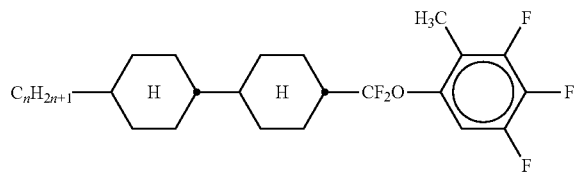
CCQU-n-F(1)
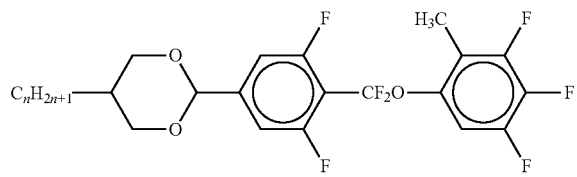
DUQU-n-F(1)
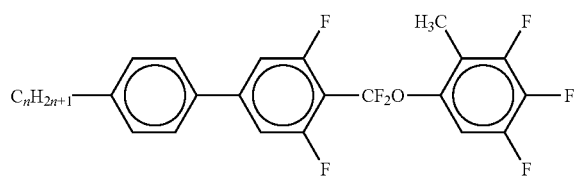
PUQU-n-F(1)

TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
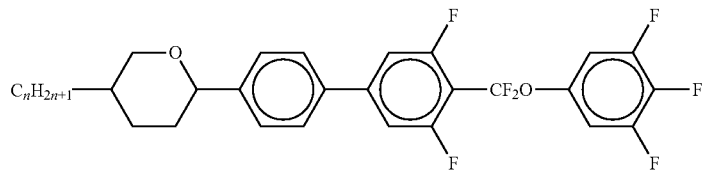
APUQU-n-F(1)
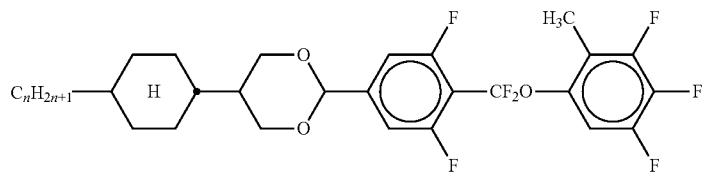
CDUQU-n-F(1)
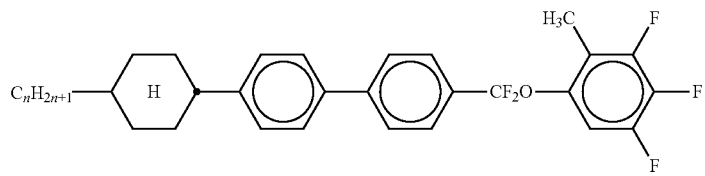
CPPQU-n-F(1)
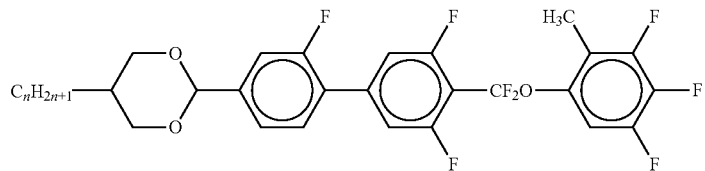
DGUQU-n-F(1)
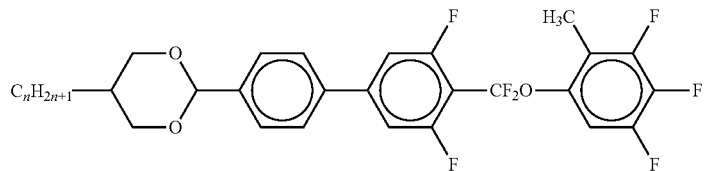
DPUQU-n-F(1)
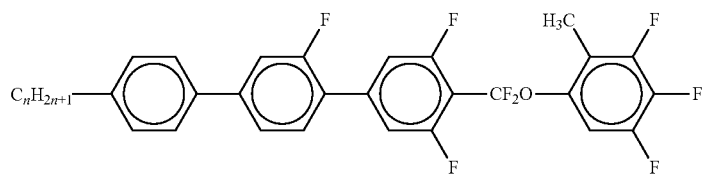
PGUQU-n-F(1)

TABLE B-continued

In the following formulae, n and m each, independently of one another, denote 0, 1, 2, 3, 4, 5, 6, 7, 8, 9, 10, 11 or 12, in particular 2, 3, 5, furthermore 0, 4, 6.

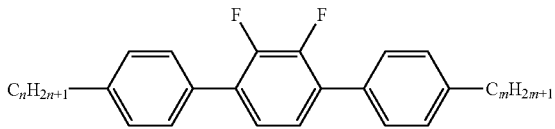

PYP-n-m

Particular preference is given to LC media which, besides the compounds of the formula I, comprise at least one, two, three, four or more compounds from Table B.

TABLE C

Table C indicates possible dopants which are generally added to the LC media according to the invention. The LC media preferably comprise 0-10% by weight, in particular 0.01-5% by weight and particularly preferably 0.01-3% by weight of dopants.

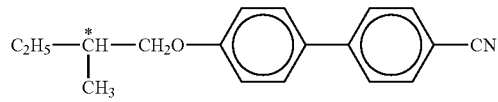

C 15

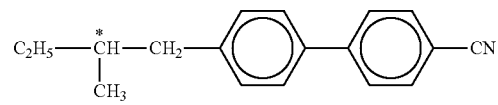

CB 15

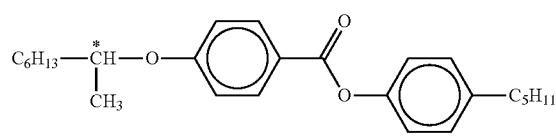

CM 21

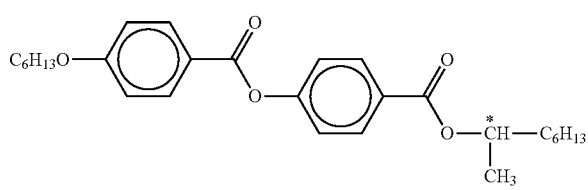

R/S-811

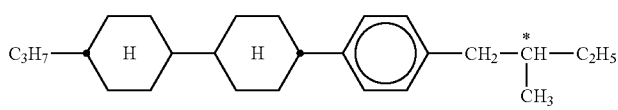

CM 44

TABLE C-continued
Table C indicates possible dopants which are generally added to the LC media according to the invention. The LC media preferably comprise 0-10% by weight, in particular 0.01-5% by weight and particularly preferably 0.01-3% by weight of dopants.
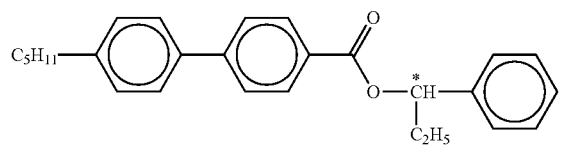
CM 45
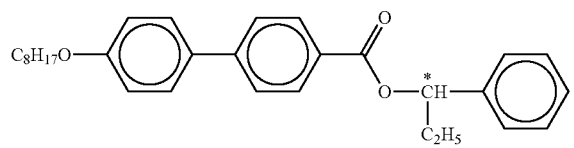
CM 47
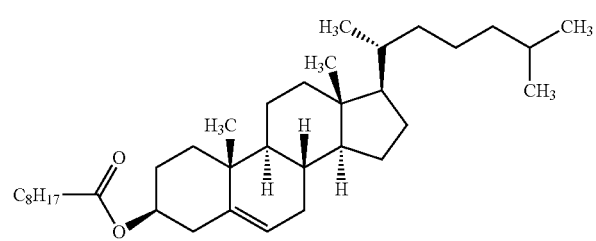
CN
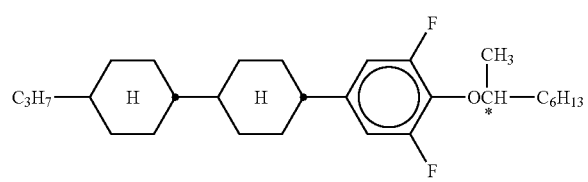
R/S-2011
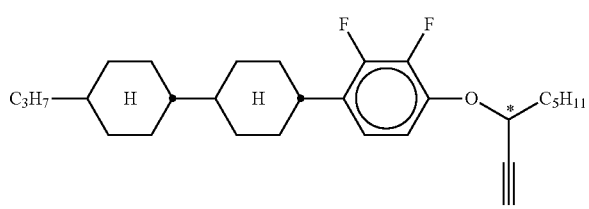
R/S-3011
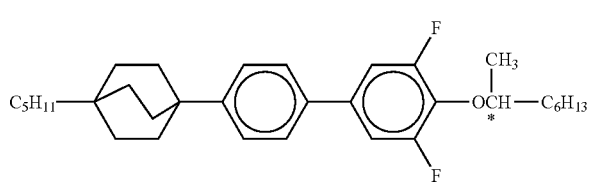
R/S-4011

TABLE C-continued

Table C indicates possible dopants which are generally added to the LC media according to the invention. The LC media preferably comprise 0-10% by weight, in particular 0.01-5% by weight and particularly preferably 0.01-3% by weight of dopants.

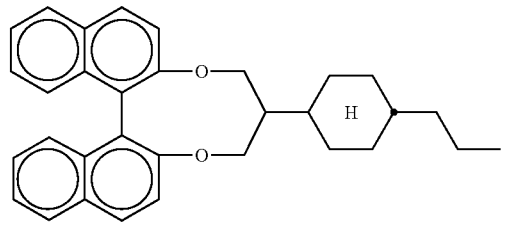

R/S-5011

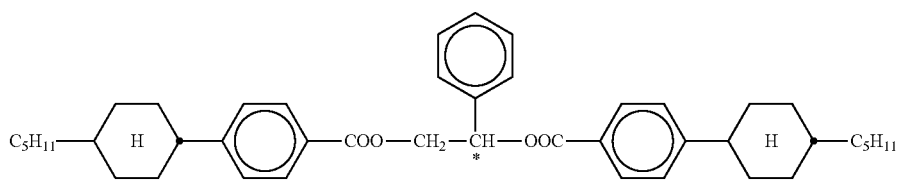

R/S-1011

TABLE D

Stabilisers, which can additionally be added, for example, to the LC media according to the invention in amounts of 0-10% by weight, are mentioned below.

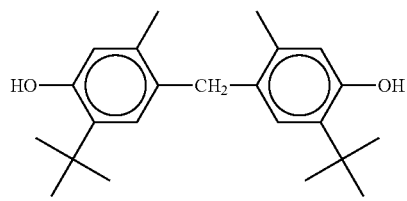

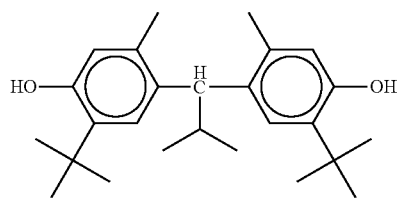

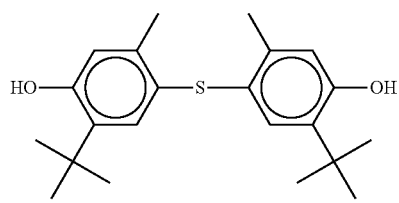

TABLE D-continued
Stabilisers, which can additionally be added, for example, to the LC media according to the invention in amounts of 0-10% by weight, are mentioned below.
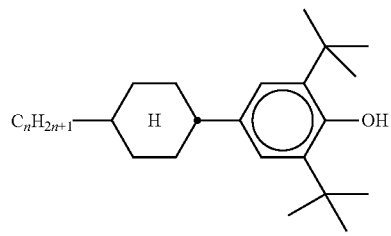
n = 1, 2, 3, 4, 5, 6 or 7
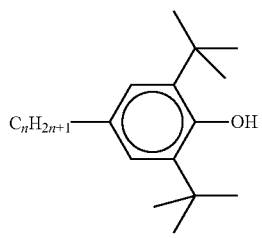
n = 1, 2, 3, 4, 5, 6 or 7
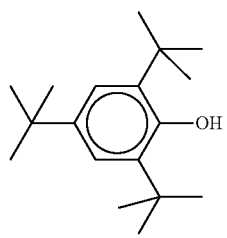
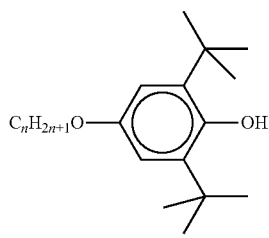
n = 1, 2, 3, 4, 5, 6 or 7
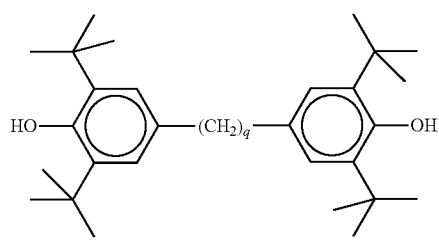
q = 1, 2, 3, 4, 5, 6 or 7

TABLE D-continued
Stabilisers, which can additionally be added, for example, to the LC media according to the invention in amounts of 0-10% by weight, are mentioned below.
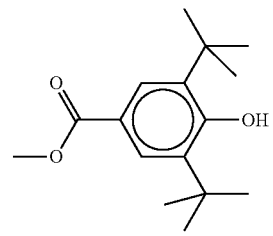
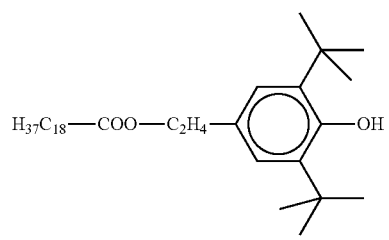
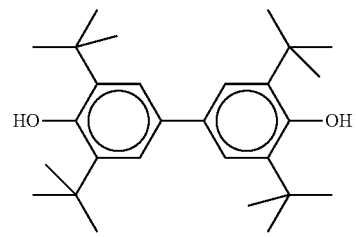
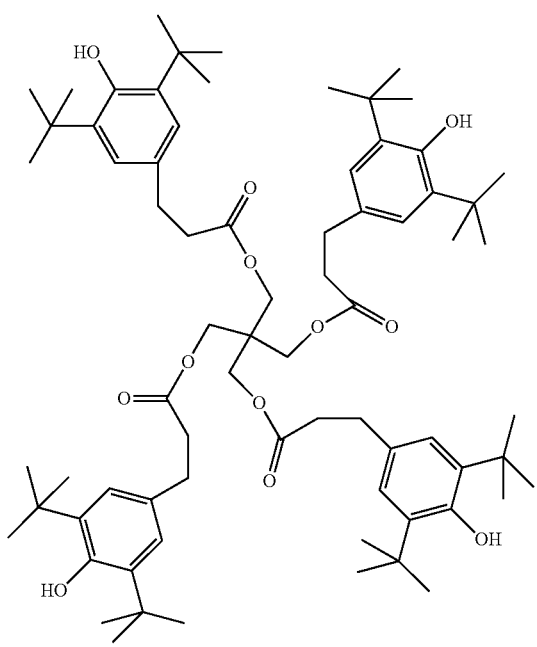 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
Stabilisers, which can additionally be added, for example, to the LC media according to the invention in amounts of 0-10% by weight, are mentioned below.
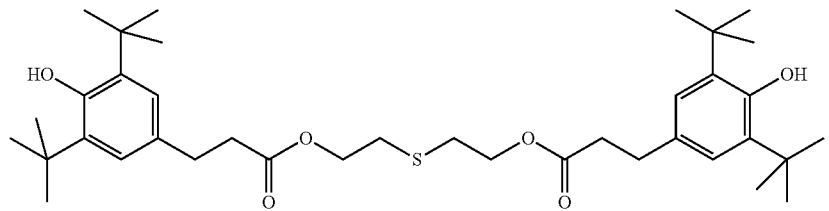 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
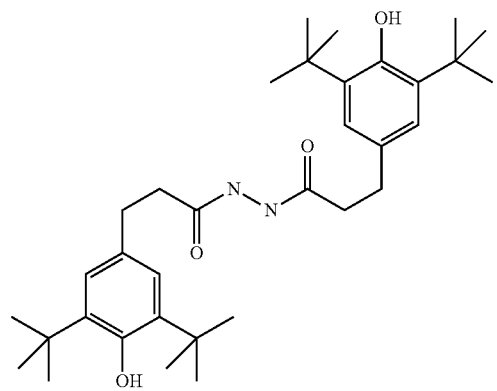 [SMILES: CC(C)(C)c1cc(CCC(=O)NNC(=O)CCc2cc(C(C)(C)C)c(O)c(C(C)(C)C)c2)cc(C(C)(C)C)c1O]
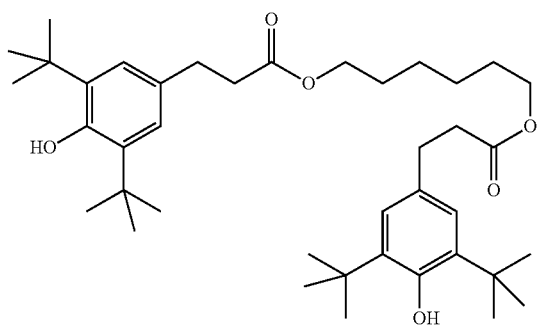 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
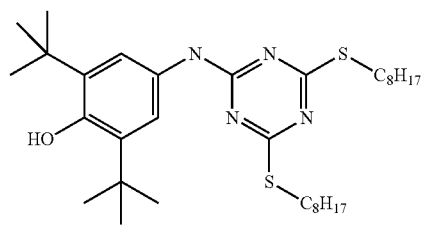

TABLE D-continued
Stabilisers, which can additionally be added, for example, to the LC media according to the invention in amounts of 0-10% by weight, are mentioned below.
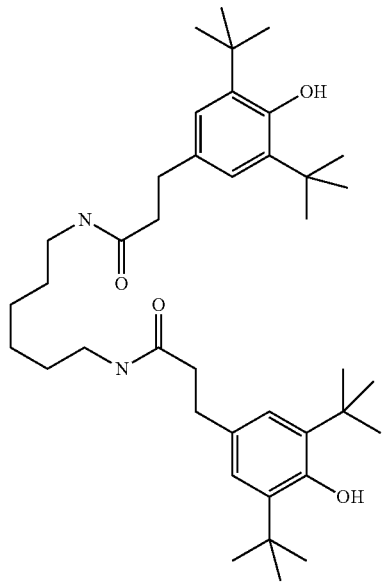 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
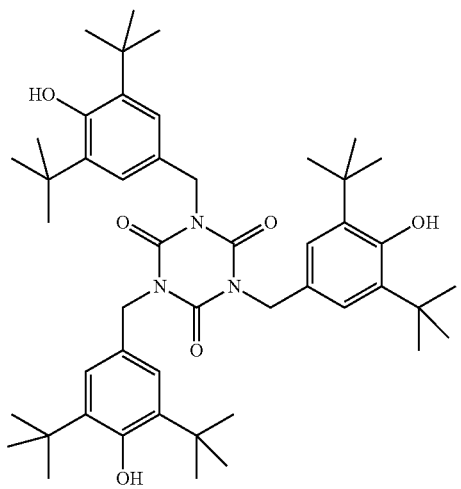 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
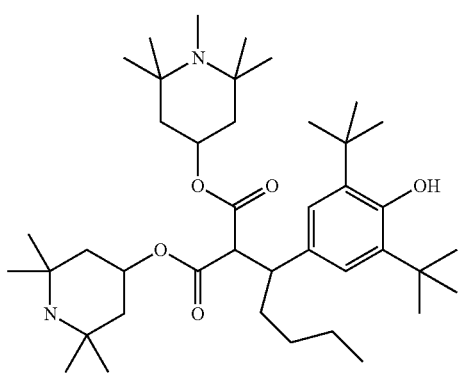 [SMILES: CCCCC(c1cc(C(C)(C)C)c(O)c(C(C)(C)C)c1)C(C(=O)OC1CC(C)(C)NC(C)(C)C1)C(=O)OC1CC(C)(C)N(C)C(C)(C)C1]

TABLE D-continued
Stabilisers, which can additionally be added, for example, to the LC media according to the invention in amounts of 0-10% by weight, are mentioned below.
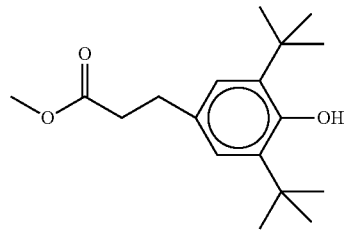
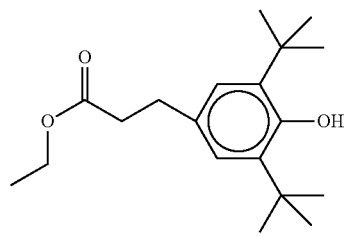
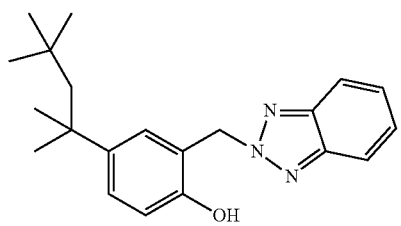 [SMILES: CC(C)(C)CC(C)(C)c1ccc(O)c(Cn2nc3ccccc3n2)c1]
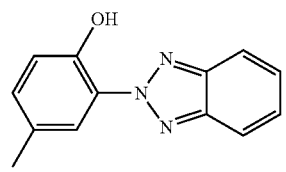 [SMILES: Cc1ccc(O)c(-n2nc3ccccc3n2)c1]
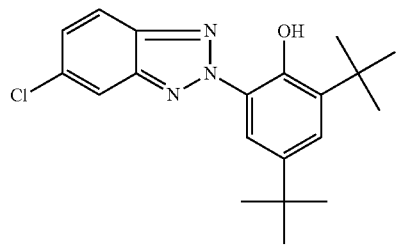 [SMILES: CC(C)(C)c1cc(-n2nc3ccc(Cl)cc3n2)c(O)c(C(C)(C)C)c1]
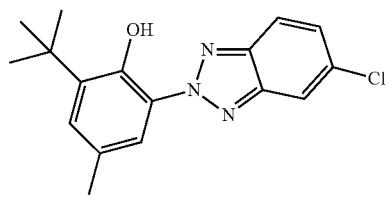 [SMILES: Cc1cc(-n2nc3ccc(Cl)cc3n2)c(O)c(C(C)(C)C)c1]

TABLE D-continued
Stabilisers, which can additionally be added, for example, to the LC media according to the invention in amounts of 0-10% by weight, are mentioned below.
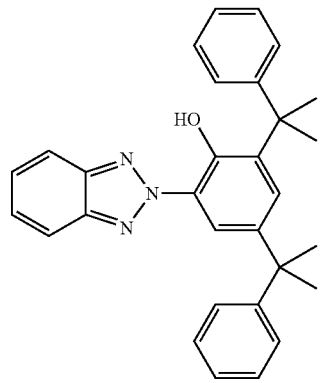 [SMILES: CC(C)(c1ccccc1)c1cc(-n2nc3ccccc3n2)c(O)c(C(C)(C)c2ccccc2)c1]
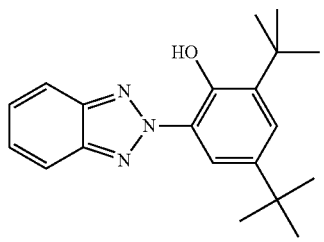 [SMILES: CC(C)(C)c1cc(-n2nc3ccccc3n2)c(O)c(C(C)(C)C)c1]
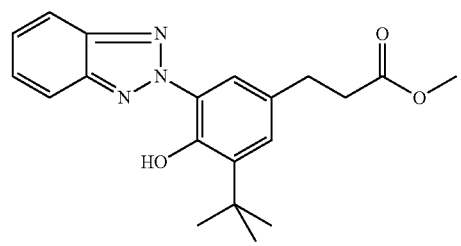 [SMILES: COC(=O)CCc1cc(-n2nc3ccccc3n2)c(O)c(C(C)(C)C)c1]
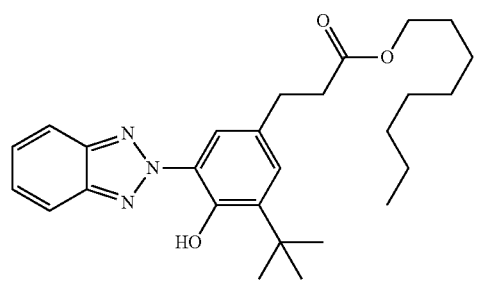 [SMILES: CCCCCCCCOC(=O)CCc1cc(-n2nc3ccccc3n2)c(O)c(C(C)(C)C)c1]

TABLE D-continued
Stabilisers, which can additionally be added, for example, to the LC media according to the invention in amounts of 0-10% by weight, are mentioned below.
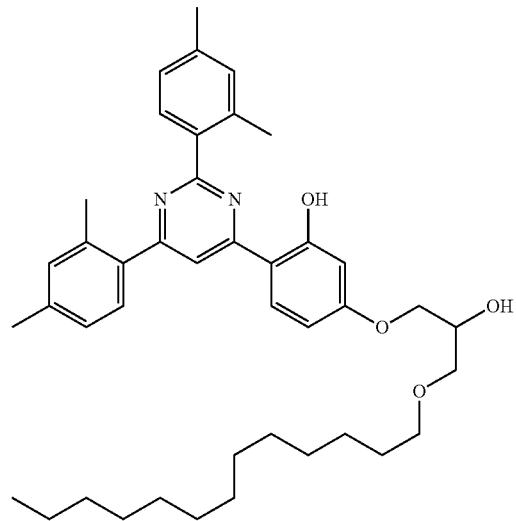 [SMILES: CCCCCCCCCCCCCOCC(O)COc1ccc(-c2cc(-c3ccc(C)cc3C)nc(-c3ccc(C)cc3C)n2)c(O)c1]
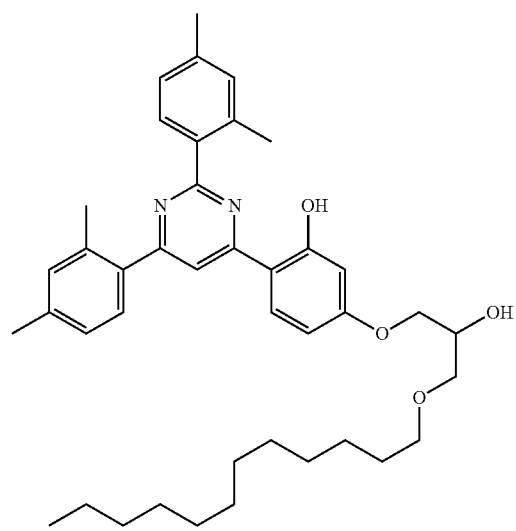 [SMILES: CCCCCCCCCCCCOCC(O)COc1ccc(-c2cc(-c3ccc(C)cc3C)nc(-c3ccc(C)cc3C)n2)c(O)c1]
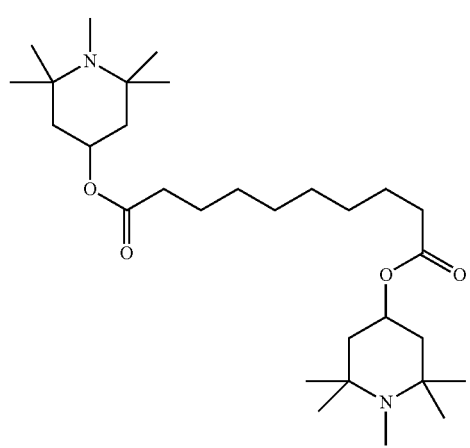

TABLE D-continued
Stabilisers, which can additionally be added, for example, to the LC media according to the invention in amounts of 0-10% by weight, are mentioned below.
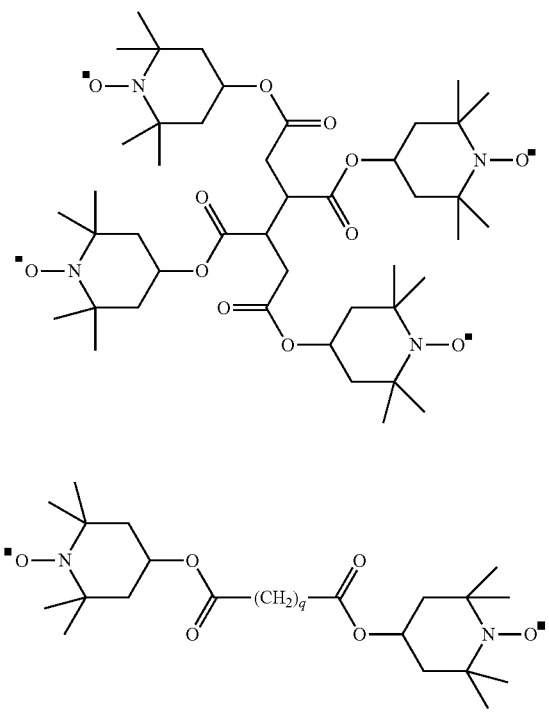
q = 1, 2, 3, 4, 5, 6, 7, 8, 9 or 10
TABLE E
Table E shows illustrative reactive mesogenic compounds (RMs) which can be used in the LC media in accordance with the present invention.
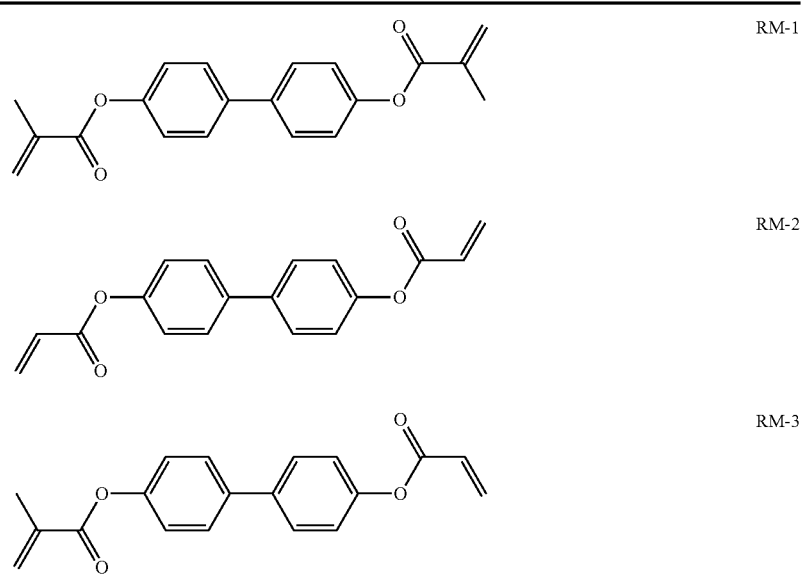
RM-1
RM-2
RM-3

TABLE E-continued
Table E shows illustrative reactive mesogenic compounds (RMs) which can be used in the LC media in accordance with the present invention.
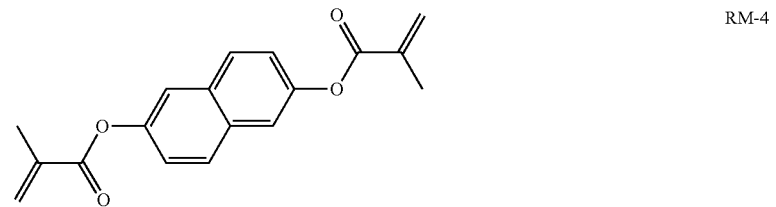
RM-4
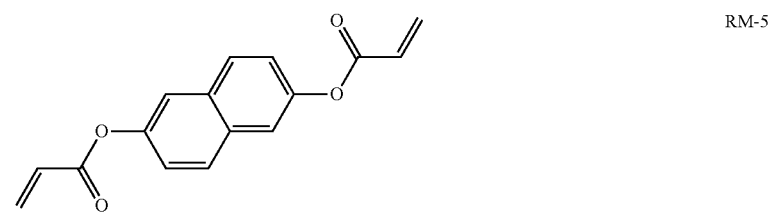
RM-5
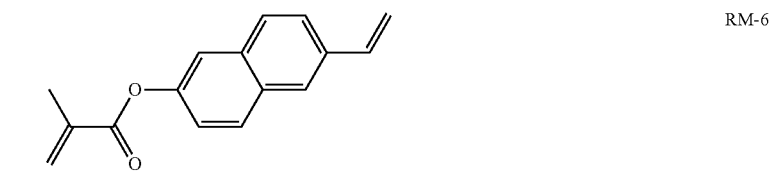
RM-6
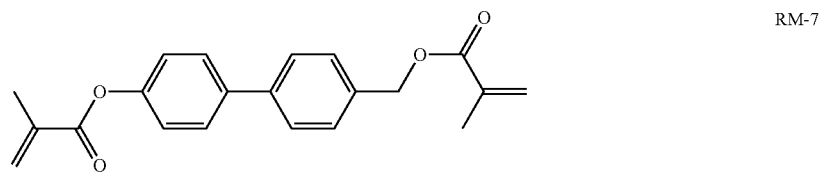
RM-7
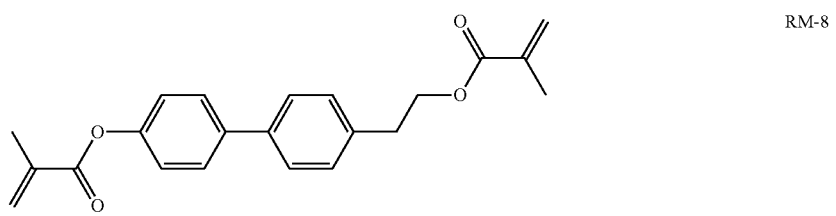
RM-8
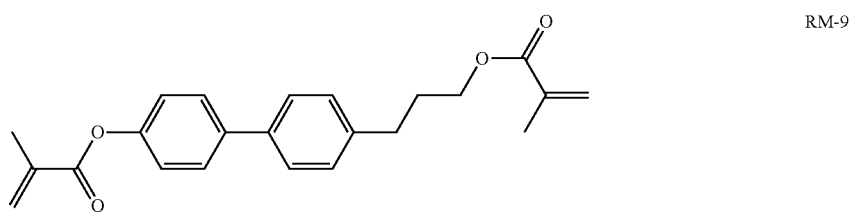
RM-9
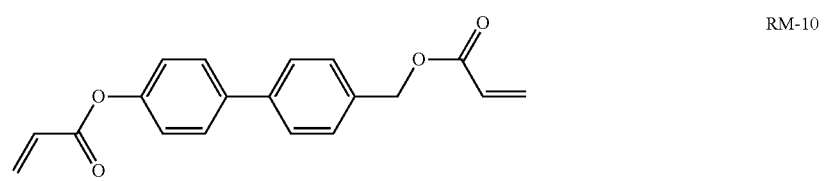
RM-10

TABLE E-continued
Table E shows illustrative reactive mesogenic compounds (RMs) which can be used in the LC media in accordance with the present invention.
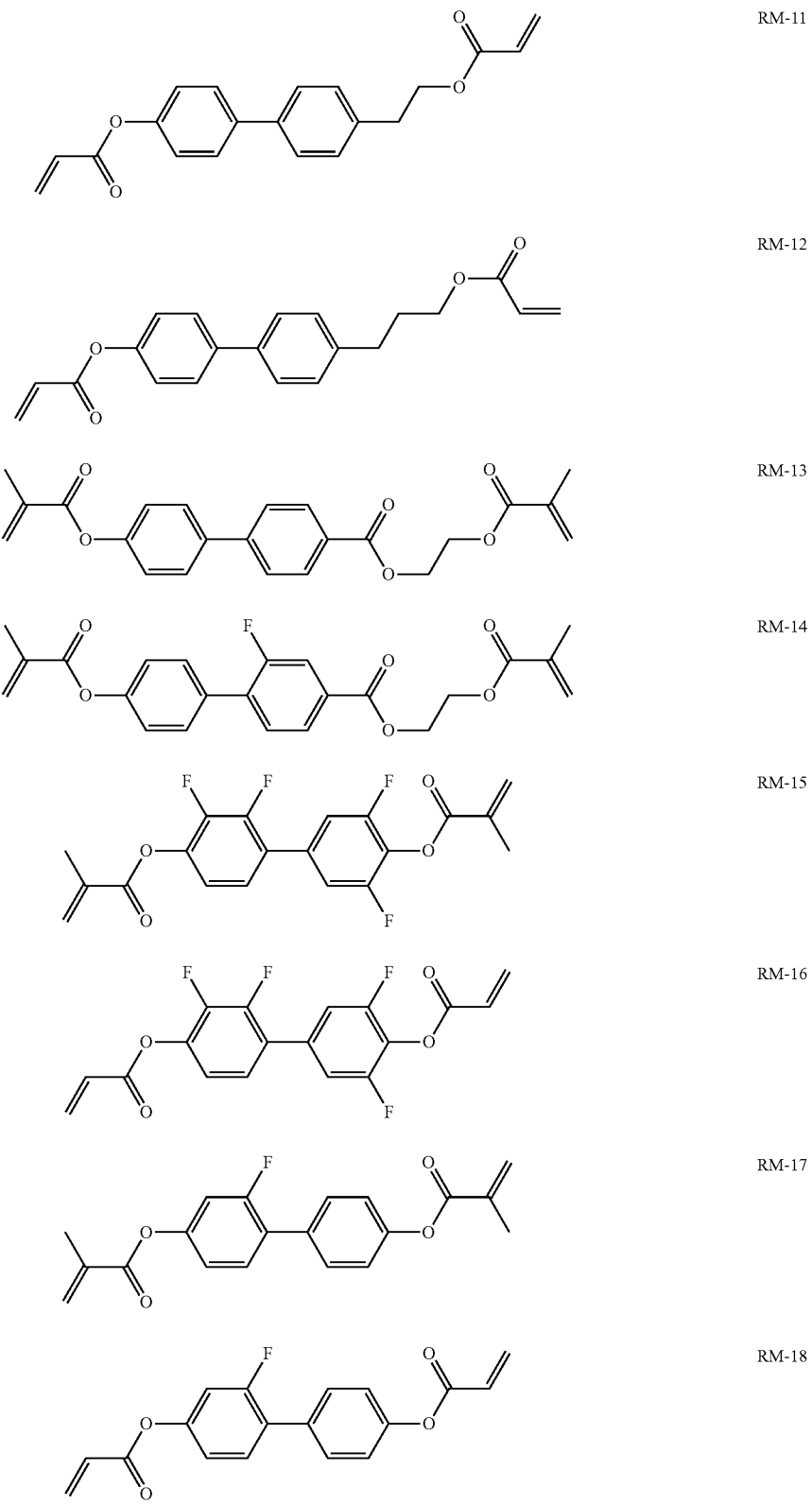
RM-11
RM-12
RM-13
RM-14
RM-15
RM-16
RM-17
RM-18

TABLE E-continued
Table E shows illustrative reactive mesogenic compounds (RMs) which can be used in the LC media in accordance with the present invention.
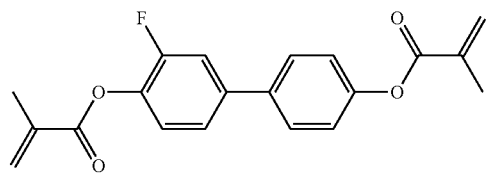
RM-19
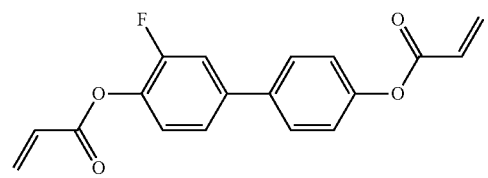 [SMILES: C=CC(=O)Oc1ccc(-c2ccc(OC(=O)C=C)cc2)cc1]
RM-20
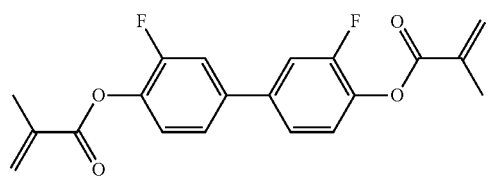 [SMILES: C=C(C)C(=O)Oc1ccc(-c2ccc(OC(=O)C(=C)C)c(F)c2)cc1F]
RM-21
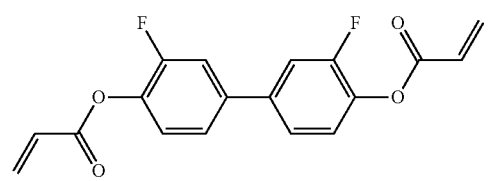
RM-22
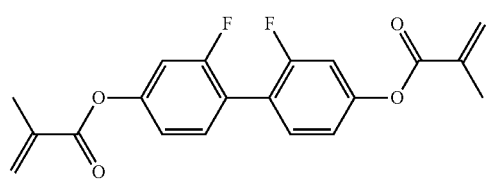
RM-23
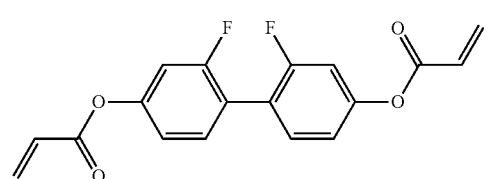
RM-24
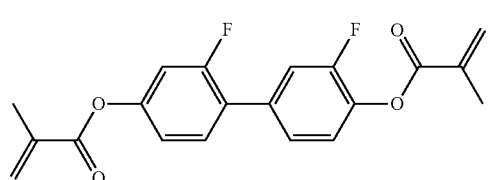
RM-25
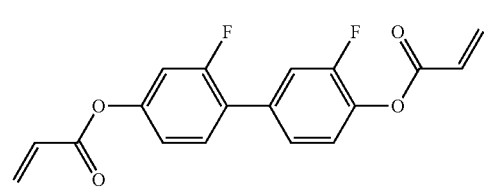 [SMILES: C=CC(=O)Oc1ccc(-c2ccc(OC(=O)C=C)c(F)c2)c(F)c1]
RM-26

TABLE E-continued
Table E shows illustrative reactive mesogenic compounds (RMs) which can be used in the LC media in accordance with the present invention.
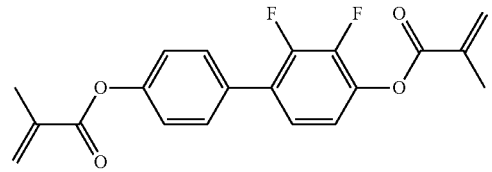 [SMILES: C=C(C)C(=O)Oc1ccc(-c2ccc(OC(=O)C(=C)C)c(F)c2F)cc1] RM-27
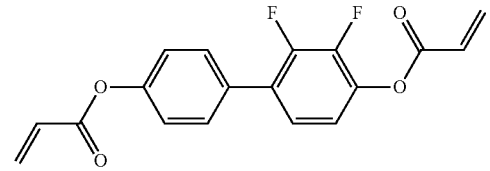 [SMILES: C=CC(=O)Oc1ccc(-c2ccc(OC(=O)C=C)c(F)c2F)cc1] RM-28
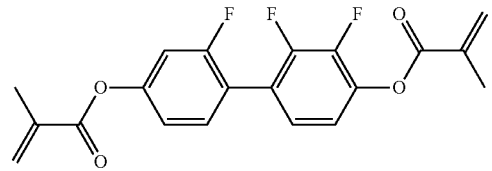 RM-29
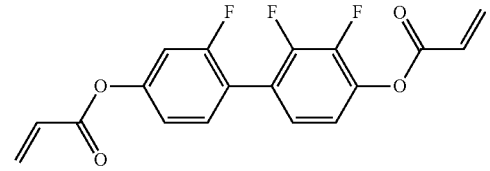 [SMILES: C=CC(=O)Oc1ccc(-c2ccc(OC(=O)C=C)c(F)c2F)c(F)c1] RM-30
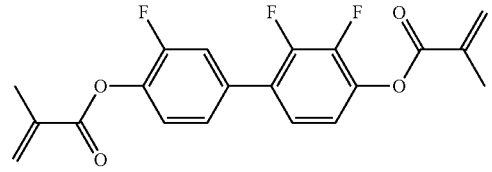 [SMILES: C=C(C)C(=O)Oc1ccc(-c2ccc(OC(=O)C(=C)C)c(F)c2F)cc1F] RM-31
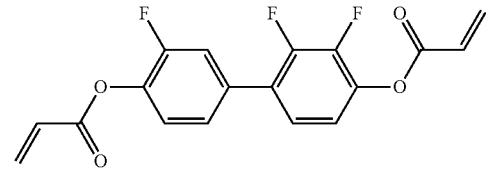 RM-32
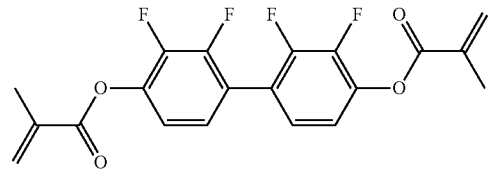 RM-33
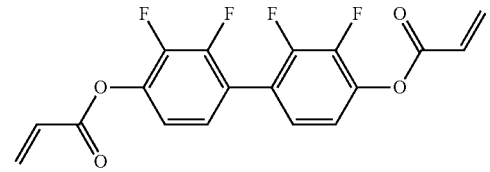 RM-34

TABLE E-continued
Table E shows illustrative reactive mesogenic compounds (RMs) which can be used in the LC media in accordance with the present invention.
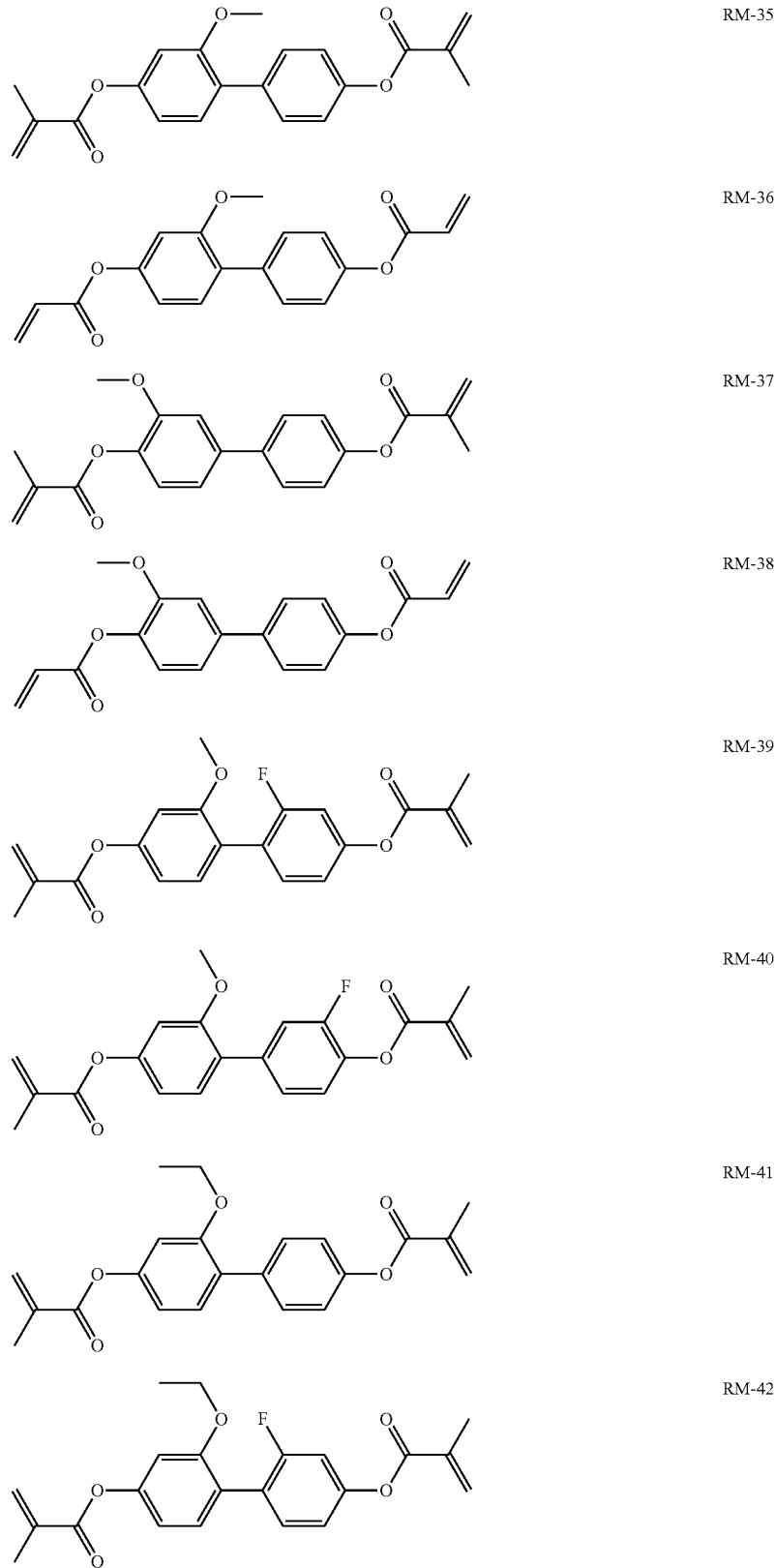

TABLE E-continued
Table E shows illustrative reactive mesogenic compounds (RMs) which can be used in the LC media in accordance with the present invention.
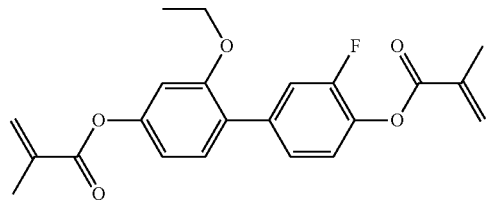
RM-43
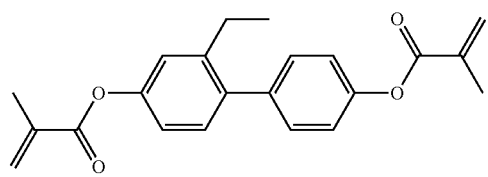
RM-44
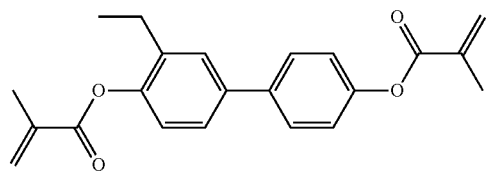 [SMILES: C=C(C)C(=O)Oc1ccc(-c2ccc(OC(=O)C(=C)C)c(OC)c2)cc1]
RM-45
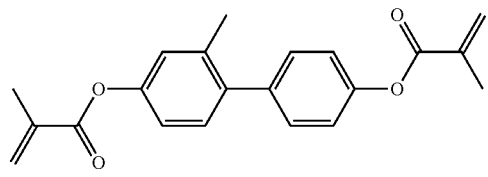
RM-46
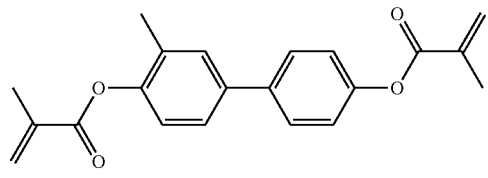
RM-47
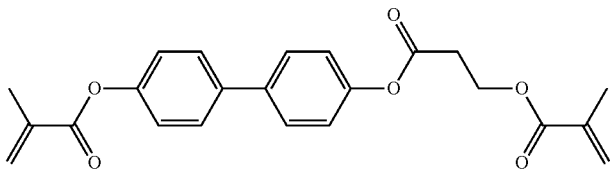 [SMILES: C=C(C)C(=O)OCCC(=O)Oc1ccc(-c2ccc(OC(=O)C(=C)C)cc2)cc1]
RM-48
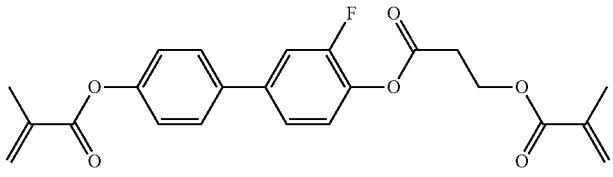 [SMILES: C=C(C)C(=O)OCCC(=O)Oc1ccc(-c2ccc(OC(=O)C(=C)C)cc2)cc1F]
RM-49
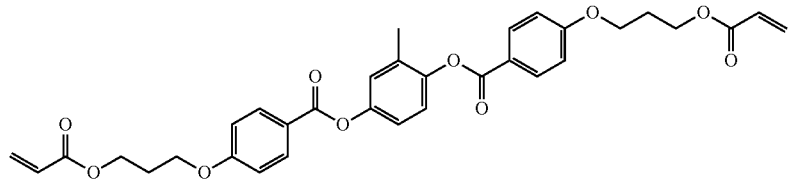 [SMILES: C=CC(=O)OCCCOc1ccc(C(=O)Oc2ccc(OC(=O)c3ccc(OCCCOC(=O)C=C)cc3)c(C)c2)cc1]
RM-50

TABLE E-continued
Table E shows illustrative reactive mesogenic compounds (RMs) which can be used in the LC media in accordance with the present invention.
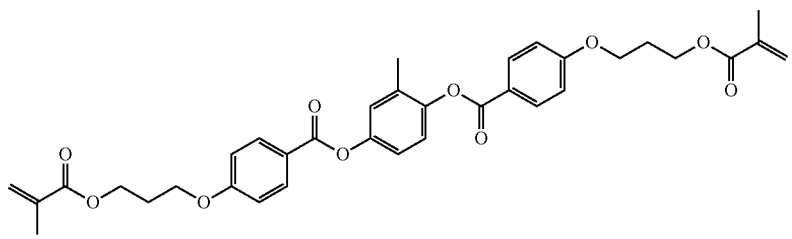 [SMILES: C=C(C)C(=O)OCCCOc1ccc(C(=O)Oc2ccc(OC(=O)c3ccc(OCCCOC(=O)C(=C)C)cc3)c(C)c2)cc1] RM-51
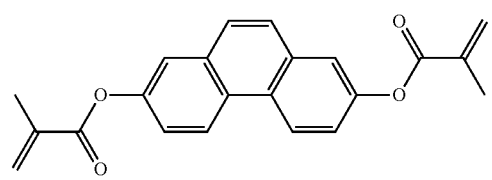 [SMILES: C=C(C)C(=O)Oc1ccc2c(ccc3cc(OC(=O)C(=C)C)ccc32)c1] RM-52
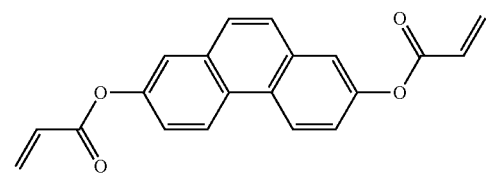 [SMILES: C=CC(=O)Oc1ccc2c(ccc3cc(OC(=O)C=C)ccc32)c1] RM-53
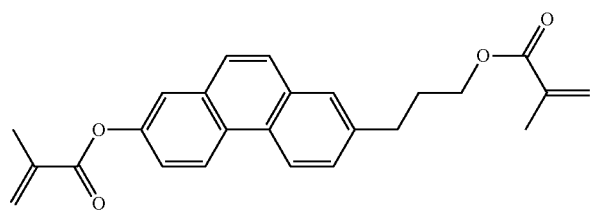 [SMILES: C=C(C)C(=O)OCCCc1ccc2c(ccc3cc(OC(=O)C(=C)C)ccc32)c1] RM-54
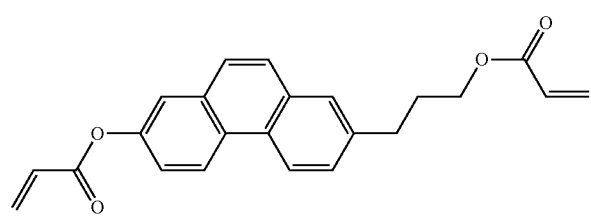 [SMILES: C=CC(=O)OCCCc1ccc2c(ccc3cc(OC(=O)C=C)ccc32)c1] RM-55
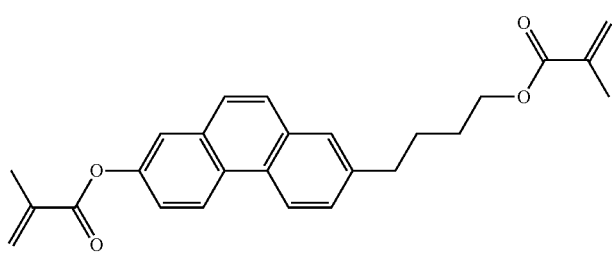 [SMILES: C=C(C)C(=O)OCCCCc1ccc2c(ccc3cc(OC(=O)C(=C)C)ccc32)c1] RM-56
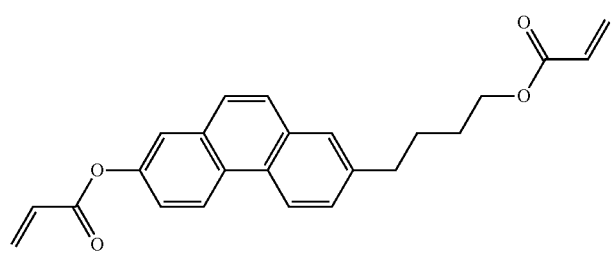 [SMILES: C=CC(=O)OCCCCc1ccc2c(ccc3cc(OC(=O)C=C)ccc32)c1] RM-57

TABLE E-continued
Table E shows illustrative reactive mesogenic compounds (RMs) which can
be used in the LC media in accordance with the present invention.
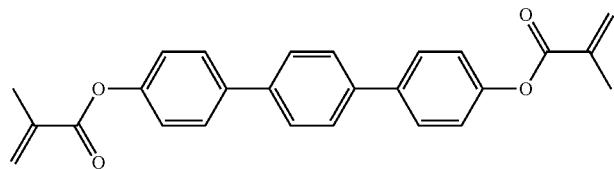 [SMILES: C=C(C)C(=O)Oc1ccc(-c2ccc(-c3ccc(OC(=O)C(=C)C)cc3)cc2)cc1] RM-58
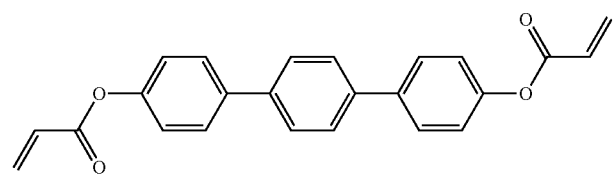 [SMILES: C=CC(=O)Oc1ccc(-c2ccc(-c3ccc(OC(=O)C=C)cc3)cc2)cc1] RM-59
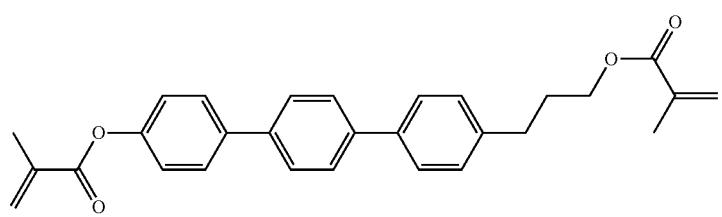 [SMILES: C=C(C)C(=O)OCCCc1ccc(-c2ccc(-c3ccc(OC(=O)C(=C)C)cc3)cc2)cc1] RM-60
RM-61
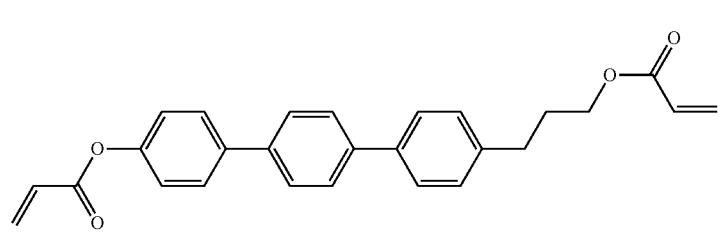 [SMILES: C=CC(=O)OCCCc1ccc(-c2ccc(-c3ccc(OC(=O)C=C)cc3)cc2)cc1] 
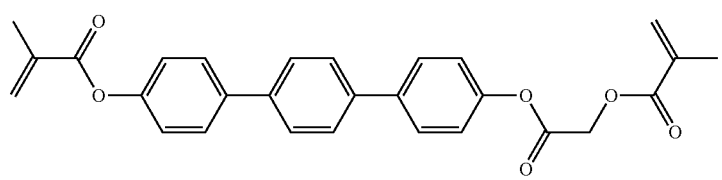 [SMILES: C=C(C)C(=O)OCC(=O)Oc1ccc(-c2ccc(-c3ccc(OC(=O)C(=C)C)cc3)cc2)cc1] RM-62
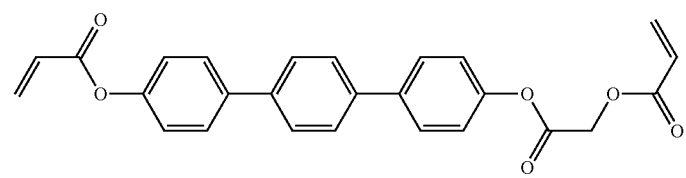 [SMILES: C=CC(=O)OCC(=O)Oc1ccc(-c2ccc(-c3ccc(OC(=O)C=C)cc3)cc2)cc1] RM-63
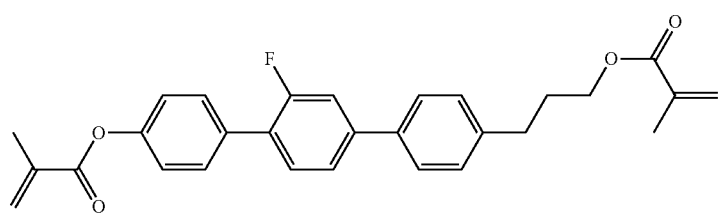 [SMILES: C=C(C)C(=O)OCCCc1ccc(-c2ccc(-c3ccc(OC(=O)C(=C)C)cc3)c(F)c2)cc1] RM-64

TABLE E-continued
Table E shows illustrative reactive mesogenic compounds (RMs) which can
be used in the LC media in accordance with the present invention.
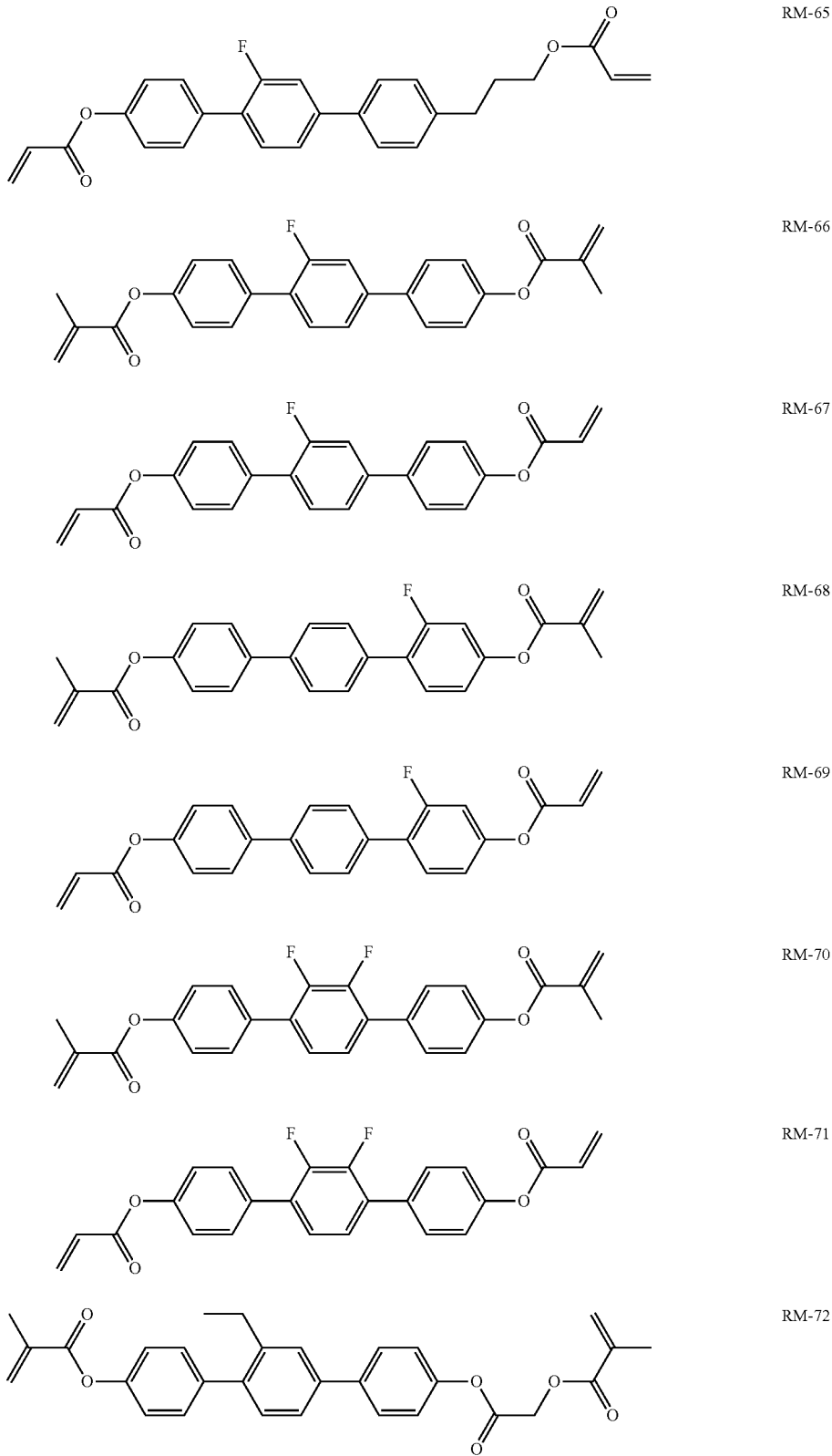
RM-65
RM-66
RM-67
RM-68
RM-69
RM-70
RM-71
RM-72

TABLE E-continued
Table E shows illustrative reactive mesogenic compounds (RMs) which can be used in the LC media in accordance with the present invention.
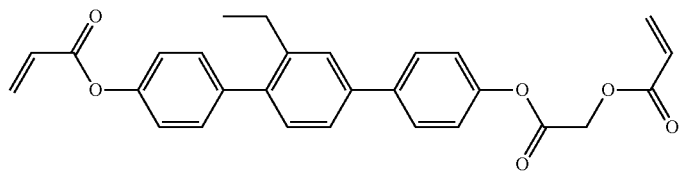 [SMILES: C=CC(=O)OCC(=O)Oc1ccc(-c2ccc(-c3ccc(OC(=O)C=C)cc3)c(CC)c2)cc1] RM-73
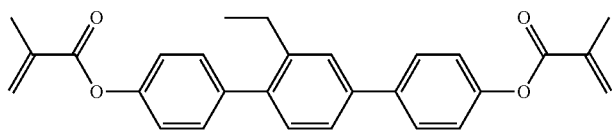 RM-74
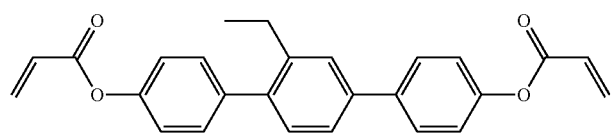 [SMILES: C=CC(=O)Oc1ccc(-c2ccc(-c3ccc(OC(=O)C=C)cc3)c(CC)c2)cc1] RM-75
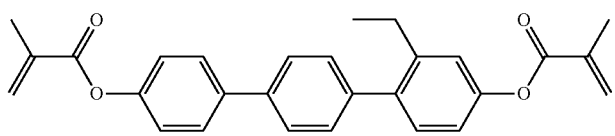 [SMILES: C=C(C)C(=O)Oc1ccc(-c2ccc(-c3ccc(OC(=O)C(=C)C)cc3CC)cc2)cc1] RM-76
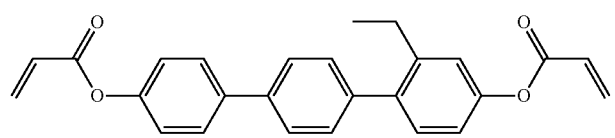 RM-77
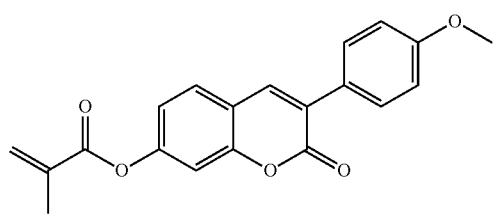 [SMILES: C=C(C)C(=O)Oc1ccc2cc(-c3ccc(OC)cc3)c(=O)oc2c1] RM-78
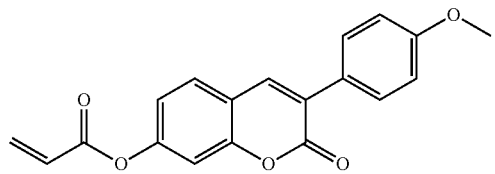 [SMILES: C=CC(=O)Oc1ccc2cc(-c3ccc(OC)cc3)c(=O)oc2c1] RM-79
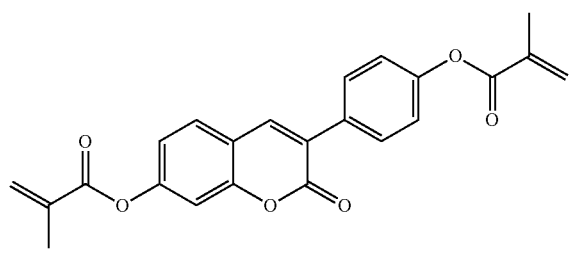 [SMILES: C=C(C)C(=O)Oc1ccc(-c2cc3ccc(OC(=O)C(=C)C)cc3oc2=O)cc1] RM-80
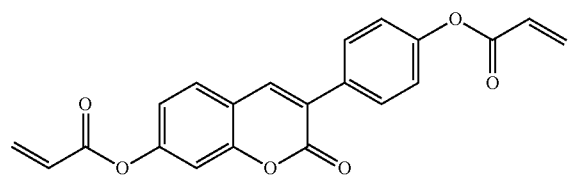 [SMILES: C=CC(=O)Oc1ccc(-c2cc3ccc(OC(=O)C=C)cc3oc2=O)cc1] RM-81

TABLE E-continued
Table E shows illustrative reactive mesogenic compounds (RMs) which can be used in the LC media in accordance with the present invention.
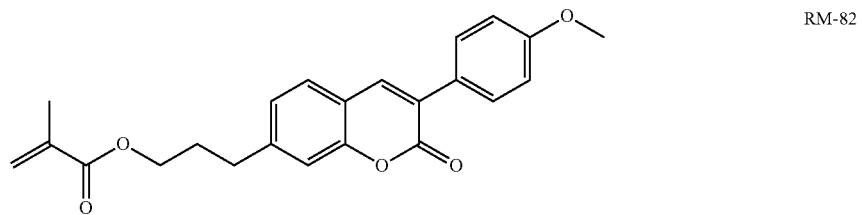 RM-82
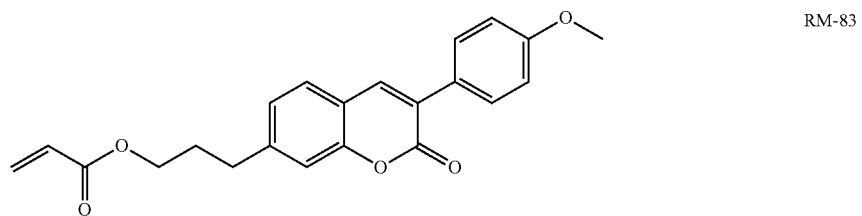 RM-83
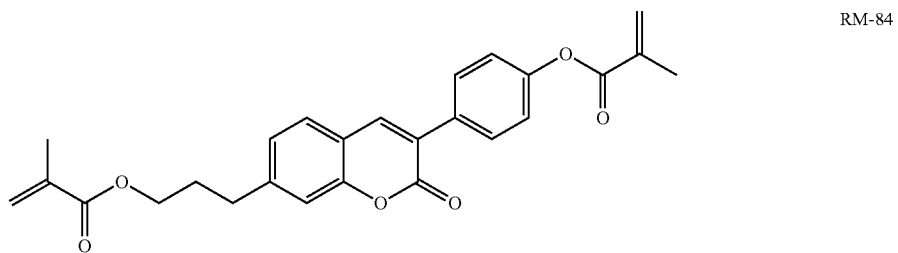 RM-84
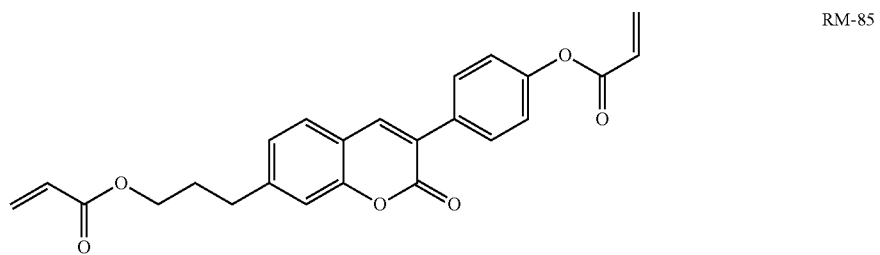 RM-85
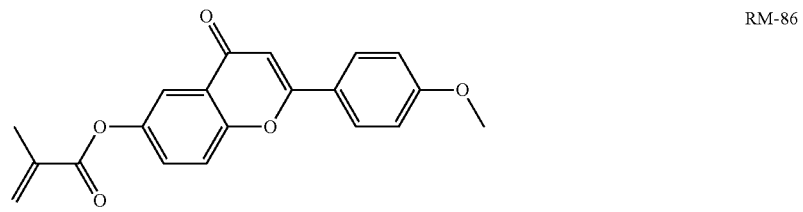 RM-86
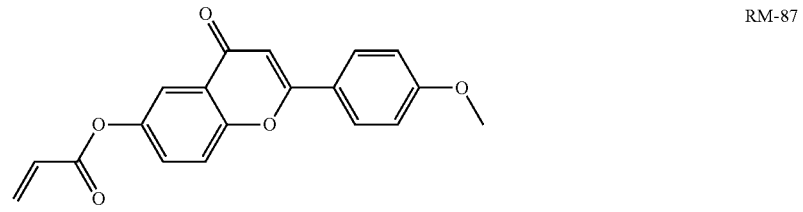 RM-87

TABLE E-continued
Table E shows illustrative reactive mesogenic compounds (RMs) which can be used in the LC media in accordance with the present invention.
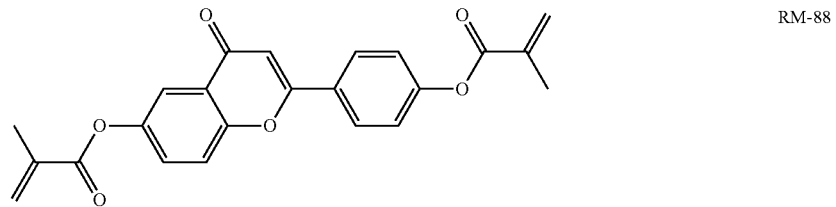
RM-88
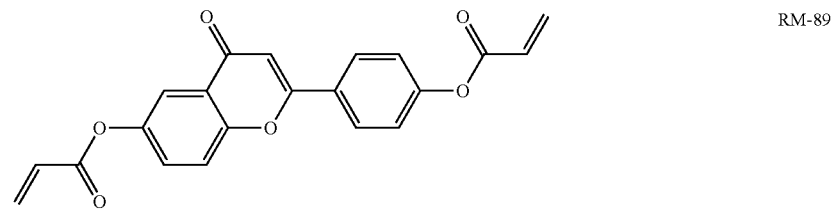
RM-89
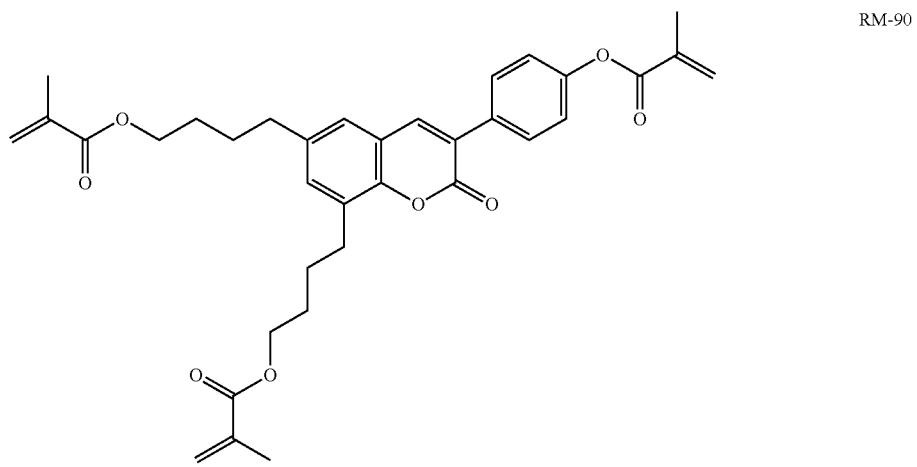
RM-90
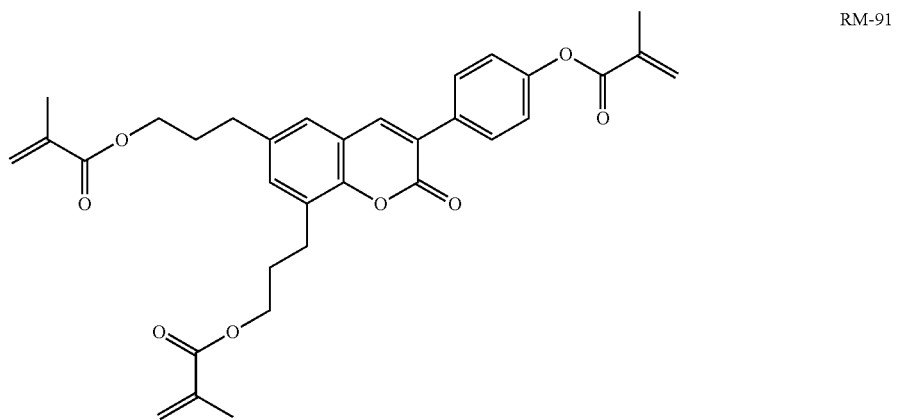
RM-91
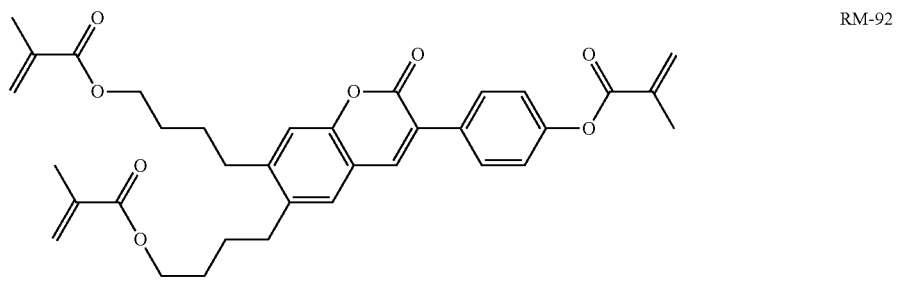
RM-92

TABLE E-continued
Table E shows illustrative reactive mesogenic compounds (RMs) which can
be used in the LC media in accordance with the present invention.
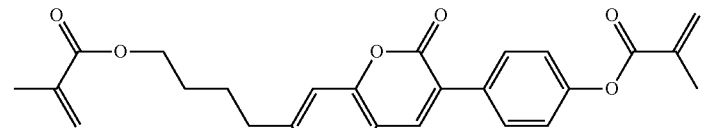
RM-93
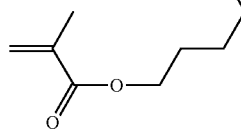
RM-94
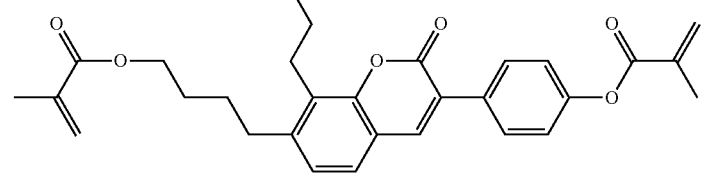
RM-95
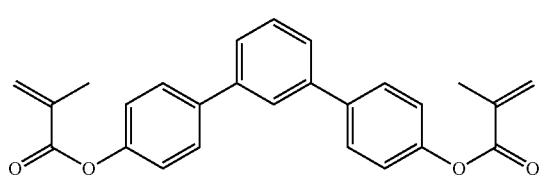 [SMILES: C=C(C)C(=O)Oc1ccc(-c2cccc(-c3ccc(OC(=O)C(=C)C)cc3)c2)cc1]
RM-96
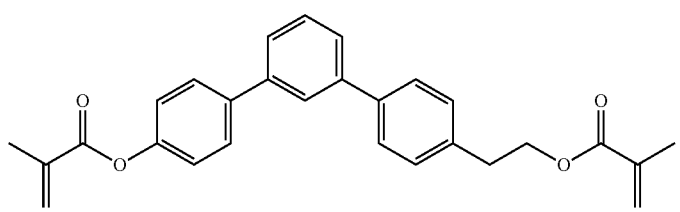 [SMILES: C=C(C)C(=O)OCCc1ccc(-c2cccc(-c3ccc(OC(=O)C(=C)C)cc3)c2)cc1]
RM-97
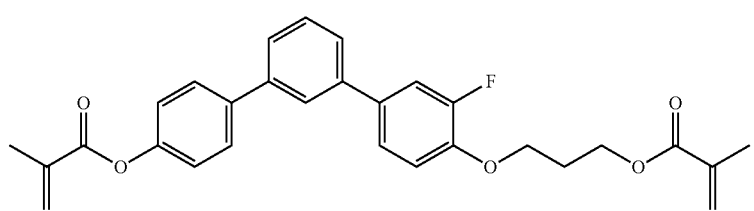 [SMILES: C=C(C)C(=O)OCCCOc1ccc(-c2cccc(-c3ccc(OC(=O)C(=C)C)cc3)c2)cc1F]
RM-98
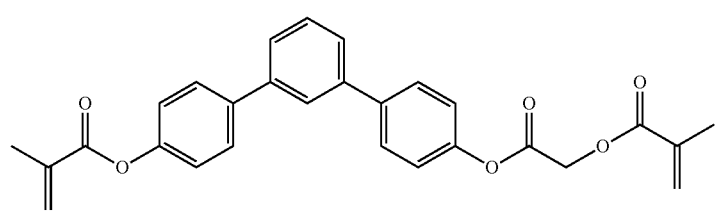 [SMILES: C=C(C)C(=O)OCC(=O)Oc1ccc(-c2cccc(-c3ccc(OC(=O)C(=C)C)cc3)c2)cc1]

TABLE E-continued
Table E shows illustrative reactive mesogenic compounds (RMs) which can be used in the LC media in accordance with the present invention.
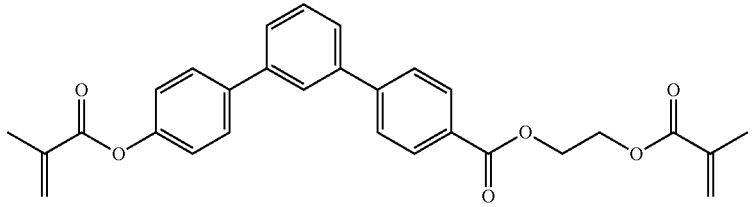 [SMILES: C=C(C)C(=O)OCCOC(=O)c1ccc(-c2cccc(-c3ccc(OC(=O)C(=C)C)cc3)c2)cc1]
RM-99
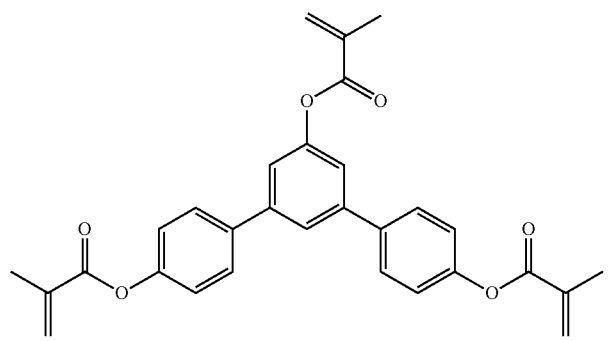 [SMILES: C=C(C)C(=O)Oc1ccc(-c2cc(OC(=O)C(=C)C)cc(-c3ccc(OC(=O)C(=C)C)cc3)c2)cc1]
RM-100
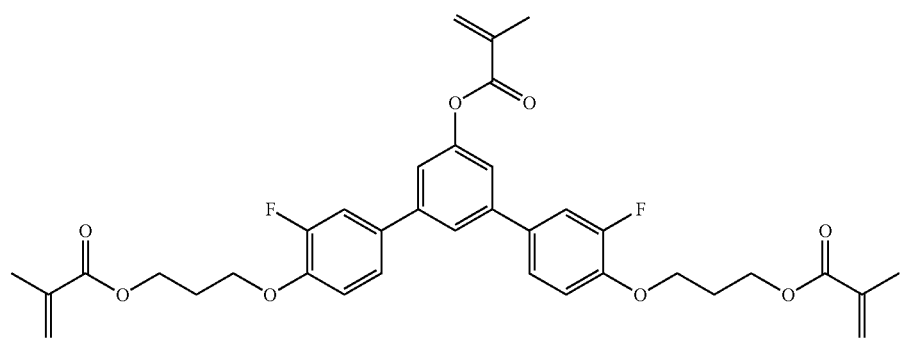 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101
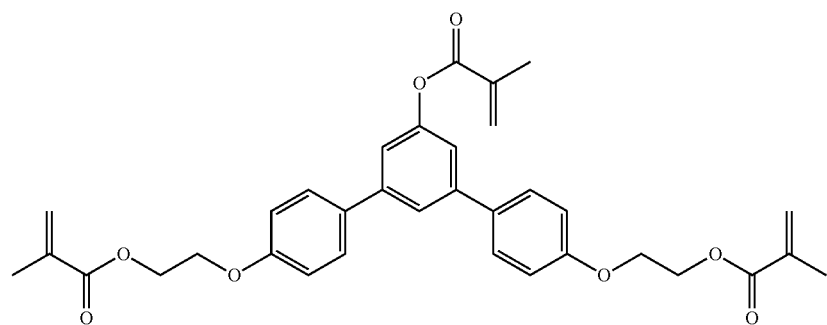 [SMILES: C=C(C)C(=O)OCCOc1ccc(-c2cc(OC(=O)C(=C)C)cc(-c3ccc(OCCOC(=O)C(=C)C)cc3)c2)cc1]
RM-102
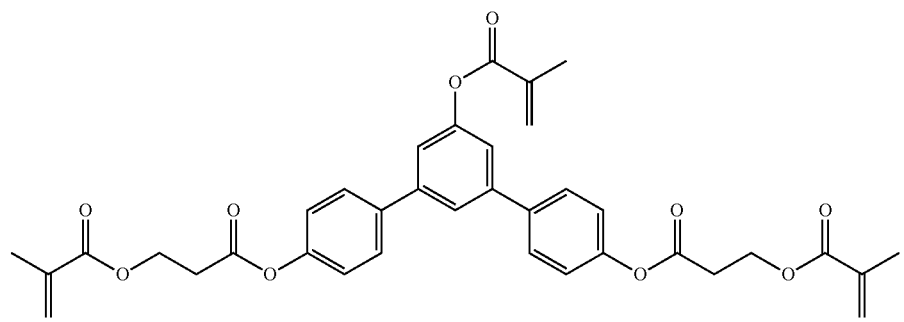 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-103

TABLE E-continued
Table E shows illustrative reactive mesogenic compounds (RMs) which can be used in the LC media in accordance with the present invention.
RM-104
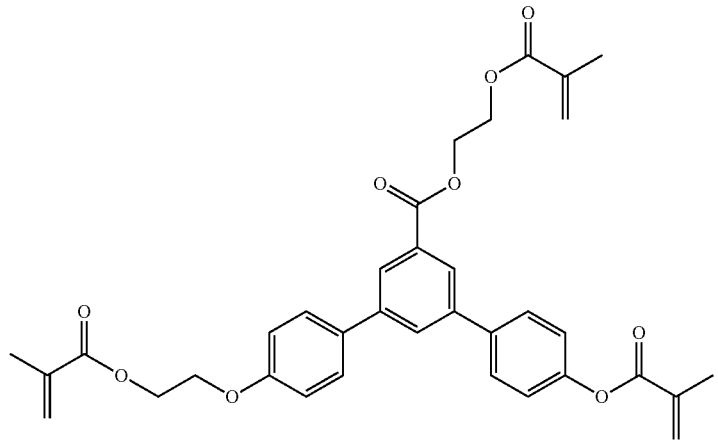 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
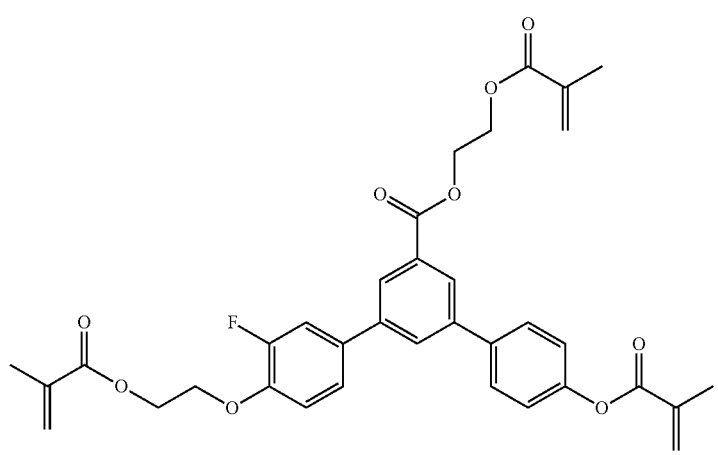 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-106
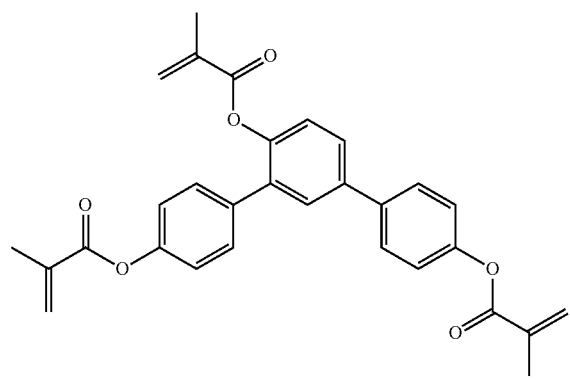 [SMILES: C=C(C)C(=O)Oc1ccc(-c2ccc(OC(=O)C(=C)C)c(-c3ccc(OC(=O)C(=C)C)cc3)c2)cc1]

TABLE E-continued
Table E shows illustrative reactive mesogenic compounds (RMs) which can be used in the LC media in accordance with the present invention.
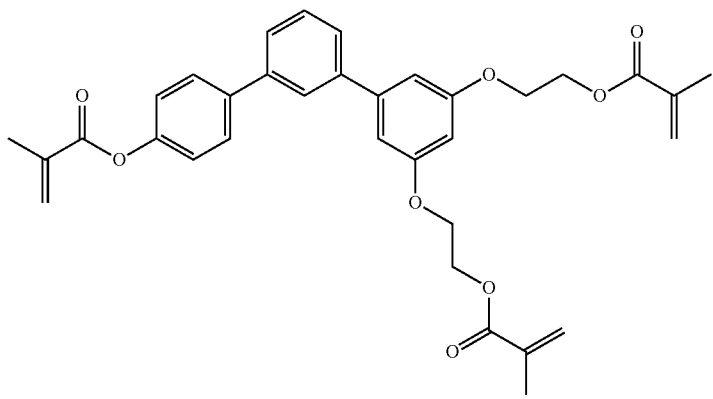 [SMILES: C=C(C)C(=O)OCCOc1cc(OCCOC(=O)C(=C)C)cc(-c2cccc(-c3ccc(OC(=O)C(=C)C)cc3)c2)c1]
RM-107
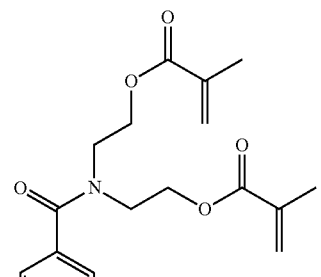
RM-108
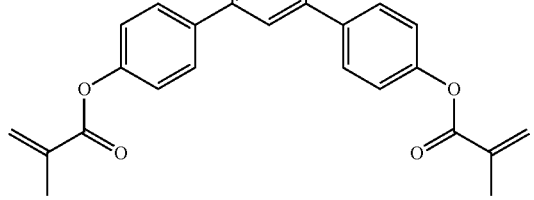
RM-109
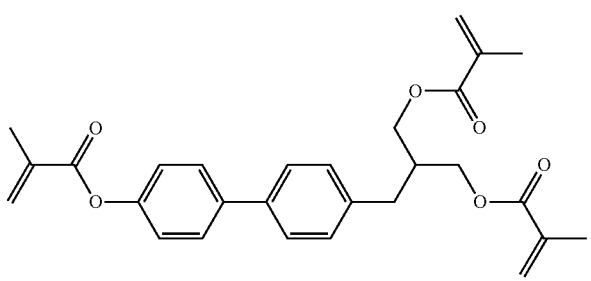 [SMILES: C=C(C)C(=O)OCC(COC(=O)C(=C)C)Cc1ccc(-c2ccc(OC(=O)C(=C)C)cc2)cc1]
RM-110

TABLE E-continued
Table E shows illustrative reactive mesogenic compounds (RMs) which can be used in the LC media in accordance with the present invention.
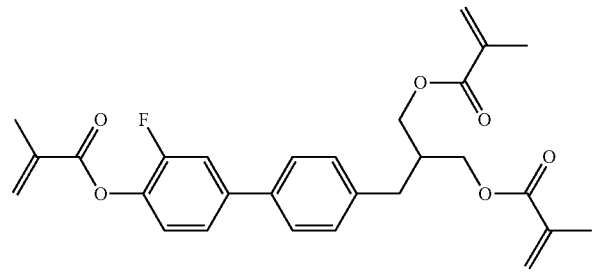 [SMILES: C=C(C)C(=O)OCC(COC(=O)C(=C)C)Cc1ccc(-c2ccc(OC(=O)C(=C)C)c(F)c2)cc1]
RM-111
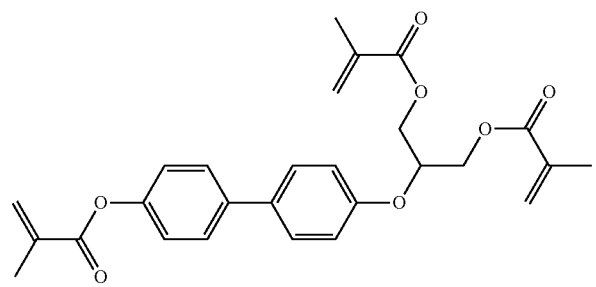 [SMILES: C=C(C)C(=O)OCC(COC(=O)C(=C)C)Oc1ccc(-c2ccc(OC(=O)C(=C)C)cc2)cc1]
RM-112
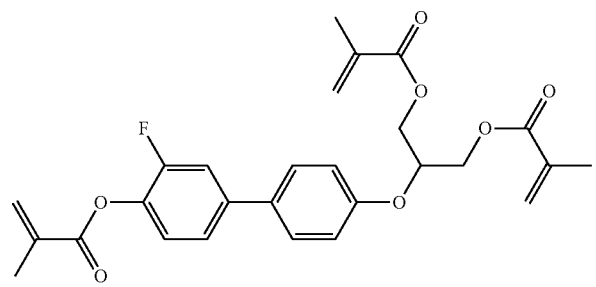 [SMILES: C=C(C)C(=O)OCC(COC(=O)C(=C)C)Oc1ccc(-c2ccc(OC(=O)C(=C)C)c(F)c2)cc1]
RM-113
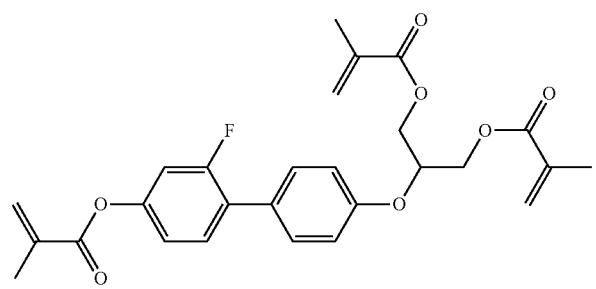 [SMILES: C=C(C)C(=O)OCC(COC(=O)C(=C)C)Oc1ccc(-c2ccc(OC(=O)C(=C)C)cc2F)cc1]
RM-114
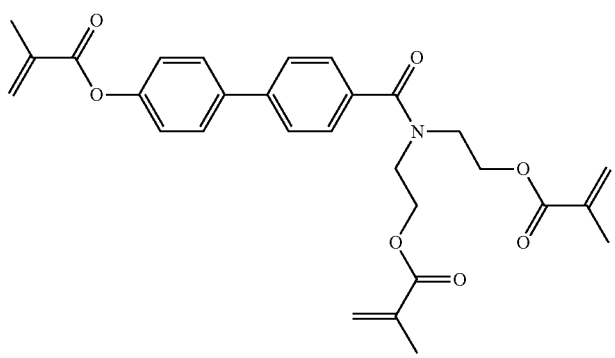 [SMILES: C=C(C)C(=O)OCCN(CCOC(=O)C(=C)C)C(=O)c1ccc(-c2ccc(OC(=O)C(=C)C)cc2)cc1]
RM-115

TABLE E-continued
Table E shows illustrative reactive mesogenic compounds (RMs) which can be used in the LC media in accordance with the present invention.
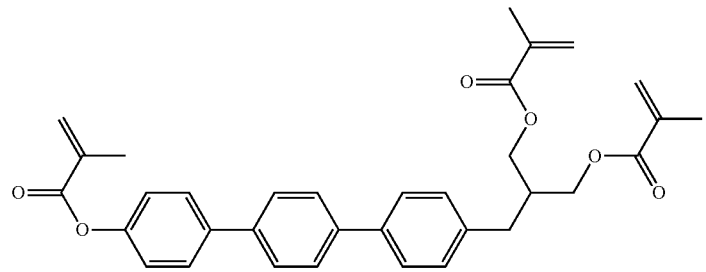 [SMILES: C=C(C)C(=O)OCC(COC(=O)C(=C)C)Cc1ccc(-c2ccc(-c3ccc(OC(=O)C(=C)C)cc3)cc2)cc1]
RM-116
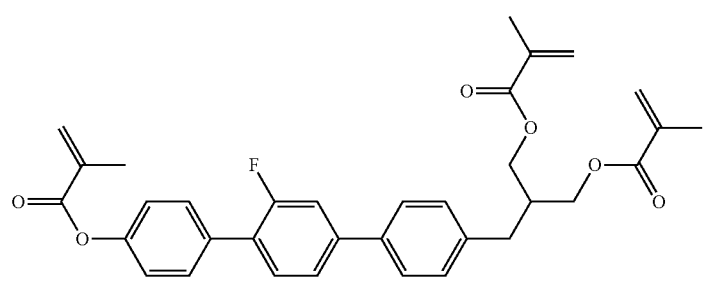 [SMILES: C=C(C)C(=O)OCC(COC(=O)C(=C)C)Cc1ccc(-c2ccc(-c3ccc(OC(=O)C(=C)C)cc3)c(F)c2)cc1]
RM-117
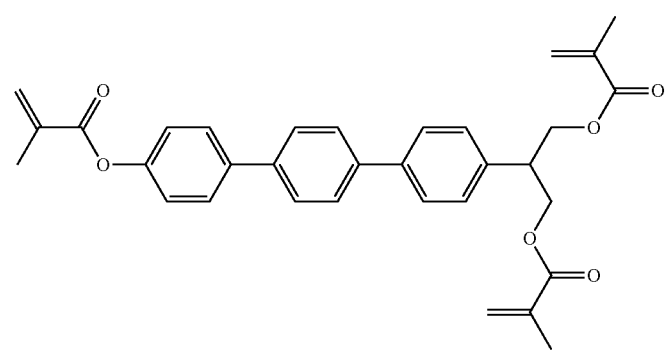 [SMILES: C=C(C)C(=O)OCC(COC(=O)C(=C)C)c1ccc(-c2ccc(-c3ccc(OC(=O)C(=C)C)cc3)cc2)cc1]
RM-118
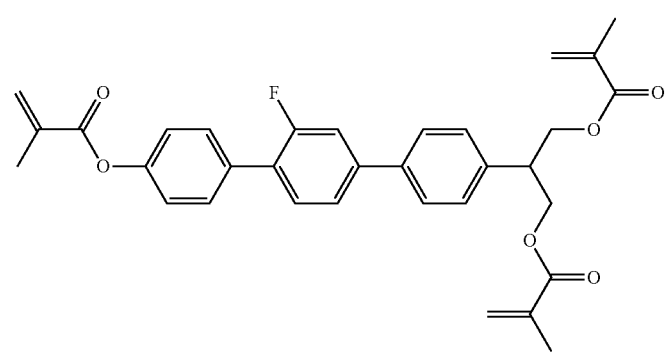 [SMILES: C=C(C)C(=O)OCC(COC(=O)C(=C)C)c1ccc(-c2ccc(-c3ccc(OC(=O)C(=C)C)cc3)c(F)c2)cc1]
RM-119
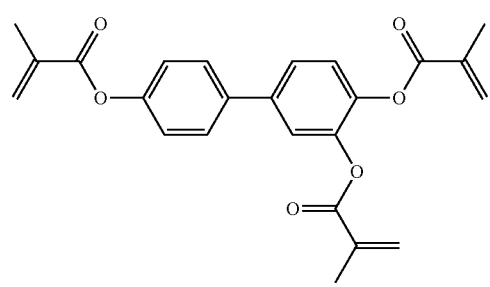 [SMILES: C=C(C)C(=O)Oc1ccc(-c2ccc(OC(=O)C(=C)C)c(OC(=O)C(=C)C)c2)cc1]
RM-120

TABLE E-continued
Table E shows illustrative reactive mesogenic compounds (RMs) which can be used in the LC media in accordance with the present invention.
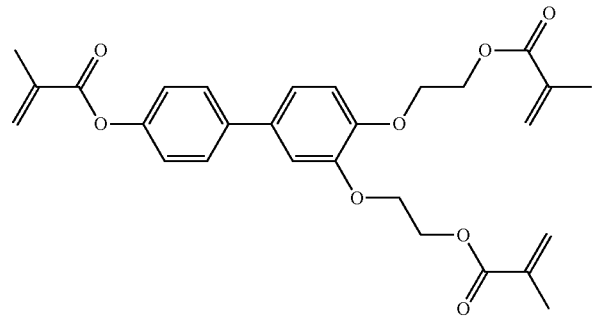 [SMILES: C=C(C)C(=O)OCCOc1ccc(-c2ccc(OC(=O)C(=C)C)cc2)cc1OCCOC(=O)C(=C)C]
RM-121
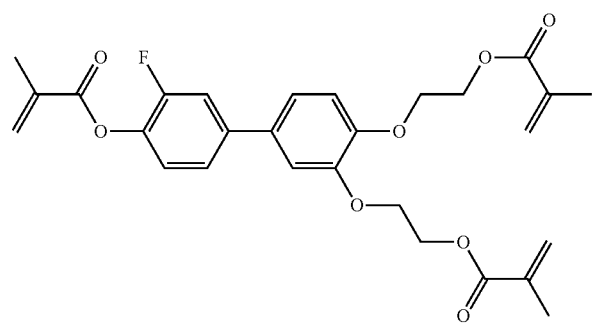 [SMILES: C=C(C)C(=O)OCCOc1ccc(-c2ccc(OC(=O)C(=C)C)c(F)c2)cc1OCCOC(=O)C(=C)C]
RM-122
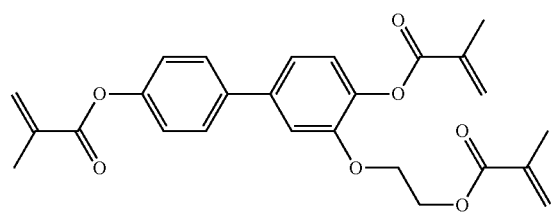 [SMILES: C=C(C)C(=O)OCCOc1cc(-c2ccc(OC(=O)C(=C)C)cc2)ccc1OC(=O)C(=C)C]
RM-123
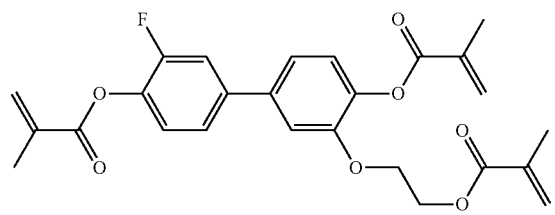
RM-124
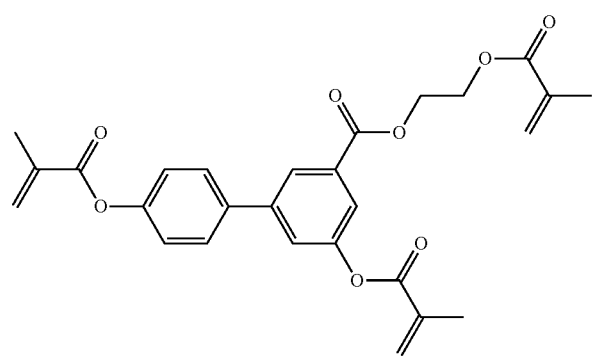 [SMILES: C=C(C)C(=O)OCCOC(=O)c1cc(OC(=O)C(=C)C)cc(-c2ccc(OC(=O)C(=C)C)cc2)c1]
RM-125

TABLE E-continued
Table E shows illustrative reactive mesogenic compounds (RMs) which can be used in the LC media in accordance with the present invention.
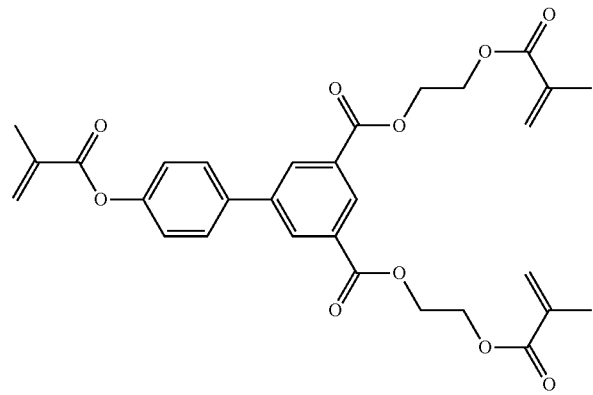 [SMILES: C=C(C)C(=O)OCCOC(=O)c1cc(C(=O)OCCOC(=O)C(=C)C)cc(-c2ccc(OC(=O)C(=C)C)cc2)c1]
RM-126
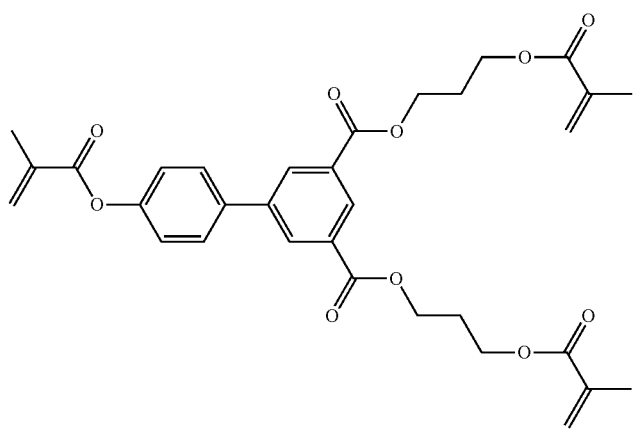 [SMILES: C=C(C)C(=O)OCCCOC(=O)c1cc(C(=O)OCCCOC(=O)C(=C)C)cc(-c2ccc(OC(=O)C(=C)C)cc2)c1]
RM-127
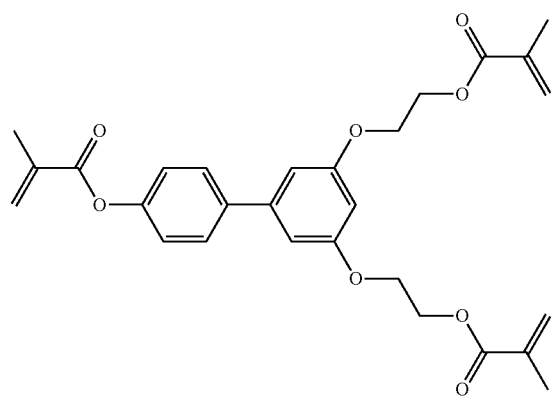 [SMILES: C=C(C)C(=O)OCCOc1cc(OCCOC(=O)C(=C)C)cc(-c2ccc(OC(=O)C(=C)C)cc2)c1]
RM-128

TABLE E-continued
Table E shows illustrative reactive mesogenic compounds (RMs) which can be used in the LC media in accordance with the present invention.
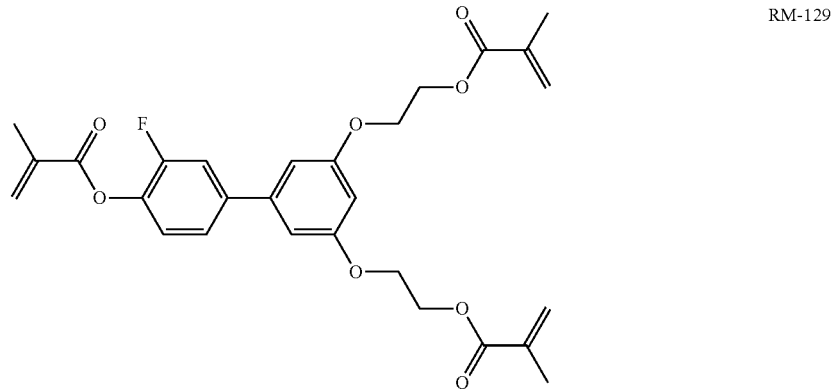
RM-129
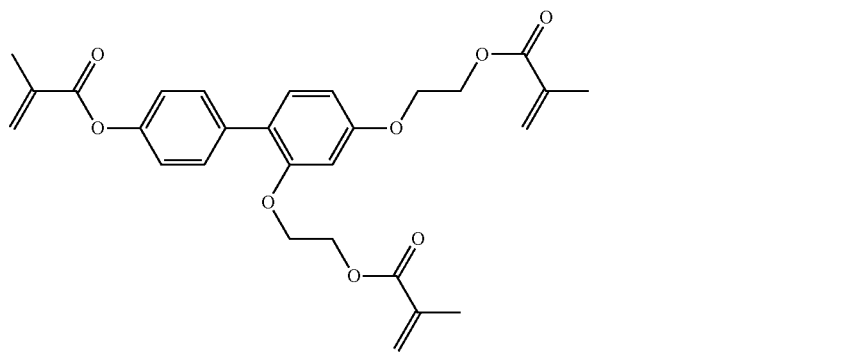 [SMILES: C=C(C)C(=O)OCCOc1ccc(-c2ccc(OC(=O)C(=C)C)cc2)c(OCCOC(=O)C(=C)C)c1]
RM-130
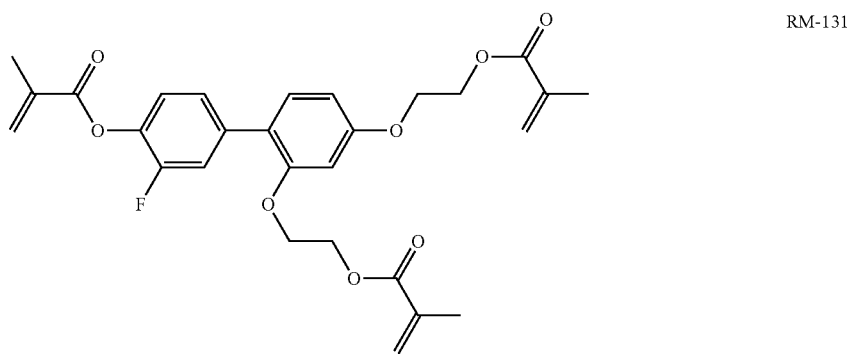
RM-131
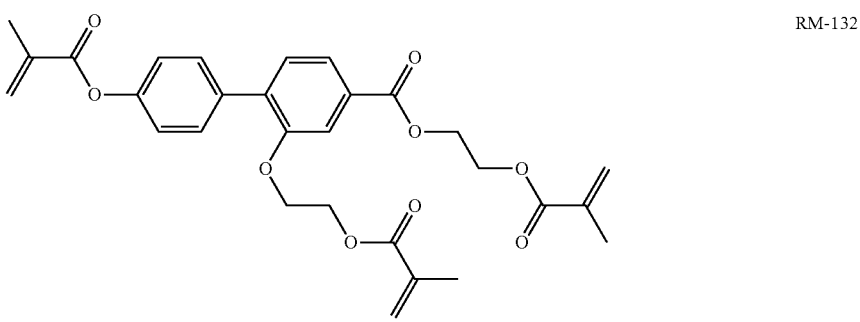
RM-132

TABLE E-continued
Table E shows illustrative reactive mesogenic compounds (RMs) which can be used in the LC media in accordance with the present invention.
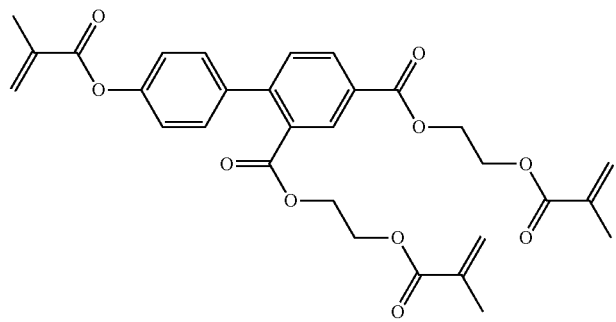 [SMILES: C=C(C)C(=O)OCCOC(=O)c1ccc(-c2ccc(OC(=O)C(=C)C)cc2)c(C(=O)OCCOC(=O)C(=C)C)c1]
RM-133
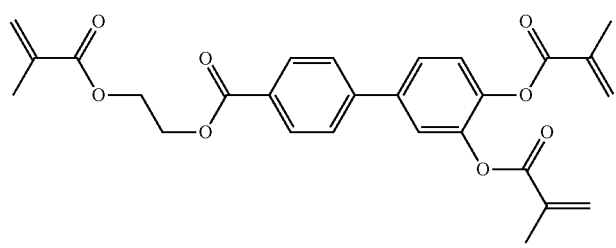 [SMILES: C=C(C)C(=O)OCCOC(=O)c1ccc(-c2ccc(OC(=O)C(=C)C)c(OC(=O)C(=C)C)c2)cc1]
RM-134
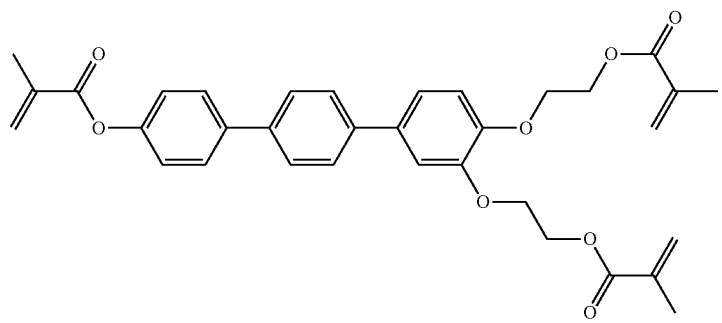 [SMILES: C=C(C)C(=O)OCCOc1ccc(-c2ccc(-c3ccc(OC(=O)C(=C)C)cc3)cc2)cc1OCCOC(=O)C(=C)C]
RM-135
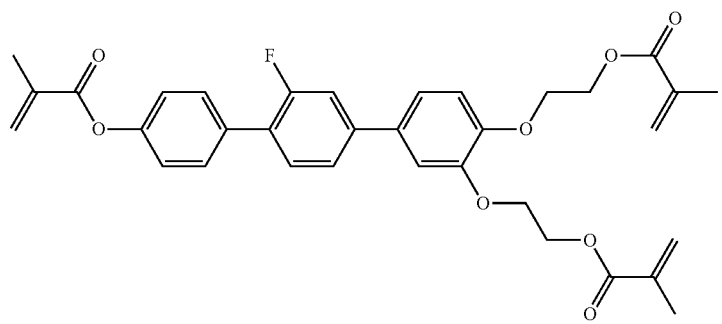 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136

TABLE E-continued
Table E shows illustrative reactive mesogenic compounds (RMs) which can be used in the LC media in accordance with the present invention.
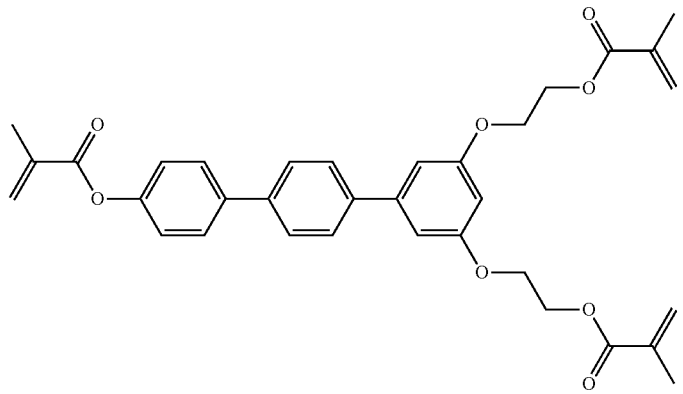 [SMILES: C=C(C)C(=O)OCCOc1cc(OCCOC(=O)C(=C)C)cc(-c2ccc(-c3ccc(OC(=O)C(=C)C)cc3)cc2)c1]
RM-137
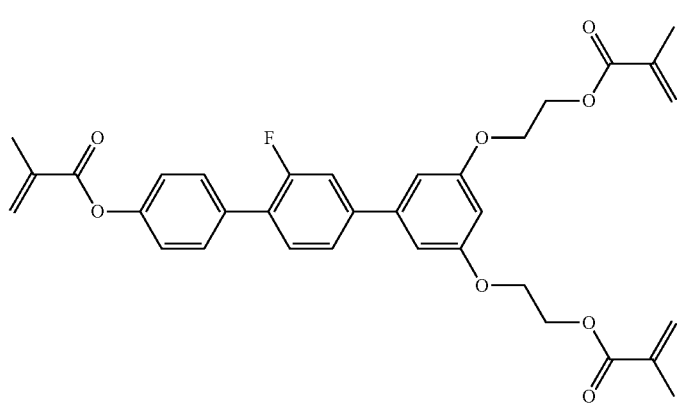
RM-138
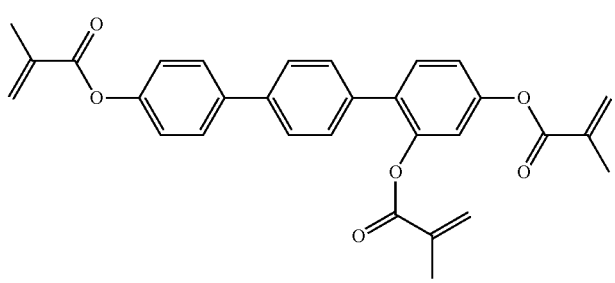 [SMILES: C=C(C)C(=O)Oc1ccc(-c2ccc(-c3ccc(OC(=O)C(=C)C)cc3OC(=O)C(=C)C)cc2)cc1]
RM-139
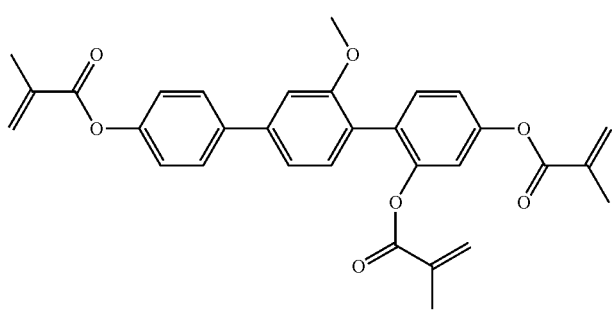 [SMILES: C=C(C)C(=O)Oc1ccc(-c2ccc(-c3ccc(OC(=O)C(=C)C)cc3OC(=O)C(=C)C)c(OC)c2)cc1]
RM-140

TABLE E-continued
Table E shows illustrative reactive mesogenic compounds (RMs) which can be used in the LC media in accordance with the present invention.
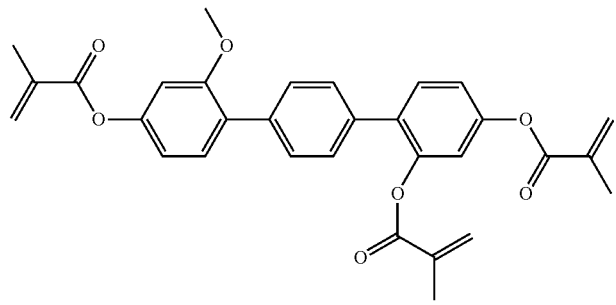 [SMILES: C=C(C)C(=O)Oc1ccc(-c2ccc(-c3ccc(OC(=O)C(=C)C)cc3OC(=O)C(=C)C)cc2)c(OC)c1]
RM-141
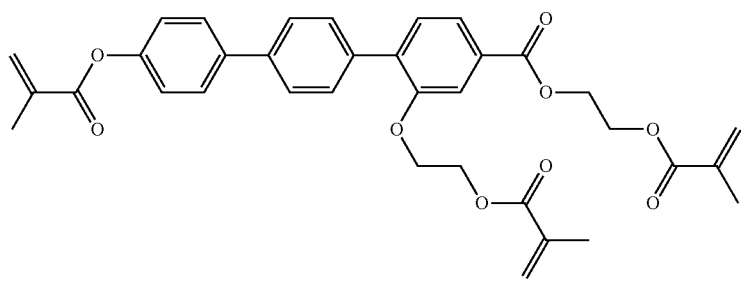 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-142
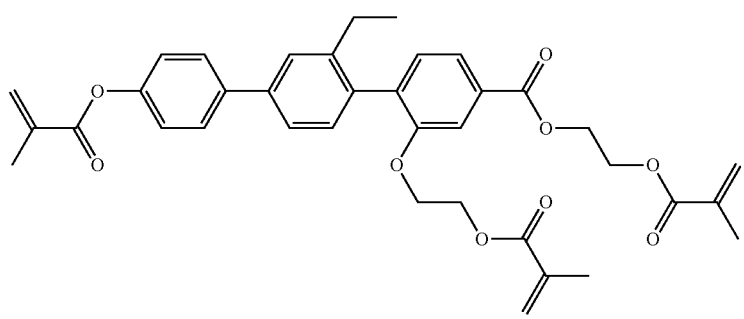 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-143
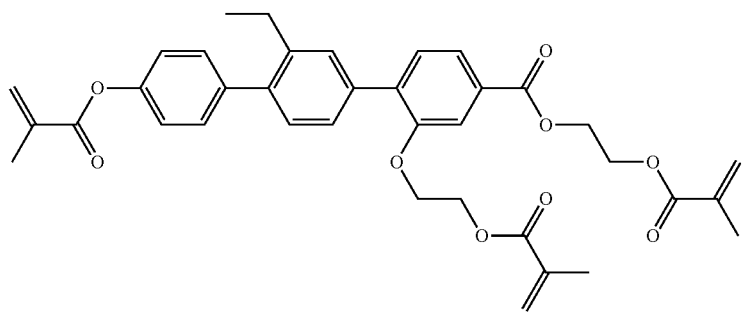 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-144
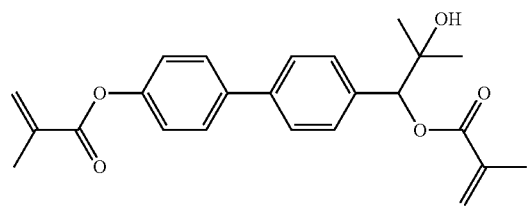 [SMILES: C=C(C)C(=O)Oc1ccc(-c2ccc(C(OC(=O)C(=C)C)C(C)(C)O)cc2)cc1]
RM-145

TABLE E-continued
Table E shows illustrative reactive mesogenic compounds (RMs) which can be used in the LC media in accordance with the present invention.
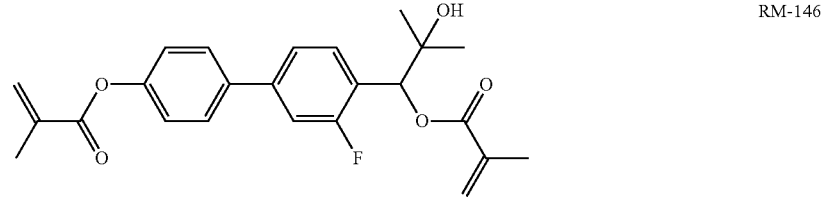
RM-146
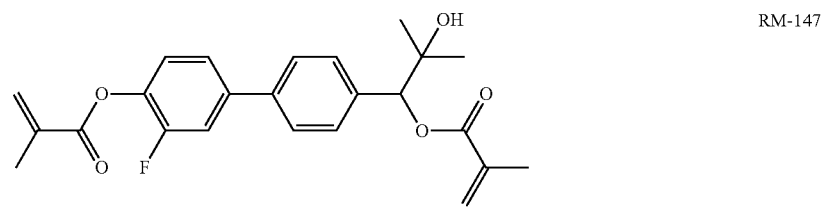
RM-147
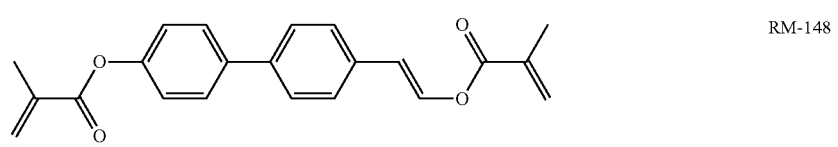
RM-148
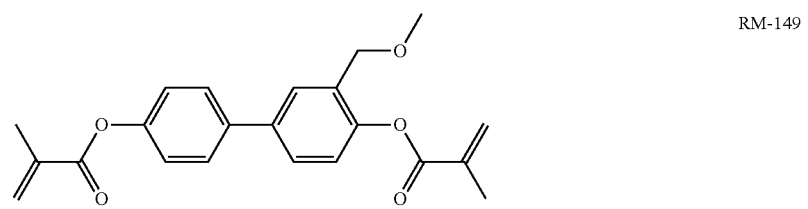
RM-149
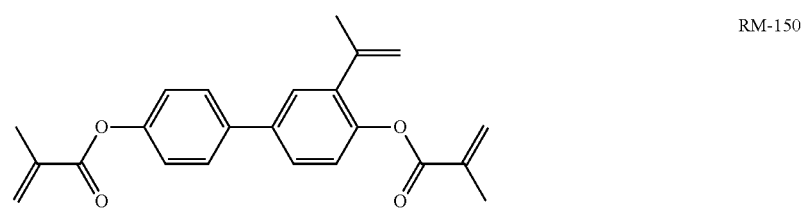
RM-150
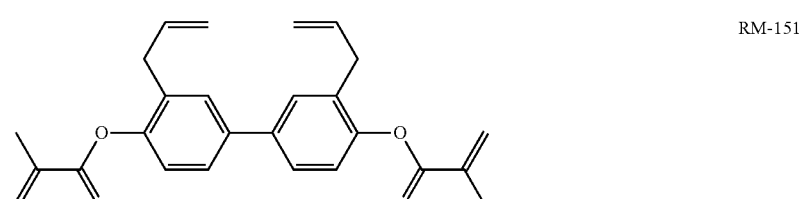
RM-151
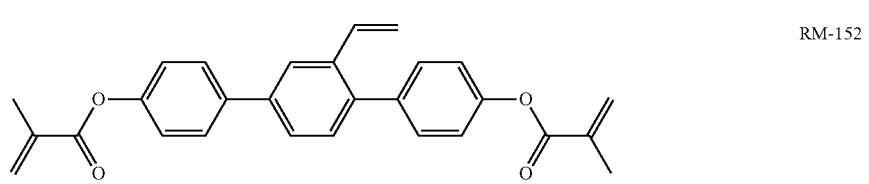
RM-152
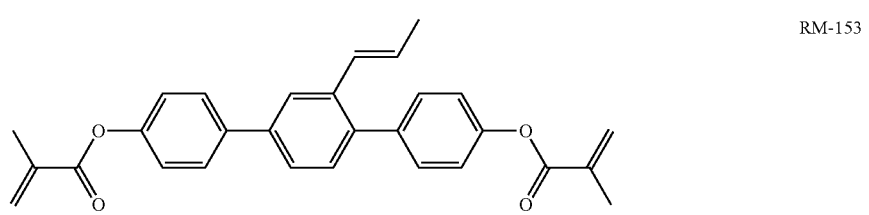
RM-153

TABLE E-continued

Table E shows illustrative reactive mesogenic compounds (RMs) which can be used in the LC media in accordance with the present invention.

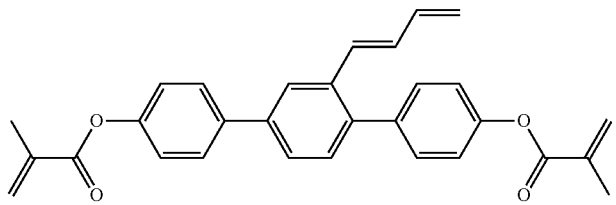 [SMILES: C=C/C=C/c1cc(-c2ccc(OC(=O)C(=C)C)cc2)ccc1-c1ccc(OC(=O)C(=C)C)cc1]
RM-154

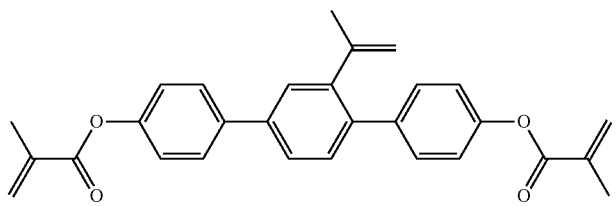 [SMILES: C=C(C)C(=O)Oc1ccc(-c2ccc(-c3ccc(OC(=O)C(=C)C)cc3)c(C(=C)C)c2)cc1]
RM-155

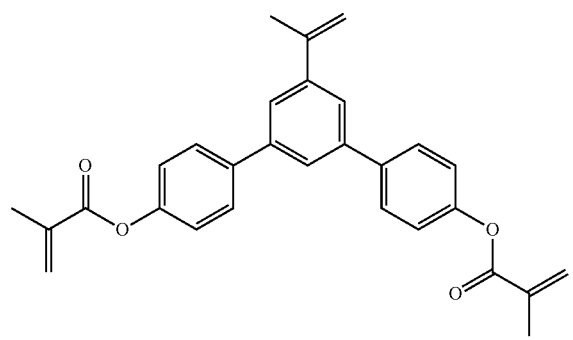 [SMILES: C=C(C)C(=O)Oc1ccc(-c2cc(C(=C)C)cc(-c3ccc(OC(=O)C(=C)C)cc3)c2)cc1]
RM-156

In a preferred embodiment, the mixtures according to the invention comprise one or more polymerisable compounds, preferably selected from the polymerisable compounds of the formulae RM-1 to RM-144. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-92, RM-102, RM-103, RM-109, RM-116, RM-117, RM-120, RM-121, RM-122, RM-139, RM-142, RM-153, RM-155, RM-158 and RM-159 are particularly preferred.

The following examples are intended to explain the invention without limiting it. Above and below, unless explicitly noted otherwise, all percentage data denote percent by weight, and relate to the corresponding mixture as a whole, comprising all solid or liquid-crystalline components, without solvents. Furthermore, unless explicitly noted otherwise, all temperatures are indicated in in degrees Celsius (° C.). m.p. denotes melting point, cl.p.=clearing point. Furthermore, C=crystalline state, N=nematic phase, S=smectic phase and I=isotropic phase. The data between these symbols represent the transition temperatures.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., $T_{ni}$ clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

All physical properties are and have been determined in accordance with "Merck Liquid Crystals, Physical Properties of Liquid Crystals", Status November 1997, Merck KGaA, Germany, and apply for a temperature of 20° C. unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast (Via).

EXAMPLE 1

The LC mixture N1 is formulated as follows:

| APUQU-3-F | 9.0% | cl.p. | 92.6° C. |
|---|---|---|---|
| CC-3-V | 15.0% | Δn | 0.1454 |
| CC-3-V1 | 8.0% | Δε | + 11.3 |
| CCH-35 | 7.5% | $\varepsilon_\parallel$ | 14.8 |
| CPGP-5-2 | 6.0% | $\gamma_1$ | 119 mPa·s |
| CPGP-5-3 | 5.0% | $K_1$ | 15.3 |
| CPP-3-F | 8.0% | $K_3$ | 14.9 |
| PCH-301 | 4.5% | $V_0$ | 1.23 V |
| PGP-2-3 | 8.0% | | |

-continued

| | |
|---|---|
| PGUQU-3-F | 9.5% |
| PP-1-2V1 | 2.5% |
| PPGU-3-F | 0.5% |
| PUQU-3-F | 16.5% |

To 99.28% of the mixture N1 are added 0.72% of the chiral dopant S-4011.

EXAMPLE 2

The LC mixture N2 is formulated as follows:

| | | | |
|---|---|---|---|
| APUQU-2-F | 6.0% | cl.p. | 92.8° C. |
| APUQU-3-F | 6.0% | Δn | 0.1119 |
| BCH-32 | 4.5% | Δε | 11.5 |
| CC-3-V | 33.5% | $\varepsilon_{\parallel}$ | 15.0 |
| CC-3-V1 | 1.0% | $\gamma_1$ | 96 mPa·s |
| CCP-V-1 | 10.0% | $K_1$ | 13.4 |
| CCP-V2-1 | 10.0% | $K_3$ | 16.5 |
| CDUQU-3-F | 6.0% | $V_0$ | 1.14V |
| CPGP-5-2 | 2.5% | | |
| PGUQU-3-F | 4.0% | | |
| PGUQU-4-F | 4.0% | | |
| PPGU-3-F | 0.5% | | |
| PUQU-3-F | 12.0% | | |

To 99.75% of the mixture N2 are added 0.22% of the chiral dopant S-4011 and 0.03% of the stabiliser S1-1.

S1-1

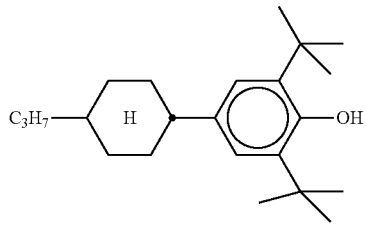

EXAMPLE 3

The LC mixture N3 is formulated as follows:

| | | | |
|---|---|---|---|
| APUQU-2-F | 6.0% | cl.p. | 92.8° C. |
| APUQU-3-F | 6.0% | Δn | 0.1119 |
| BCH-32 | 4.5% | Δε | 11.5 |
| CC-3-V | 33.5% | $\varepsilon_{\parallel}$ | 15.0 |
| CC-3-V1 | 1.0% | $\gamma_1$ | 96 mPa·s |
| CCP-V-1 | 10.0% | $K_1$ | 13.4 |
| CCP-V2-1 | 10.0% | $K_3$ | 16.5 |
| CDUQU-3-F | 6.0% | $V_0$ | 1.14 V |
| CPGP-5-2 | 2.5% | | |
| PGUQU-3-F | 4.0% | | |
| PGUQU-4-F | 4.0% | | |
| PPGU-3-F | 0.5% | | |
| PUQU-3-F | 12.0% | | |

To 99.888% of the mixture N3 are added 0.04% of the stabiliser S2-1 and 0.108% of the chiral dopant S-4011.

S2-1

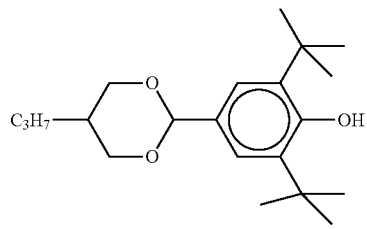

The invention claimed is:

1. An LCOS display, comprising a silicon-containing backplane (1), a reflective coating (2) in the shape of a pixel array, first (3) and second (4) alignment layers providing planar alignment, a layer (5) of the LC medium, a transparent electrode layer (6), and a transparent substrate (7), and in said LCOS display an LC medium with positive dielectric anisotropy, said medium comprising one or more compounds of formula I, one or more compounds of formulae II or III, and one or more chiral dopants

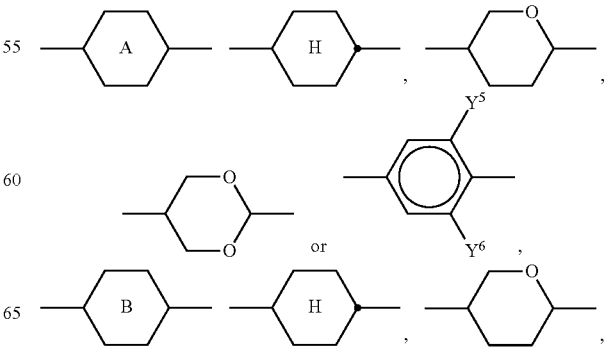

wherein the individual radicals, independently of each other and on each occurrence identically or differently, have the following meanings
"alkyl" $C_{1-6}$-alkyl,
$R^{a1}$ H, $CH_3$ or $C_2H_5$,
i, k 0, 1, 2 or 3, -continued

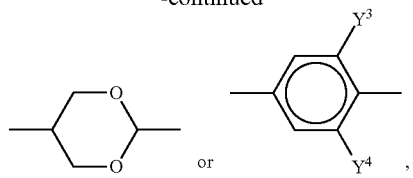
or

$R^0$ an unsubstituted or halogenated alkyl or alkoxy radical having 1 to 15 C atoms, where, in addition, one or more $CH_2$ groups in these radicals may each be replaced, independently of one another, by —C≡C—, —$CF_2$O—, —CH=CH—,

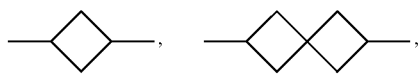

—O—, —CO—O— or —O—CO— in such a way that O atoms are not linked directly to one another, or denotes $X^0$ F, Cl, CN, $SF_5$, SCN, NCS, a $C_{1-6}$-halogenated alkyl radical, a $C_{2-6}$-halogenated alkenyl radical, a $C_{1-6}$-halogenated alkoxy radical or a $C_{2-6}$-halogenated alkenyloxy radical, and $Y^0$ H or $CH_3$, $Y^{1-6}$ H or F, said display having a helical twisting power and an amount of the chiral dopant in the LC medium are selected such that the display has a ratio d/p of 0.015 to 0.2.

2. The LCOS display according to claim 1, wherein the LC medium comprises as one or more chiral dopants R- or S-1011, R- or S-2011, R- or S-3011, R- or S-4011, or R- or S-5011:

R/S-1011

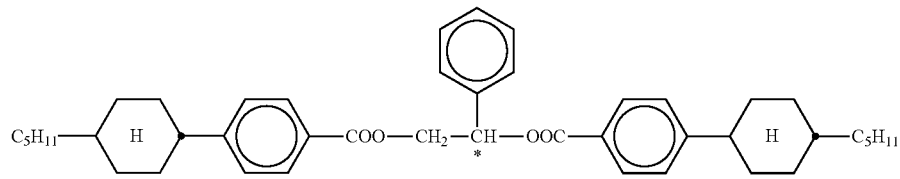

R/S-2011

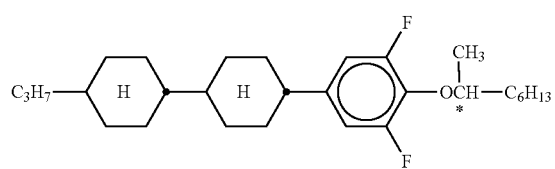

R/S-3011

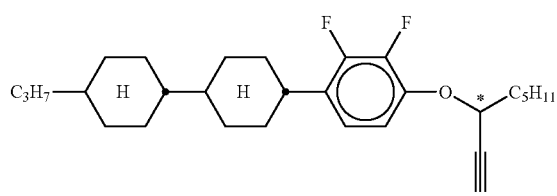

R/S-4011

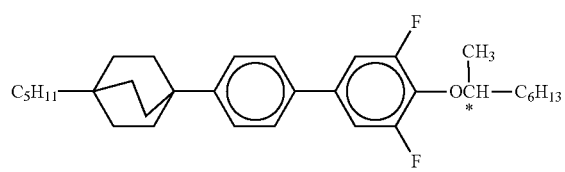

R/S-5011

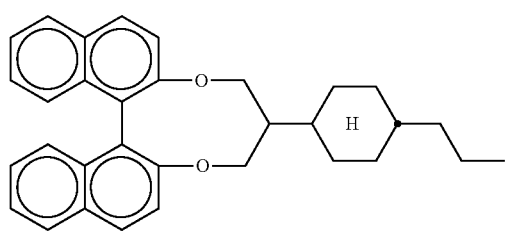

3. The LCOS display according to claim 1, wherein the LC medium comprises one or more compounds of formula I of the following subformulae

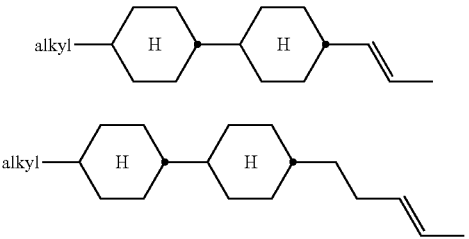

wherein "alkyl" has the meaning given in claim 1.

4. The LCOS display according to claim 1, wherein the LC medium comprises one or more compounds of formula I of the following subformulae:

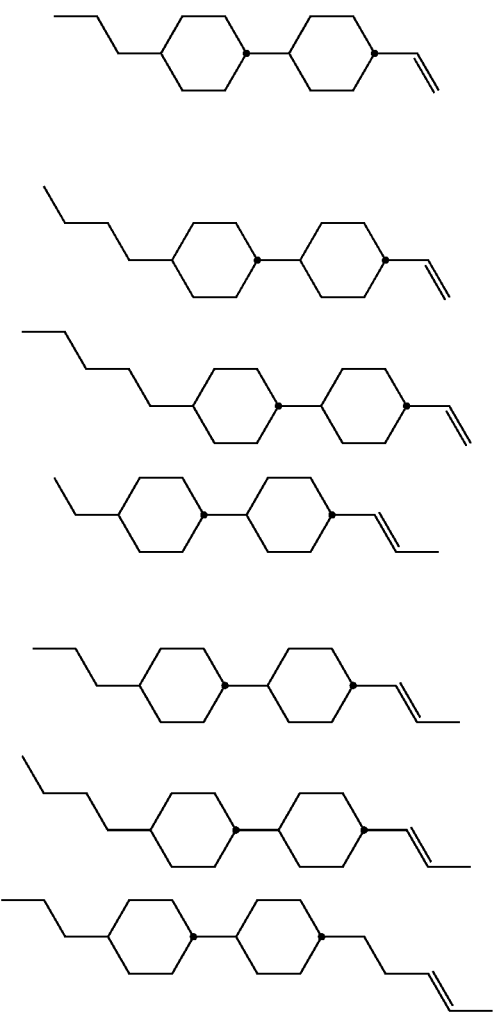

5. The LCOS display according to claim 1, wherein the LC medium comprises one or more compounds of formula II of the following subformulae

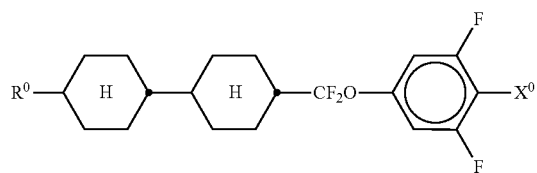

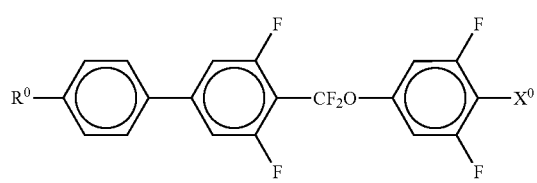

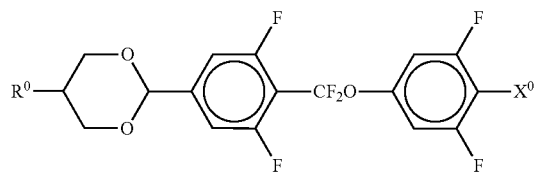

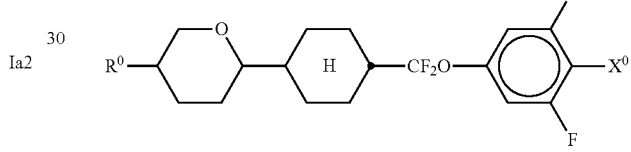

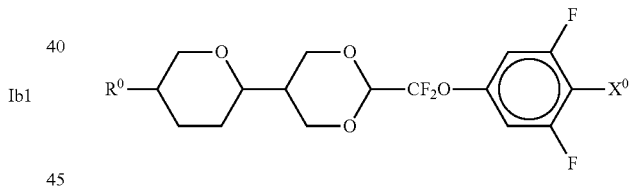

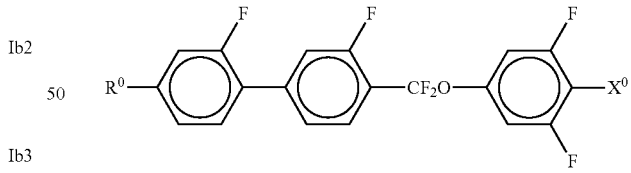

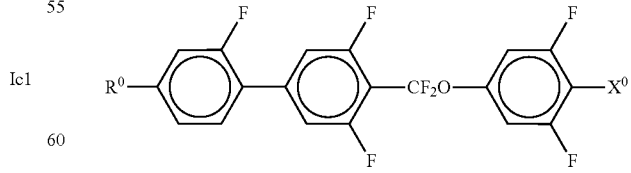

in which $R^0$ and $X^0$ have the meanings given in claim 1.

6. The LCOS display according to claim 1, wherein the LC medium comprises one or more compounds of formula III of the following subformulae

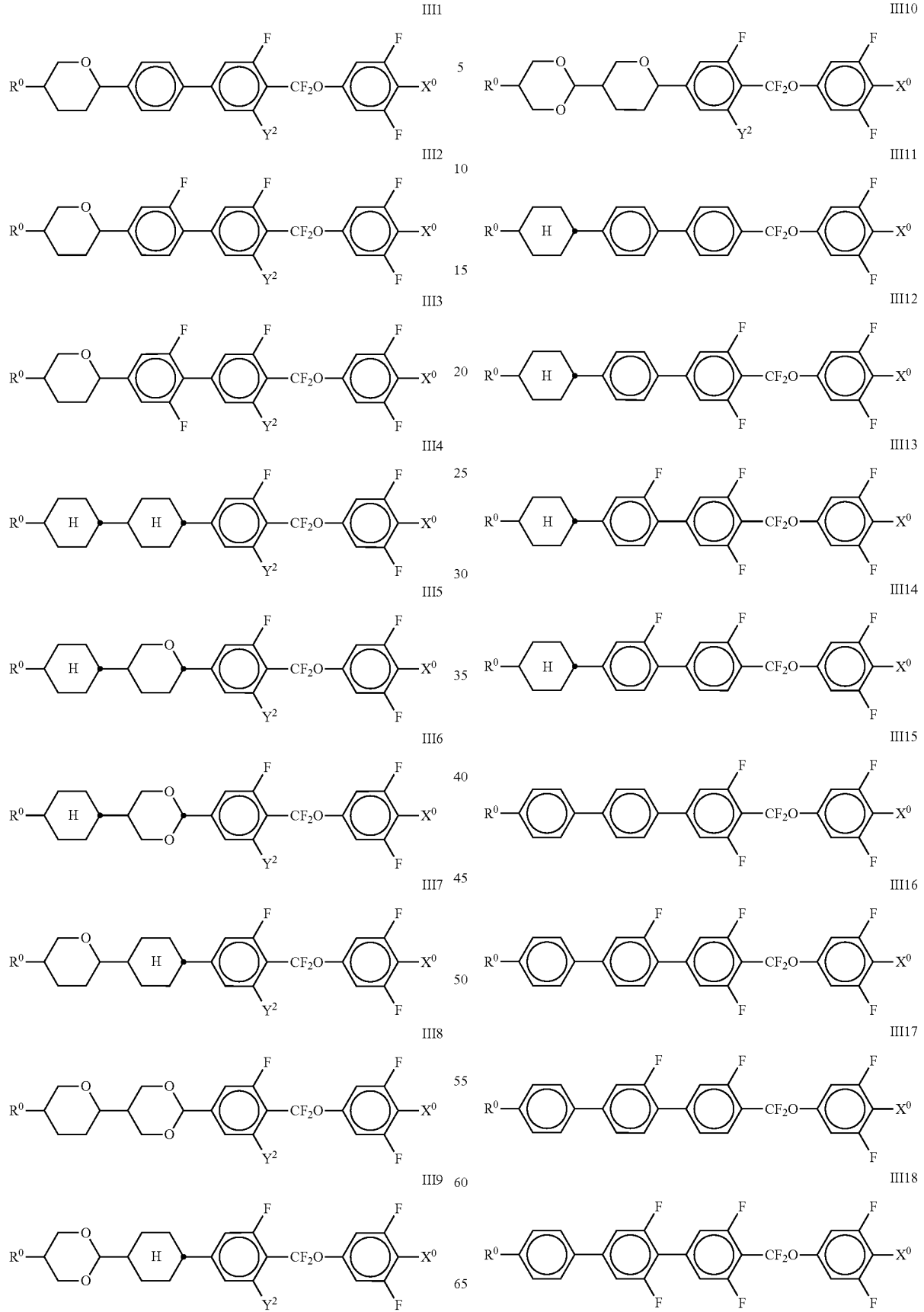

III19
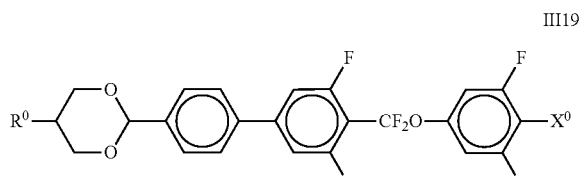

III20
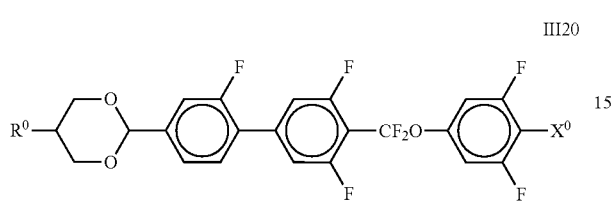

III21
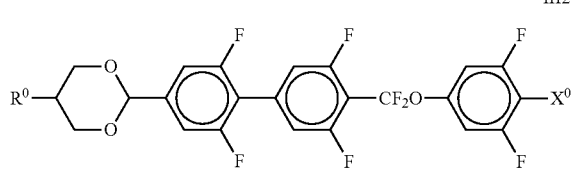

in which R⁰ and X⁰ have the meanings given in claim 1.

7. The LCOS display according to claim 1, wherein the LC medium comprises one or more compounds of the following formulae IV
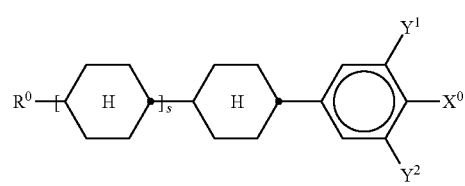

V
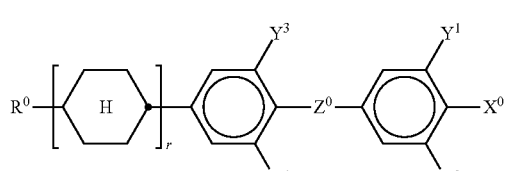

VI
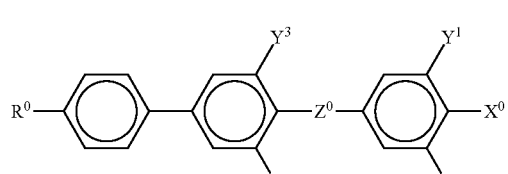

VII
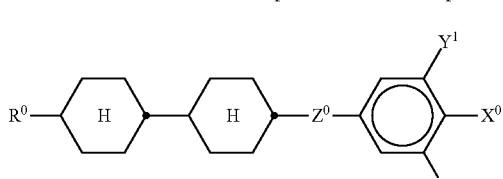

VIII
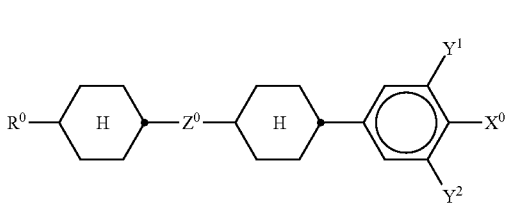

in which R⁰, X⁰ and Y¹⁻⁴ have the meanings given in claim 1,

Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—, r denotes 0 or 1, and s denotes 0 or 1.

8. The LCOS display according to claim 1, wherein the LC medium comprises one or more compounds of the following formulae IVa1
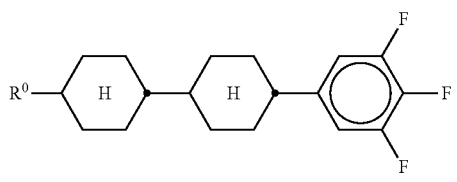

IVc1
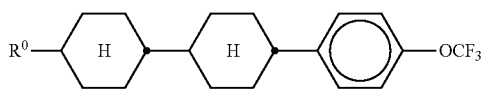

in which R⁰ has the meanings given in claim 1.

9. The LCOS display according to claim 1, wherein the LC medium additionally comprises one or more compounds of the following formulae:

IX
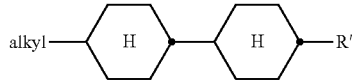

X
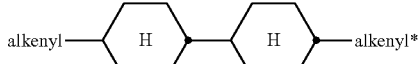

XI
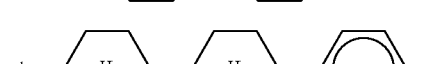

XII
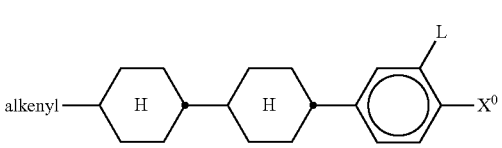

in which X⁰ has the meanings given in claim 1, and

"alkyl" denotes C₁₋₆-alkyl,

"alkenyl" and "alkenyl*" denote independently of each other C₂₋₆-alkenyl,

L denotes H or F,

R″ denotes $C_{1-6}$-alkyl, $C_{1-6}$-alkoxy or $C_{2-6}$-alkenyl.

10. The LCOS display according to claim 1, wherein the LC medium comprises one or more compounds of the formulae:

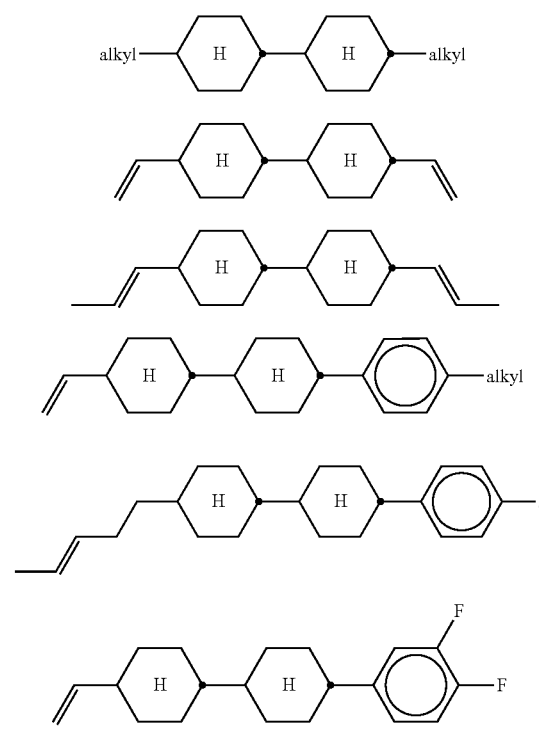

wherein "alkyl" denotes $C_{1-6}$-alkyl.

11. The LCOS display according to claim 1, wherein the LC medium comprises one or more compounds of the following formula:

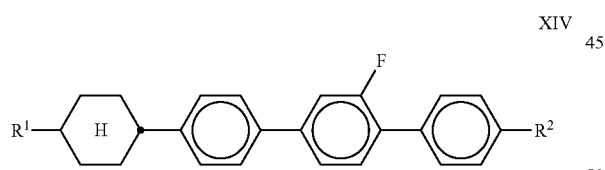

in which $R^1$ and $R^2$ independently of each other denote alkyl having 1 to 6 C atoms.

12. The LCOS display according to claim 1, wherein the LC medium additionally comprises one or more compounds of the following formulae:

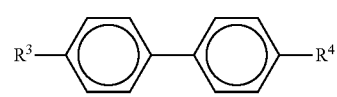

in which $R^3$ and $R^4$ each, independently of one another, denote $C_{1-6}$-n-alkyl, alkoxy, oxaalkyl, fluoroalkyl or $C_{2-6}$-alkenyl.

13. The LCOS display according to claim 1, wherein the LC medium additionally comprises one or more compounds of the following subformulae:

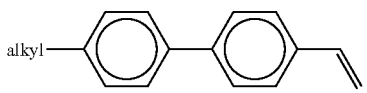

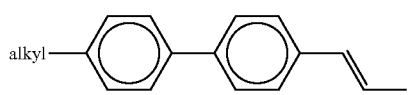

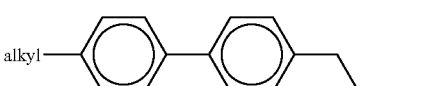

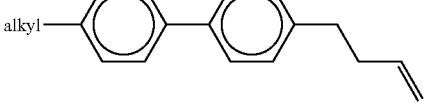

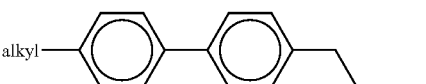

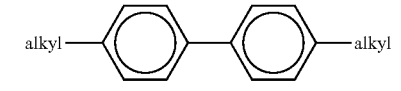

in which "alkyl" denotes $C_{1-6}$-alkyl.

14. The LCOS display according to claim 1, wherein the LC medium comprises one or more compounds of the formula XVI

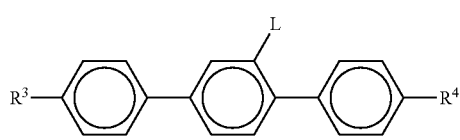

in which $R^3$ and $R^4$ each, independently of one another, denote $C_{1-6}$-n-alkyl, alkoxy, oxaalkyl, fluoroalkyl or $C_{2-6}$-alkenyl, and L denotes H or F.

15. The LCOS display according to claim 1, wherein the LC medium comprises a compound of formula XVIc2

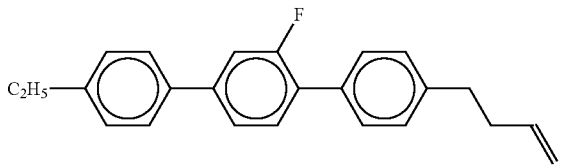

16. The LCOS display according to claim 1, wherein the LC medium comprises one or more compounds of formula IA1

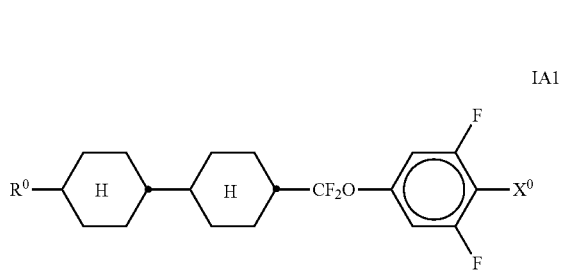
IA1 in which $R^0$ is ethyl or propyl and $X^0$ is F.

17. The LCOS display according to claim 1, wherein the LC medium comprises one or more compounds of the following formulae

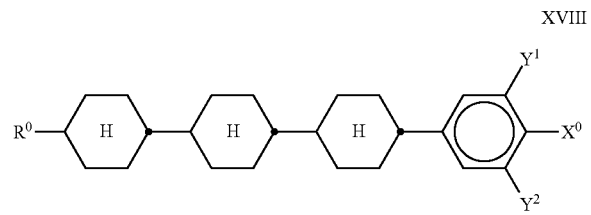
XVIII

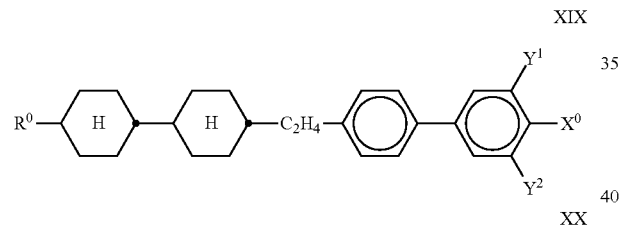
XIX

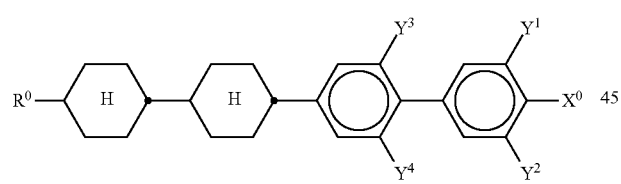
XX

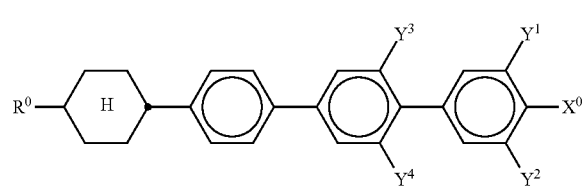
XXI

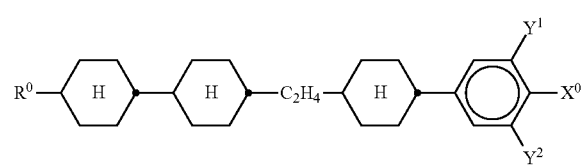
XXII

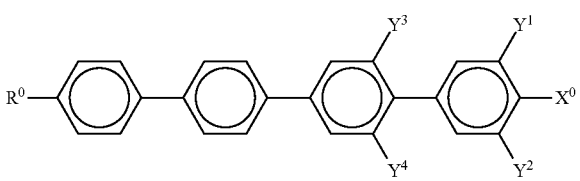
XXIII in which $R^0$, $X^0$ and $Y^{1-4}$ each, independently of one another, have one of the meanings given in claim 1.

18. The LCOS display according to claim 1, wherein the LC medium comprises one or more compounds of the formula XXIa

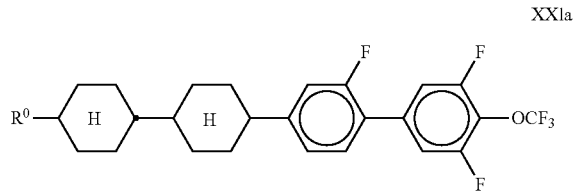
XXIa in which $R^0$ denotes ethyl, n-propyl, n-butyl or n-pentyl.

19. The LCOS display according to claim 1, wherein the LC medium comprises one or more compounds of the following formulae

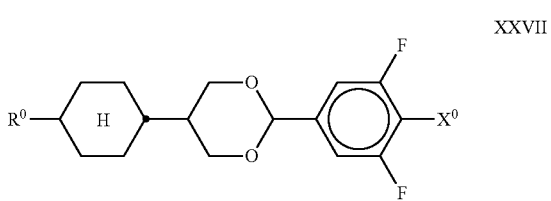
XXVII

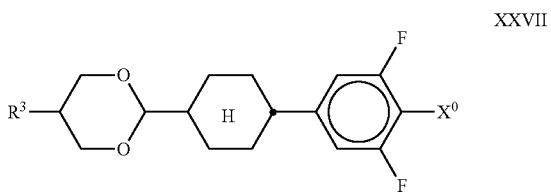
XXVII

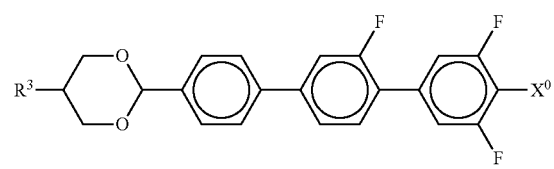
XXIX in which $R^3$ denotes $C_{1-6}$-n-alkyl, alkoxy, oxaalkyl, fluoroalkyl or $C_{2-6}$-alkenyl, and $X^0$ has the meaning indicated in claim 1.

20. The LCOS display according to claim 1, wherein the LC medium comprises one or more compounds of the formula XXIXa XXIXa

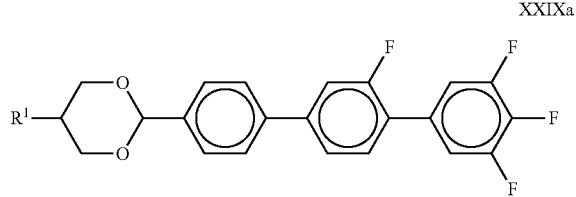

in which R³ denotes ethyl, n-propyl, n-butyl or n-pentyl.

21. The LCOS display according to claim 1, wherein the LC medium comprises one or more stabilizers.

22. The LCOS display according to claim 1, wherein the LC medium comprises one or more stabilizers of the following formulae

S1

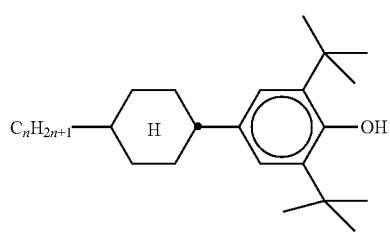

S2

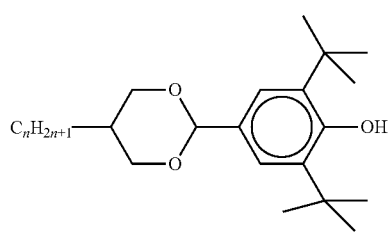

S3

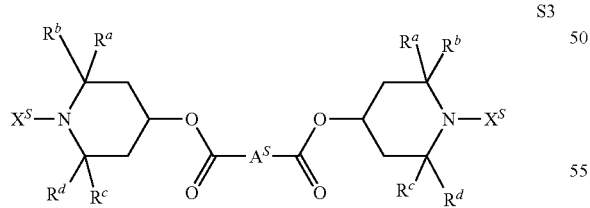

wherein the individual radicals, independently of each other and on each occurrence identically or differently, have the following meanings $R^{a-d}$ $C_{1-10}$-straight-chain or $C_{3-10}$-branched alkyl, $X^S$ H, CH₃, OH or O·, $A^S$ $C_{1-20}$-straight-chain, or $C_{3-20}$-branched or cyclic alkylene which is optionally substituted, n an integer from 1 to 6.

23. The LCOS display according to claim 1, wherein the LC medium comprises one or more stabilizers of the following formulae

S1-1

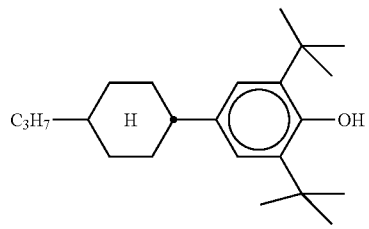

S2-1

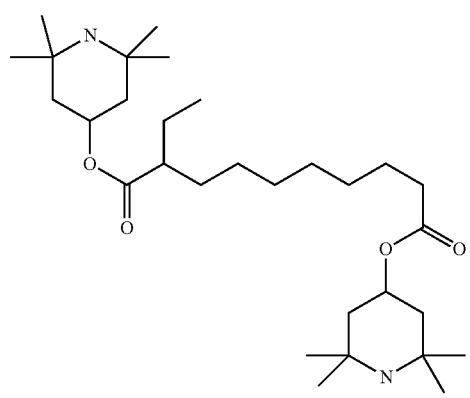

S3-1

S3-2

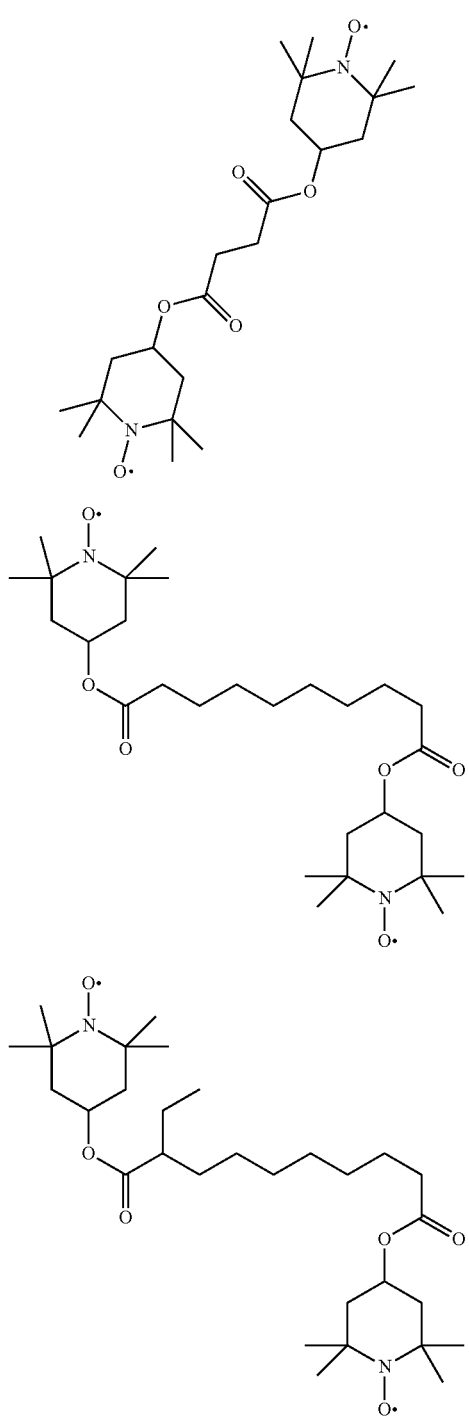
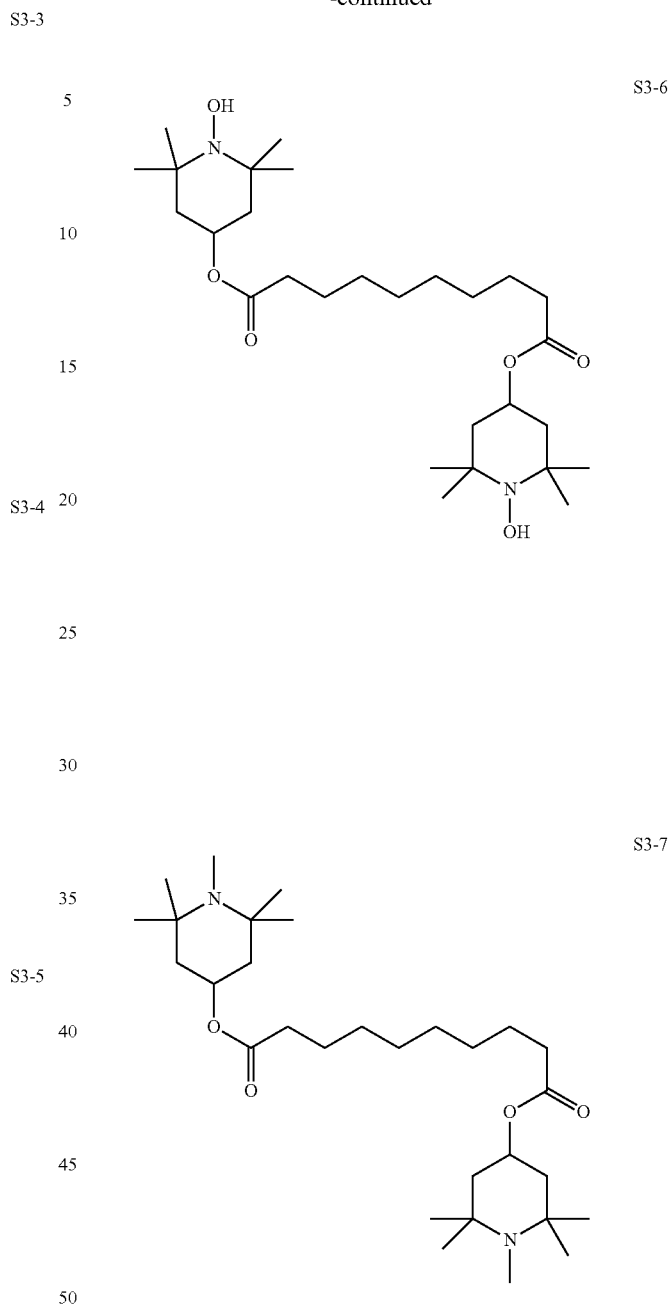
24. The LCOS display according to claim 1, wherein the LC medium does not contain compounds having a cyano group.
* * * * *